US010878646B2

(12) United States Patent
Plante

(10) Patent No.: US 10,878,646 B2
(45) Date of Patent: Dec. 29, 2020

(54) VEHICLE EVENT RECORDER SYSTEMS

(75) Inventor: James Plante, San Diego, CA (US)

(73) Assignee: SmartDrive Systems, Inc., San Diego, CA (US)

(*) Notice: Subject to any disclaimer, the term of this patent is extended or adjusted under 35 U.S.C. 154(b) by 283 days.

(21) Appl. No.: 11/296,906

(22) Filed: Dec. 8, 2005

(65) Prior Publication Data
US 2007/0136078 A1 Jun. 14, 2007

(51) Int. Cl.
G07C 5/08 (2006.01)
G07C 5/00 (2006.01)
G06Q 40/08 (2012.01)
G06Q 10/00 (2012.01)

(52) U.S. Cl.
CPC .......... *G07C 5/0866* (2013.01); *G06Q 40/08* (2013.01); *G07C 5/008* (2013.01); *G07C 5/085* (2013.01); *G06Q 10/00* (2013.01); *G07C 5/0891* (2013.01)

(58) Field of Classification Search
CPC .......... G07C 5/008; G07C 5/08; G07C 5/006
See application file for complete search history.

(56) References Cited

U.S. PATENT DOCUMENTS

| 673,203 A | 4/1901 | Freund |
| 673,795 A | 5/1901 | Hammer |
| 673,907 A | 5/1901 | Johnson |
| 676,075 A | 6/1901 | McDougall |
| 679,511 A | 7/1901 | Richards |
| 681,036 A | 8/1901 | Burg |
| 681,283 A | 8/1901 | Waynick |
| 681,998 A | 9/1901 | Swift |
| 683,155 A | 9/1901 | Thompson |
| 683,214 A | 9/1901 | Mansfield |

(Continued)

FOREIGN PATENT DOCUMENTS

| CA | 2469728 | 12/2005 |
| CA | 2469728 A1 | 12/2005 |

(Continued)

OTHER PUBLICATIONS

Adaptec published and sold its VideoOh! DVD software USB 2.0 Edition in at least Jan. 24, 2003.

(Continued)

*Primary Examiner* — Julie M Shanker
(74) *Attorney, Agent, or Firm* — Esplin & Associates, PC

(57) ABSTRACT

Vehicle recorder systems are arranged in configured with a video camera, light-weight memory systems, and radio communications facility suitable for use in conjunction with an automobile. An automobile equipped with these video recorder systems used normally throughout the service today, provides a video record of unusual events which may occur from time-to-time. Events such as accidents, near-miss incidents, driving of use, among others, trigger a system to preserve video images collected before and after the moment of the event. Replay of these images yield information regarding cause and true nature of the event. These systems are particularly arranged about, and in support of fleet use of vehicles. That is, groups of vehicles are arranged and coupled together whereby a plurality of such vehicles may communicate with a common system providing a fleet manager advanced fleet management tools.

7 Claims, 12 Drawing Sheets

(56) References Cited

U.S. PATENT DOCUMENTS

| | | |
|---|---|---|
| 684,276 A | 10/1901 | Lonergan |
| 685,082 A | 10/1901 | Wood |
| 685,969 A | 11/1901 | Campbell |
| 686,545 A | 11/1901 | Selph |
| 689,849 A | 12/1901 | Brown |
| 691,982 A | 1/1902 | Sturgis |
| 692,834 A | 2/1902 | Davis |
| 694,781 A | 3/1902 | Prinz |
| 2,943,141 A | 6/1960 | Knight |
| 3,634,866 A | 1/1972 | Meyer |
| 3,781,824 A | 12/1973 | Caiati |
| 3,812,287 A | 5/1974 | Lemelson |
| 3,885,090 A | 5/1975 | Rosenbaum |
| 3,992,656 A | 11/1976 | Joy |
| 4,054,752 A | 10/1977 | Dennis |
| 4,072,850 A | 2/1978 | McGlynn |
| 4,258,421 A | 3/1981 | Juhasz |
| 4,271,358 A | 6/1981 | Schwarz |
| 4,276,609 A | 6/1981 | Patel |
| 4,280,151 A | 7/1981 | Tsunekawa |
| 4,281,354 A | 7/1981 | Conte |
| 4,401,976 A | 8/1983 | Stadelmayr |
| 4,409,670 A | 10/1983 | Herndon |
| 4,420,773 A | 12/1983 | Toyoda |
| 4,425,097 A | 1/1984 | Owens |
| 4,456,931 A | 6/1984 | Toyoda |
| 4,489,351 A | 12/1984 | d'Alayer de Costemore d'Arc |
| 4,496,995 A | 1/1985 | Colles |
| 4,500,868 A | 2/1985 | Tokitsu |
| 4,528,547 A | 7/1985 | Rodney |
| 4,533,962 A | 8/1985 | Decker |
| 4,558,379 A | 12/1985 | Huetter |
| 4,588,267 A | 5/1986 | Pastore |
| 4,593,313 A | 6/1986 | Nagasaki |
| 4,621,335 A | 11/1986 | Bluish |
| 4,625,210 A | 11/1986 | Sagl |
| 4,630,110 A | 12/1986 | Cotton |
| 4,632,348 A | 12/1986 | Keesling |
| 4,638,289 A | 1/1987 | Zottnik |
| 4,646,241 A | 2/1987 | Ratchford |
| 4,651,143 A | 3/1987 | Yamanaka |
| 4,671,111 A | 6/1987 | Lemelson |
| 4,718,685 A | 1/1988 | Kawabe |
| 4,754,255 A | 6/1988 | Sanders |
| 4,758,888 A | 7/1988 | Lapidot |
| 4,763,745 A | 8/1988 | Eto |
| 4,785,474 A | 11/1988 | Bernstein |
| 4,789,904 A | 12/1988 | Peterson |
| 4,794,566 A | 12/1988 | Richards |
| 4,804,937 A | 2/1989 | Barbiaux |
| 4,806,931 A | 2/1989 | Nelson |
| 4,807,096 A | 2/1989 | Skogler |
| 4,814,896 A | 3/1989 | Heitzman |
| 4,837,628 A | 6/1989 | Sasaki |
| 4,839,631 A | 6/1989 | Tsuji |
| 4,843,463 A | 6/1989 | Michetti |
| 4,843,578 A | 6/1989 | Wade |
| 4,853,856 A | 8/1989 | Hanway |
| 4,853,859 A | 8/1989 | Morita |
| 4,866,616 A | 9/1989 | Takeuchi |
| 4,876,597 A | 10/1989 | Roy |
| 4,883,349 A | 11/1989 | Mittelhaeuser |
| 4,896,855 A | 1/1990 | Furnish |
| 4,926,331 A | 5/1990 | Windle |
| 4,930,742 A | 6/1990 | Schofield |
| 4,936,533 A | 6/1990 | Adams |
| 4,939,652 A | 7/1990 | Steiner |
| 4,942,464 A | 7/1990 | Milatz |
| 4,945,244 A | 7/1990 | Castleman |
| 4,949,186 A | 8/1990 | Peterson |
| 4,980,913 A | 12/1990 | Skret |
| 4,987,541 A | 1/1991 | Levente |
| 4,992,943 A | 2/1991 | McCracken |
| 4,993,068 A | 2/1991 | Piosenka |
| 4,995,086 A | 2/1991 | Lilley |
| 5,012,335 A | 4/1991 | Cohodar |
| 5,027,104 A | 6/1991 | Reid |
| 5,046,007 A | 9/1991 | McCrery |
| 5,050,166 A | 9/1991 | Cantoni |
| 5,056,056 A | 10/1991 | Gustin |
| 5,057,820 A | 10/1991 | Markson |
| 5,096,287 A | 3/1992 | Kakinami |
| 5,100,095 A | 3/1992 | Haan |
| 5,111,289 A | 5/1992 | Lucas |
| 5,140,434 A | 8/1992 | Van |
| 5,140,436 A | 8/1992 | Blessinger |
| 5,140,438 A | 8/1992 | Blessinger |
| 5,144,661 A | 9/1992 | Shamosh |
| 5,178,448 A | 1/1993 | Adams |
| 5,185,700 A | 2/1993 | Bezos |
| 5,196,938 A | 3/1993 | Blessinger |
| 5,223,844 A | 6/1993 | Mansell |
| 5,224,211 A | 6/1993 | Roe |
| 5,262,813 A | 11/1993 | Scharton |
| 5,283,433 A | 2/1994 | Tsien |
| 5,294,978 A | 3/1994 | Katayama |
| 5,305,214 A | 4/1994 | Komatsu |
| 5,305,216 A | 4/1994 | Okura |
| 5,308,247 A | 5/1994 | Dyrdek |
| 5,309,485 A | 5/1994 | Chao |
| 5,311,197 A | 5/1994 | Sorden |
| 5,321,753 A | 6/1994 | Gritton |
| 5,327,288 A | 7/1994 | Wellington |
| 5,330,149 A | 7/1994 | Haan |
| 5,333,759 A | 8/1994 | Deering |
| 5,343,527 A | 8/1994 | Moore |
| 5,353,023 A | 10/1994 | Mitsugi |
| 5,361,326 A | 11/1994 | Aparicio |
| 5,387,926 A | 2/1995 | Bellan |
| 5,388,045 A | 2/1995 | Kamiya |
| 5,388,208 A | 2/1995 | Weingartner |
| 5,404,330 A | 4/1995 | Lee |
| 5,408,330 A | 4/1995 | Squicciarini |
| 5,422,543 A | 6/1995 | Weinberg |
| 5,430,431 A | 7/1995 | Nelson |
| 5,430,432 A | 7/1995 | Camhi |
| 5,435,184 A | 7/1995 | Pineroli |
| 5,445,024 A | 8/1995 | Riley |
| 5,445,027 A | 8/1995 | Zoerner |
| 5,446,659 A | 8/1995 | Yamawaki |
| 5,455,625 A | 10/1995 | Englander |
| 5,455,716 A | 10/1995 | Suman |
| 5,465,079 A | 11/1995 | Bouchard |
| 5,473,729 A | 12/1995 | Bryant |
| 5,477,141 A | 12/1995 | Naether |
| 5,495,242 A | 2/1996 | Kick |
| 5,495,243 A | 2/1996 | McKenna |
| 5,497,419 A | 3/1996 | Hill |
| 5,499,182 A | 3/1996 | Ousborne |
| 5,504,482 A | 4/1996 | Schreder |
| 5,505,076 A | 4/1996 | Parkman |
| 5,513,011 A | 4/1996 | Matsumoto |
| 5,515,285 A | 5/1996 | Garrett |
| 5,519,260 A | 5/1996 | Washington |
| 5,521,633 A | 5/1996 | Nakajima |
| 5,523,811 A | 6/1996 | Wada |
| 5,526,269 A | 6/1996 | Ishibashi |
| 5,530,420 A | 6/1996 | Tsuchiya |
| 5,532,678 A | 7/1996 | Kin |
| 5,537,156 A | 7/1996 | Katayama |
| 5,539,454 A | 7/1996 | Williams |
| 5,541,590 A | 7/1996 | Nishio |
| 5,544,060 A | 8/1996 | Fujii |
| 5,546,191 A | 8/1996 | Hibi |
| 5,546,305 A | 8/1996 | Kondo |
| 5,548,273 A | 8/1996 | Nicol |
| 5,552,990 A | 9/1996 | Ihara |
| 5,559,496 A | 9/1996 | Dubats |
| 5,568,211 A | 10/1996 | Bamford |
| 5,570,087 A | 10/1996 | Lemelson |
| 5,570,127 A | 10/1996 | Schmidt |
| 5,574,424 A | 11/1996 | Nguyen |
| 5,574,443 A | 11/1996 | Hsieh |
| D376,571 S | 12/1996 | Kokat |

(56) References Cited

U.S. PATENT DOCUMENTS

| | | | |
|---|---|---|---|
| 5,581,464 A | 12/1996 | Woll | |
| 5,586,130 A | 12/1996 | Doyle | |
| 5,590,948 A | 1/1997 | Moreno | |
| 5,596,382 A | 1/1997 | Bamford | |
| 5,596,647 A | 1/1997 | Wakai | |
| 5,600,775 A | 2/1997 | King | |
| 5,608,272 A | 3/1997 | Tanguay | |
| 5,610,580 A | 3/1997 | Lai | |
| 5,612,686 A | 3/1997 | Takano | |
| 5,631,638 A | 5/1997 | Kaspar | |
| 5,638,273 A | 6/1997 | Coiner | |
| 5,642,106 A | 6/1997 | Hancock | |
| 5,646,856 A | 7/1997 | Kaesser | |
| 5,652,706 A | 7/1997 | Morimoto | |
| RE35,590 E | 8/1997 | Bezos | |
| 5,654,892 A | 8/1997 | Fujii | |
| 5,659,355 A | 8/1997 | Barron | |
| 5,666,120 A | 9/1997 | Kline | |
| 5,667,176 A | 9/1997 | Zamarripa | |
| 5,669,698 A | 9/1997 | Veldman | |
| 5,671,451 A | 9/1997 | Takahashi | |
| 5,677,979 A | 10/1997 | Squicciarini | |
| 5,680,117 A | 10/1997 | Arai | |
| 5,680,123 A | 10/1997 | Lee | |
| 5,686,765 A | 11/1997 | Washington | |
| 5,686,889 A | 11/1997 | Hillis | |
| 5,689,442 A | 11/1997 | Swanson | |
| 5,696,705 A | 12/1997 | Zykan | |
| 5,706,362 A | 1/1998 | Yabe | |
| 5,706,909 A | 1/1998 | Bevins | |
| 5,712,679 A | 1/1998 | Coles | |
| 5,717,456 A | 2/1998 | Rudt | |
| 5,719,554 A | 2/1998 | Gagnon | |
| 5,758,299 A | 5/1998 | Sandborg | |
| 5,781,101 A | 7/1998 | Stephen | |
| 5,781,145 A | 7/1998 | Williams | |
| 5,784,007 A | 7/1998 | Pepper | |
| 5,784,021 A | 7/1998 | Oliva | |
| 5,784,521 A | 7/1998 | Nakatani | |
| 5,790,403 A | 8/1998 | Nakayama | |
| 5,790,973 A | 8/1998 | Blaker | |
| 5,793,308 A | 8/1998 | Rosinski | |
| 5,793,420 A | 8/1998 | Schmidt | |
| 5,793,739 A | 8/1998 | Tanaka | |
| 5,793,985 A | 8/1998 | Natarajan | |
| 5,794,165 A | 8/1998 | Minowa | |
| 5,797,134 A | 8/1998 | McMillan | |
| 5,798,458 A | 8/1998 | Monroe | |
| 5,800,040 A | 9/1998 | Santo | |
| 5,802,545 A | 9/1998 | Coverdill | |
| 5,802,727 A | 9/1998 | Blank | |
| 5,805,079 A | 9/1998 | Lemelson | |
| 5,813,745 A | 9/1998 | Fant | |
| 5,815,071 A | 9/1998 | Doyle | |
| 5,815,093 A | 9/1998 | Kikinis | |
| 5,819,198 A | 10/1998 | Peretz | |
| 5,825,284 A | 10/1998 | Dunwoody | |
| 5,825,412 A | 10/1998 | Hobson | |
| 5,844,505 A | 12/1998 | Van | |
| 5,845,733 A | 12/1998 | Wolfsen | |
| 5,867,802 A | 2/1999 | Borza | |
| 5,877,897 A | 3/1999 | Schofield | |
| 5,896,167 A | 4/1999 | Omae | |
| 5,897,602 A | 4/1999 | Mizuta | |
| 5,897,606 A | 4/1999 | Miura | |
| 5,899,956 A | 5/1999 | Chan | |
| 5,901,806 A | 5/1999 | Takahashi | |
| 5,914,748 A | 6/1999 | Parulski | |
| 5,919,239 A | 7/1999 | Fraker | |
| 5,926,210 A | 7/1999 | Hackett | |
| 5,928,291 A * | 7/1999 | Jenkins et al. | 701/1 |
| 5,938,321 A | 8/1999 | Bos | |
| 5,946,404 A | 8/1999 | Bakshi | |
| 5,948,038 A | 9/1999 | Daly | |
| 5,959,367 A | 9/1999 | Ofarrell | |
| 5,978,017 A | 11/1999 | Tino | |
| 6,002,326 A | 12/1999 | Turner | |
| 6,006,148 A | 12/1999 | Strong | |
| 6,008,723 A | 12/1999 | Yassan | |
| 6,008,841 A | 12/1999 | Charlson | |
| 6,009,370 A | 12/1999 | Minowa | |
| 6,011,492 A | 1/2000 | Garesche | |
| RE36,590 E | 2/2000 | Yanagi | |
| 6,028,528 A | 2/2000 | Lorenzetti | |
| 6,037,860 A | 3/2000 | Zander | |
| 6,037,977 A | 3/2000 | Peterson | |
| 6,041,410 A | 3/2000 | Hsu | |
| 6,049,079 A | 4/2000 | Noordam | |
| 6,057,754 A | 5/2000 | Kinoshita | |
| 6,060,989 A | 5/2000 | Gehlot | |
| 6,064,792 A | 5/2000 | Fox | |
| 6,067,488 A | 5/2000 | Tano | |
| 6,076,026 A | 6/2000 | Jambhekar | |
| 6,084,870 A * | 7/2000 | Wooten et al. | 370/349 |
| 6,088,635 A | 7/2000 | Cox et al. | |
| 6,092,008 A | 7/2000 | Bateman | |
| 6,092,021 A | 7/2000 | Ehlbeck | |
| 6,092,193 A | 7/2000 | Loomis | |
| 6,100,811 A | 8/2000 | Hsu | |
| 6,111,254 A | 8/2000 | Eden | |
| 6,118,768 A | 9/2000 | Bhatia | |
| 6,122,738 A | 9/2000 | Millard | |
| 6,141,611 A | 10/2000 | Mackey | |
| 6,144,296 A | 11/2000 | Ishida | |
| 6,147,598 A | 11/2000 | Murphy | |
| 6,151,065 A | 11/2000 | Steed | |
| 6,163,338 A | 12/2000 | Johnson | |
| 6,163,749 A | 12/2000 | McDonough | |
| 6,167,186 A | 12/2000 | Kawasaki | |
| 6,170,742 B1 | 1/2001 | Yacoob | |
| 6,181,373 B1 | 1/2001 | Coles | |
| 6,182,010 B1 | 1/2001 | Berstis | |
| 6,185,490 B1 | 2/2001 | Ferguson | |
| 6,195,605 B1 | 2/2001 | Tabler | |
| 6,200,139 B1 | 3/2001 | Clapper | |
| 6,208,919 B1 | 3/2001 | Barkesseh | |
| 6,211,907 B1 | 4/2001 | Scaman | |
| 6,218,960 B1 | 4/2001 | Ishikawa | |
| 6,246,933 B1 | 6/2001 | Bague | |
| 6,246,934 B1 | 6/2001 | Otake | |
| 6,252,544 B1 | 6/2001 | Hoffberg | |
| 6,253,129 B1 | 6/2001 | Jenkins | |
| 6,259,475 B1 | 7/2001 | Ramachandran | |
| 6,263,265 B1 | 7/2001 | Fera | |
| 6,266,588 B1 | 7/2001 | McClellan | |
| 6,298,290 B1 | 10/2001 | Abe et al. | |
| 6,300,875 B1 | 10/2001 | Schafer | |
| 6,317,682 B1 * | 11/2001 | Ogura | G08G 1/096716 340/993 |
| 6,324,450 B1 | 11/2001 | Iwama | |
| 6,333,759 B1 | 12/2001 | Mazzilli | |
| 6,337,622 B1 | 1/2002 | Sugano | |
| 6,349,250 B1 | 2/2002 | Hart | |
| 6,353,734 B1 | 3/2002 | Wright | |
| 6,356,823 B1 | 3/2002 | Iannotti | |
| 6,360,147 B1 | 3/2002 | Lee | |
| 6,366,207 B1 | 4/2002 | Murphy | |
| 6,389,339 B1 | 5/2002 | Just | |
| 6,389,340 B1 * | 5/2002 | Rayner | B60R 1/00 340/438 |
| 6,400,835 B1 | 6/2002 | Lemelson | |
| 6,405,112 B1 | 6/2002 | Rayner | |
| 6,405,132 B1 | 6/2002 | Breed | |
| 6,408,232 B1 | 6/2002 | Cannon | |
| 6,411,874 B2 | 6/2002 | Morgan et al. | |
| 6,421,080 B1 | 7/2002 | Lambert | |
| 6,429,773 B1 | 8/2002 | Schuyler | |
| 6,434,510 B1 | 8/2002 | Callaghan | |
| 6,449,540 B1 | 9/2002 | Rayner | |
| 6,456,321 B1 | 9/2002 | Ito | |
| 6,459,988 B1 | 10/2002 | Fan | |
| 6,470,241 B2 | 10/2002 | Yoshikawa | |
| 6,472,771 B1 | 10/2002 | Frese et al. | |
| 6,490,513 B1 | 12/2002 | Fish | |

(56) References Cited

U.S. PATENT DOCUMENTS

| | | |
|---|---|---|
| 6,493,650 B1 | 12/2002 | Rodgers |
| 6,505,106 B1 | 1/2003 | Lawrence |
| 6,507,838 B1 | 1/2003 | Syeda-Mahmood |
| 6,508,400 B1 | 1/2003 | Ishifuji |
| 6,516,256 B1 | 2/2003 | Hartmann |
| 6,518,881 B2 | 2/2003 | Monroe |
| 6,525,672 B2 | 2/2003 | Chainer |
| 6,526,352 B1 | 2/2003 | Breed |
| 6,529,159 B1 | 3/2003 | Fan |
| 6,535,804 B1 | 3/2003 | Chun |
| 6,552,682 B1 | 4/2003 | Fan |
| 6,553,308 B1 | 4/2003 | Uhlmann |
| 6,556,905 B1 | 4/2003 | Mittelsteadt et al. |
| 6,559,769 B2 | 5/2003 | Anthony |
| 6,574,538 B2 | 6/2003 | Sasaki |
| 6,575,902 B1 | 6/2003 | Burton |
| 6,580,373 B1 | 6/2003 | Ohashi |
| 6,580,983 B2 | 6/2003 | Laguer-Diaz |
| 6,593,848 B1 | 7/2003 | Atkins, III |
| 6,594,576 B2 | 7/2003 | Fan |
| 6,611,740 B2 | 8/2003 | Lowrey et al. |
| 6,611,755 B1 | 8/2003 | Coffee |
| 6,624,611 B2 | 9/2003 | Kirmuss |
| 6,629,029 B1 | 9/2003 | Giles |
| 6,629,030 B2 | 9/2003 | Klausner |
| 6,636,791 B2 | 10/2003 | Okada |
| 6,664,922 B1 | 12/2003 | Fan |
| 6,665,613 B2 | 12/2003 | Duvall |
| 6,679,702 B1 | 1/2004 | Rau |
| 6,684,137 B2 | 1/2004 | Takagi et al. |
| 6,694,483 B1 | 2/2004 | Nagata |
| 6,701,234 B1 | 3/2004 | Vogelsang |
| 6,714,894 B1 | 3/2004 | Tobey |
| 6,718,239 B2 | 4/2004 | Rayner |
| 6,721,640 B2 | 4/2004 | Glenn |
| 6,721,652 B1 | 4/2004 | Sanqunetti |
| 6,728,612 B1 | 4/2004 | Carver et al. |
| 6,732,031 B1 | 5/2004 | Lightner et al. |
| 6,732,032 B1 | 5/2004 | Banet et al. |
| 6,735,503 B2 | 5/2004 | Ames |
| 6,737,954 B2 | 5/2004 | Chainer et al. |
| 6,738,697 B2 * | 5/2004 | Breed ............ 701/31.5 |
| 6,739,078 B2 | 5/2004 | Morley et al. |
| 6,741,168 B2 | 5/2004 | Webb |
| 6,745,153 B2 | 6/2004 | White |
| 6,747,692 B2 | 6/2004 | Patel |
| 6,748,305 B1 | 6/2004 | Klausner |
| 6,760,757 B1 | 7/2004 | Lundberg et al. |
| 6,762,513 B2 | 7/2004 | Landgraf |
| 6,779,716 B1 | 8/2004 | Grow |
| 6,795,017 B1 | 9/2004 | Puranik |
| 6,795,111 B1 | 9/2004 | Mazzilli |
| 6,795,759 B2 | 9/2004 | Doyle |
| 6,798,743 B1 | 9/2004 | Ma |
| 6,804,590 B2 | 10/2004 | Sato |
| 6,810,362 B2 | 10/2004 | Adachi et al. |
| 6,812,831 B2 | 11/2004 | Ikeda |
| 6,819,989 B2 | 11/2004 | Maeda et al. |
| 6,831,556 B1 | 12/2004 | Boykin |
| 6,832,140 B2 | 12/2004 | Fan |
| 6,832,141 B2 | 12/2004 | Skeen et al. |
| 6,836,712 B2 | 12/2004 | Nishina |
| 6,842,762 B2 | 1/2005 | Raithel et al. |
| 6,847,873 B1 | 1/2005 | Li |
| 6,859,695 B2 | 2/2005 | Klausner |
| 6,859,705 B2 | 2/2005 | Rao |
| 6,862,524 B1 | 3/2005 | Nagda |
| 6,865,457 B1 | 3/2005 | Mittelsteadt et al. |
| 6,867,733 B2 | 3/2005 | Sandhu |
| 6,873,261 B2 | 3/2005 | Anthony |
| 6,882,313 B1 | 4/2005 | Fan |
| 6,882,912 B2 | 4/2005 | DiLodovico |
| 6,894,606 B2 | 5/2005 | Forbes |
| 6,895,248 B1 | 5/2005 | Akyol |
| 6,898,492 B2 | 5/2005 | de Leon et al. |
| 6,898,493 B2 | 5/2005 | Ehrman |
| 6,850,823 B2 | 7/2005 | Eun et al. |
| 6,919,823 B1 | 7/2005 | Lock |
| 6,922,566 B2 | 7/2005 | Puranik |
| 6,928,348 B1 | 8/2005 | Lightner et al. |
| 6,931,309 B2 | 8/2005 | Phelan |
| 6,947,817 B2 | 9/2005 | Diem |
| 6,950,122 B1 | 9/2005 | Mirabile |
| 6,954,223 B2 | 10/2005 | Miyazawa |
| 6,954,689 B2 | 10/2005 | Hanson |
| 6,988,034 B1 | 1/2006 | Marlatt |
| 7,003,289 B1 | 2/2006 | Kolls |
| 7,012,632 B2 | 3/2006 | Freeman |
| 7,020,548 B2 | 3/2006 | Saito |
| 7,023,333 B2 | 4/2006 | Blanco |
| 7,027,621 B1 | 4/2006 | Prokoski |
| 7,039,510 B2 | 5/2006 | Gumpinger |
| 7,076,348 B2 | 7/2006 | Bucher |
| 7,079,927 B1 | 7/2006 | Tano |
| 7,082,359 B2 | 7/2006 | Breed |
| 7,082,382 B1 | 7/2006 | Rose et al. |
| 7,088,387 B1 | 8/2006 | Freeman |
| 7,095,782 B1 | 8/2006 | Cohen |
| 7,098,812 B2 | 8/2006 | Hirota |
| 7,100,190 B2 | 8/2006 | Johnson |
| 7,113,853 B2 | 9/2006 | Hecklinger |
| 7,117,075 B1 | 10/2006 | Larschan |
| 7,119,832 B2 | 10/2006 | Blanco |
| 7,138,904 B1 | 11/2006 | Dutu |
| 7,155,321 B2 | 12/2006 | Bromley |
| 7,177,738 B2 | 2/2007 | Diaz |
| 7,209,833 B2 | 4/2007 | Isaji |
| 7,239,252 B2 | 7/2007 | Kato |
| 7,254,482 B2 | 8/2007 | Kawasaki |
| 7,265,663 B2 | 9/2007 | Steele |
| 7,266,507 B2 | 9/2007 | Simon |
| 7,272,179 B2 | 9/2007 | Siemens |
| 7,308,341 B2 | 12/2007 | Schofield |
| 7,317,974 B2 | 1/2008 | Luskin |
| 7,343,306 B1 | 3/2008 | Bates |
| 7,348,895 B2 | 3/2008 | Lagassey |
| 7,349,027 B2 | 3/2008 | Endo |
| 7,370,261 B2 | 5/2008 | Winarski |
| 7,382,933 B2 | 6/2008 | Dorai |
| 7,386,376 B2 | 6/2008 | Basir |
| 7,389,178 B2 | 6/2008 | Raz |
| 7,457,693 B2 | 11/2008 | Olsen |
| 7,471,189 B2 | 12/2008 | Vastad |
| 7,471,192 B2 | 12/2008 | Hara |
| 7,536,457 B2 | 5/2009 | Miller |
| 7,548,586 B1 | 6/2009 | Mimar |
| 7,561,054 B2 | 7/2009 | Raz |
| 7,584,033 B2 | 9/2009 | Mittelsteadt |
| 7,596,439 B2 | 9/2009 | Oesterling |
| 7,623,754 B1 | 11/2009 | McKain |
| 7,659,827 B2 | 2/2010 | Gunderson |
| 7,659,835 B2 | 2/2010 | Jung |
| 7,667,731 B2 | 2/2010 | Kreiner |
| 7,689,001 B2 | 3/2010 | Kim |
| 7,702,442 B2 | 4/2010 | Takenaka |
| 7,725,216 B2 | 5/2010 | Kim |
| 7,768,548 B2 | 8/2010 | Silvernail |
| 7,769,499 B2 | 8/2010 | McQuade |
| 7,783,956 B2 | 8/2010 | Ko |
| 7,804,426 B2 | 9/2010 | Etcheson |
| 7,821,421 B2 | 10/2010 | Tamir |
| 7,845,560 B2 | 12/2010 | Emanuel |
| 7,853,376 B2 | 12/2010 | Peng |
| 7,868,912 B2 | 1/2011 | Venetianer |
| 7,893,958 B1 | 2/2011 | DAgostino |
| 7,904,219 B1 | 3/2011 | Lowrey |
| 7,940,250 B2 | 5/2011 | Forstall |
| 7,941,258 B1 | 5/2011 | Mittelsteadt |
| 7,974,748 B2 | 7/2011 | Goerick |
| 7,984,146 B2 | 7/2011 | Rozak |
| 8,054,168 B2 | 11/2011 | McCormick |
| 8,068,979 B2 | 11/2011 | Breed |
| 8,090,598 B2 | 1/2012 | Bauer |
| 8,113,844 B2 | 2/2012 | Huang |

(56) References Cited

U.S. PATENT DOCUMENTS

| | | |
|---|---|---|
| 8,139,820 B2 | 3/2012 | Plante |
| 8,140,265 B2 | 3/2012 | Grush |
| 8,140,358 B1 | 3/2012 | Ling |
| 8,152,198 B2 | 4/2012 | Breed |
| 8,239,092 B2 | 8/2012 | Plante |
| 8,269,617 B2 | 9/2012 | Cook |
| 8,311,858 B2 | 11/2012 | Everett |
| 8,314,708 B2 | 11/2012 | Gunderson |
| 8,321,066 B2 | 11/2012 | Becker |
| 8,373,567 B2 | 2/2013 | Denson |
| 8,417,562 B1 | 4/2013 | Siemens |
| 8,423,009 B2 | 4/2013 | Srinivasan |
| 8,442,690 B2 | 5/2013 | Goldstein |
| 8,471,701 B2 | 6/2013 | Yariv |
| 8,508,353 B2 | 8/2013 | Cook |
| 8,538,696 B1 | 9/2013 | Cassanova |
| 8,538,785 B2 | 9/2013 | Coleman |
| 8,564,426 B2 | 10/2013 | Cook |
| 8,564,446 B2 | 10/2013 | Gunderson |
| 8,571,755 B2 | 10/2013 | Plante |
| 8,577,703 B2 | 11/2013 | McClellan |
| 8,606,492 B1 | 12/2013 | Botnen |
| 8,634,958 B1 | 1/2014 | Chiappetta |
| 8,635,557 B2 | 1/2014 | Geise |
| 8,676,428 B2 | 3/2014 | Richardson |
| 8,744,642 B2 | 6/2014 | Nemat-Nasser |
| 8,775,067 B2 | 7/2014 | Cho |
| 8,781,292 B1 | 7/2014 | Ross |
| 8,803,695 B2 | 8/2014 | Denson |
| 8,805,110 B2 | 8/2014 | Rhoads |
| 8,849,501 B2 | 9/2014 | Cook |
| 8,855,847 B2 | 10/2014 | Uehara |
| 8,862,395 B2 | 10/2014 | Richardson |
| 8,868,288 B2 | 10/2014 | Plante |
| 8,880,279 B2 | 11/2014 | Plante |
| 8,892,310 B1 | 11/2014 | Palmer |
| 8,989,959 B2 | 3/2015 | Plante |
| 8,996,234 B1 | 3/2015 | Tamari |
| 8,996,240 B2 | 3/2015 | Plante |
| 9,047,721 B1 | 6/2015 | Botnen |
| 9,085,362 B1 | 7/2015 | Kilian |
| 9,183,679 B2 | 11/2015 | Plante |
| 9,201,842 B2 | 12/2015 | Plante |
| 9,208,129 B2 | 12/2015 | Plante |
| 9,226,004 B1 | 12/2015 | Plante |
| 9,240,079 B2 | 1/2016 | Lambert |
| 9,373,203 B1 | 6/2016 | Fields |
| 9,607,526 B1 | 3/2017 | Hsu-Hoffman |
| 9,610,955 B2 | 4/2017 | Palmer |
| 9,715,711 B1 | 7/2017 | Konrardy |
| 9,754,325 B1 | 9/2017 | Konrardy |
| 9,767,516 B1 | 9/2017 | Konrardy |
| 9,786,154 B1 | 10/2017 | Potter |
| 9,792,656 B1 | 10/2017 | Konrardy |
| 9,805,423 B1 | 10/2017 | Konrardy |
| 9,805,601 B1 | 10/2017 | Fields |
| 9,858,621 B1 | 1/2018 | Konrardy |
| 9,868,394 B1 | 1/2018 | Fields |
| 9,870,649 B1 | 1/2018 | Fields |
| 9,942,526 B2 | 4/2018 | Plante |
| 10,222,228 B1 | 3/2019 | Chan |
| 10,360,739 B2 | 7/2019 | Palmer |
| 10,404,951 B2 | 9/2019 | Plante |
| 10,497,187 B2 | 12/2019 | Palmer |
| 2001/0005217 A1 | 6/2001 | Hamilton |
| 2001/0005804 A1 | 6/2001 | Rayner |
| 2001/0018628 A1 | 8/2001 | Jenkins |
| 2001/0020204 A1 | 9/2001 | Runyon |
| 2001/0020902 A1 * | 9/2001 | Tamura ............. G01C 21/3697 340/905 |
| 2001/0052730 A1 | 12/2001 | Baur |
| 2002/0019689 A1 | 2/2002 | Harrison |
| 2002/0027502 A1 | 3/2002 | Mayor |
| 2002/0029109 A1 | 3/2002 | Wong |
| 2002/0035422 A1 | 3/2002 | Sasaki |
| 2002/0044225 A1 | 4/2002 | Rakib |
| 2002/0059453 A1 | 5/2002 | Eriksson |
| 2002/0061758 A1 | 5/2002 | Zarlengo |
| 2002/0067076 A1 | 6/2002 | Talbot |
| 2002/0087240 A1 | 7/2002 | Raithel |
| 2002/0091473 A1 | 7/2002 | Gardner et al. |
| 2002/0105438 A1 | 8/2002 | Forbes |
| 2002/0107619 A1 | 8/2002 | Klausner |
| 2002/0111725 A1 | 8/2002 | Burge |
| 2002/0111756 A1 | 8/2002 | Modgil |
| 2002/0118206 A1 | 8/2002 | Knittel |
| 2002/0120374 A1 | 8/2002 | Douros |
| 2002/0135679 A1 | 9/2002 | Scaman |
| 2002/0138587 A1 | 9/2002 | Koehler |
| 2002/0156558 A1 | 10/2002 | Hanson |
| 2002/0163532 A1 | 11/2002 | Thomas |
| 2002/0169529 A1 | 11/2002 | Kim |
| 2002/0169530 A1 | 11/2002 | Laguer-Diaz et al. |
| 2002/0170064 A1 | 11/2002 | Monroe |
| 2002/0183905 A1 | 12/2002 | Maeda et al. |
| 2003/0016753 A1 | 1/2003 | Kim |
| 2003/0028298 A1 | 2/2003 | Macky et al. |
| 2003/0053433 A1 | 3/2003 | Chun |
| 2003/0055557 A1 | 3/2003 | Dutta |
| 2003/0055666 A1 | 3/2003 | Roddy |
| 2003/0065805 A1 | 4/2003 | Barnes |
| 2003/0067541 A1 | 4/2003 | Joao |
| 2003/0079041 A1 | 4/2003 | Parrella |
| 2003/0080713 A1 | 5/2003 | Kirmuss |
| 2003/0080878 A1 | 5/2003 | Kirmuss |
| 2003/0081121 A1 | 5/2003 | Kirmuss |
| 2003/0081122 A1 | 5/2003 | Kirmuss |
| 2003/0081123 A1 | 5/2003 | Rupe |
| 2003/0081127 A1 | 5/2003 | Kirmuss |
| 2003/0081128 A1 | 5/2003 | Kirmuss |
| 2003/0081934 A1 | 5/2003 | Kirmuss |
| 2003/0081935 A1 | 5/2003 | Kirmuss |
| 2003/0095688 A1 | 5/2003 | Kirmuss |
| 2003/0112133 A1 | 6/2003 | Webb |
| 2003/0125854 A1 | 7/2003 | Kawasaki |
| 2003/0137194 A1 | 7/2003 | White |
| 2003/0144775 A1 | 7/2003 | Klausner |
| 2003/0152145 A1 | 8/2003 | Kawakita |
| 2003/0154009 A1 | 8/2003 | Basir et al. |
| 2003/0158638 A1 | 8/2003 | Yakes |
| 2003/0177187 A1 | 9/2003 | Levine |
| 2003/0187704 A1 | 10/2003 | Hashiguchi |
| 2003/0191568 A1 | 10/2003 | Breed |
| 2003/0195678 A1 | 10/2003 | Betters |
| 2003/0201875 A1 | 10/2003 | Kuo |
| 2003/0214585 A1 | 11/2003 | Bakewell |
| 2003/0220835 A1 | 11/2003 | Barnes |
| 2003/0222880 A1 | 12/2003 | Waterman |
| 2004/0008255 A1 | 1/2004 | Lewellen |
| 2004/0032493 A1 | 2/2004 | Franke |
| 2004/0033058 A1 | 2/2004 | Reich |
| 2004/0039503 A1 | 2/2004 | Doyle |
| 2004/0039504 A1 | 2/2004 | Coffee |
| 2004/0044452 A1 | 3/2004 | Bauer et al. |
| 2004/0044592 A1 | 3/2004 | Ubik |
| 2004/0054444 A1 | 3/2004 | Abeska |
| 2004/0054513 A1 | 3/2004 | Laird |
| 2004/0054689 A1 | 3/2004 | Salmonsen |
| 2004/0064245 A1 | 4/2004 | Knockeart |
| 2004/0070926 A1 | 4/2004 | Boykin |
| 2004/0083041 A1 | 4/2004 | Skeen et al. |
| 2004/0088090 A1 | 5/2004 | Wee |
| 2004/0103008 A1 | 5/2004 | Wahlbin |
| 2004/0103010 A1 | 5/2004 | Wahlbin |
| 2004/0104842 A1 | 6/2004 | Drury |
| 2004/0111189 A1 | 6/2004 | Miyazawa |
| 2004/0117638 A1 | 6/2004 | Monroe |
| 2004/0135979 A1 | 7/2004 | Hazelton |
| 2004/0138794 A1 | 7/2004 | Saito et al. |
| 2004/0145457 A1 | 7/2004 | Schofield et al. |
| 2004/0153244 A1 | 8/2004 | Kellum |
| 2004/0153362 A1 | 8/2004 | Bauer |
| 2004/0167689 A1 | 8/2004 | Bromley |
| 2004/0179600 A1 | 9/2004 | Wells |

(56) References Cited

U.S. PATENT DOCUMENTS

| | | |
|---|---|---|
| 2004/0181326 A1 | 9/2004 | Adams |
| 2004/0184548 A1 | 9/2004 | Kerbiriou |
| 2004/0203903 A1 | 10/2004 | Wilson |
| 2004/0209594 A1 | 10/2004 | Naboulsi |
| 2004/0210353 A1 | 10/2004 | Rice |
| 2004/0230345 A1 | 11/2004 | Tzamaloukas |
| 2004/0230370 A1 | 11/2004 | Tzamaloukas |
| 2004/0230373 A1 | 11/2004 | Tzamaloukas |
| 2004/0230374 A1 | 11/2004 | Tzamaloukas |
| 2004/0233284 A1 | 11/2004 | Lesesky |
| 2004/0236474 A1 | 11/2004 | Chowdhary |
| 2004/0243285 A1 | 12/2004 | Gounder |
| 2004/0243308 A1 | 12/2004 | Irish |
| 2004/0243668 A1 | 12/2004 | Harjanto |
| 2004/0254689 A1 | 12/2004 | Blazic |
| 2004/0254698 A1* | 12/2004 | Hubbard et al. ............... 701/35 |
| 2004/0257208 A1 | 12/2004 | Huang |
| 2004/0267419 A1 | 12/2004 | Jeng |
| 2005/0021199 A1 | 1/2005 | Zimmerman |
| 2005/0038581 A1 | 2/2005 | Kapolka |
| 2005/0043869 A1 | 2/2005 | Funkhouser |
| 2005/0060070 A1 | 3/2005 | Kapolka |
| 2005/0060071 A1 | 3/2005 | Winner |
| 2005/0065682 A1 | 3/2005 | Kapadia |
| 2005/0065716 A1 | 3/2005 | Timko |
| 2005/0068417 A1 | 3/2005 | Kreiner |
| 2005/0073585 A1 | 4/2005 | Ettinger |
| 2005/0078423 A1 | 4/2005 | Kim |
| 2005/0083404 A1 | 4/2005 | Pierce |
| 2005/0088291 A1 | 4/2005 | Blanco |
| 2005/0099498 A1 | 5/2005 | Lao |
| 2005/0100329 A1 | 5/2005 | Lao |
| 2005/0102074 A1 | 5/2005 | Kolls |
| 2005/0125117 A1 | 6/2005 | Breed |
| 2005/0131585 A1 | 6/2005 | Luskin |
| 2005/0131595 A1 | 6/2005 | Luskin |
| 2005/0131597 A1 | 6/2005 | Raz |
| 2005/0136949 A1 | 6/2005 | Barnes |
| 2005/0137757 A1 | 6/2005 | Phelan |
| 2005/0137796 A1 | 6/2005 | Gumpinger |
| 2005/0146458 A1 | 7/2005 | Carmichael |
| 2005/0149238 A1 | 7/2005 | Stefani |
| 2005/0149259 A1 | 7/2005 | Cherveny |
| 2005/0152353 A1 | 7/2005 | Couturier |
| 2005/0159964 A1 | 7/2005 | Sonnenrein |
| 2005/0166258 A1 | 7/2005 | Vasilevsky |
| 2005/0168258 A1 | 7/2005 | Vasilevsky |
| 2005/0171663 A1 | 8/2005 | Mittelsteadt |
| 2005/0171692 A1 | 8/2005 | Hamblen |
| 2005/0174217 A1 | 8/2005 | Basir |
| 2005/0182538 A1 | 8/2005 | Phelan |
| 2005/0182824 A1 | 8/2005 | Cotte |
| 2005/0185052 A1 | 8/2005 | Raisinghani |
| 2005/0185936 A9 | 8/2005 | Lao |
| 2005/0192749 A1 | 9/2005 | Flann |
| 2005/0197748 A1 | 9/2005 | Hoist |
| 2005/0200714 A1 | 9/2005 | Marchese |
| 2005/0203683 A1* | 9/2005 | Olsen et al. ............... 701/35 |
| 2005/0205719 A1 | 9/2005 | Hendrickson |
| 2005/0206741 A1 | 9/2005 | Raber |
| 2005/0209776 A1 | 9/2005 | Ogino |
| 2005/0212920 A1 | 9/2005 | Evans |
| 2005/0216144 A1 | 9/2005 | Baldassa |
| 2005/0228560 A1 | 10/2005 | Doherty |
| 2005/0233805 A1 | 10/2005 | Okajima |
| 2005/0243171 A1 | 11/2005 | Ross, Sr. |
| 2005/0251304 A1 | 11/2005 | Cancellara |
| 2005/0256681 A1 | 11/2005 | Brinton |
| 2005/0258942 A1 | 11/2005 | Manasseh |
| 2005/0264691 A1 | 12/2005 | Endo |
| 2005/0283284 A1 | 12/2005 | Grenier |
| 2006/0001671 A1 | 1/2006 | Kamijo |
| 2006/0007151 A1 | 1/2006 | Ram |
| 2006/0011399 A1 | 1/2006 | Brockway |
| 2006/0015233 A1 | 1/2006 | Olsen |
| 2006/0022842 A1 | 2/2006 | Zoladek |
| 2006/0025897 A1 | 2/2006 | Shostak |
| 2006/0025907 A9 | 2/2006 | Kapolka |
| 2006/0030986 A1 | 2/2006 | Peng |
| 2006/0040239 A1 | 2/2006 | Cummins |
| 2006/0047380 A1 | 3/2006 | Welch |
| 2006/0053038 A1 | 3/2006 | Warren |
| 2006/0055521 A1 | 3/2006 | Blanco |
| 2006/0057543 A1 | 3/2006 | Roald |
| 2006/0058950 A1 | 3/2006 | Kato |
| 2006/0072792 A1 | 4/2006 | Toda |
| 2006/0078853 A1 | 4/2006 | Lanktree |
| 2006/0082438 A1 | 4/2006 | Bazakos |
| 2006/0092043 A1 | 5/2006 | Lagassey |
| 2006/0095175 A1 | 5/2006 | Dewaal |
| 2006/0095199 A1 | 5/2006 | Lagassey |
| 2006/0095349 A1 | 5/2006 | Morgan |
| 2006/0103127 A1 | 5/2006 | Lie |
| 2006/0106514 A1 | 5/2006 | Liebl |
| 2006/0111817 A1 | 5/2006 | Phelan |
| 2006/0122749 A1 | 6/2006 | Phelan |
| 2006/0129578 A1 | 6/2006 | Kim |
| 2006/0142913 A1 | 6/2006 | Coffee |
| 2006/0143435 A1 | 6/2006 | Kwon |
| 2006/0147187 A1 | 7/2006 | Takemoto |
| 2006/0158349 A1 | 7/2006 | Oesterling |
| 2006/0161960 A1 | 7/2006 | Benoit |
| 2006/0168271 A1 | 7/2006 | Pabari |
| 2006/0178793 A1 | 8/2006 | Hecklinger |
| 2006/0180647 A1 | 8/2006 | Hansen |
| 2006/0184295 A1 | 8/2006 | Hawkins |
| 2006/0192658 A1 | 8/2006 | Yamamura |
| 2006/0200008 A1 | 9/2006 | Moore-Ede |
| 2006/0200305 A1 | 9/2006 | Sheha |
| 2006/0204059 A1 | 9/2006 | Ido |
| 2006/0209090 A1 | 9/2006 | Kelly et al. |
| 2006/0209840 A1 | 9/2006 | Paatela |
| 2006/0212195 A1 | 9/2006 | Veith |
| 2006/0215884 A1 | 9/2006 | Ota |
| 2006/0226344 A1 | 10/2006 | Werth |
| 2006/0229780 A1 | 10/2006 | Underdahl |
| 2006/0242680 A1 | 10/2006 | Johnson |
| 2006/0247833 A1 | 11/2006 | Malhotra |
| 2006/0253307 A1 | 11/2006 | Warren |
| 2006/0259218 A1 | 11/2006 | Wu |
| 2006/0259933 A1 | 11/2006 | Fishel |
| 2006/0261931 A1 | 11/2006 | Cheng |
| 2007/0001831 A1 | 1/2007 | Raz |
| 2007/0005404 A1 | 1/2007 | Raz |
| 2007/0027583 A1 | 2/2007 | Tamir |
| 2007/0027726 A1 | 2/2007 | Warren |
| 2007/0035632 A1 | 2/2007 | Silvernail |
| 2007/0043487 A1 | 2/2007 | Krzystofczyk |
| 2007/0088488 A1 | 4/2007 | Reeves |
| 2007/0100509 A1 | 5/2007 | Piekarz |
| 2007/0120948 A1 | 5/2007 | Fujioka |
| 2007/0124332 A1 | 5/2007 | Ballesty |
| 2007/0127833 A1 | 6/2007 | Singh |
| 2007/0132773 A1 | 6/2007 | Plante |
| 2007/0135979 A1 | 6/2007 | Plante |
| 2007/0135980 A1 | 6/2007 | Plante |
| 2007/0136078 A1 | 6/2007 | Plante |
| 2007/0142986 A1 | 6/2007 | Alaous |
| 2007/0143499 A1 | 6/2007 | Chang |
| 2007/0150138 A1 | 6/2007 | Plante |
| 2007/0150140 A1 | 6/2007 | Seymour |
| 2007/0159309 A1 | 7/2007 | Ito |
| 2007/0173994 A1 | 7/2007 | Kubo |
| 2007/0179691 A1 | 8/2007 | Grenn |
| 2007/0183635 A1 | 8/2007 | Weidhaas |
| 2007/0208494 A1 | 9/2007 | Chapman |
| 2007/0213920 A1 | 9/2007 | Igarashi |
| 2007/0216521 A1 | 9/2007 | Guensler |
| 2007/0219685 A1 | 9/2007 | Plante |
| 2007/0219686 A1 | 9/2007 | Plante |
| 2007/0236474 A1 | 10/2007 | Ramstein |
| 2007/0241874 A1 | 10/2007 | Okpysh |
| 2007/0244614 A1 | 10/2007 | Nathanson |
| 2007/0253307 A1 | 11/2007 | Mashimo |

(56) References Cited

U.S. PATENT DOCUMENTS

| | | |
|---|---|---|
| 2007/0257781 A1 | 11/2007 | Denson |
| 2007/0257782 A1 | 11/2007 | Etcheson |
| 2007/0257804 A1 | 11/2007 | Gunderson |
| 2007/0257815 A1 | 11/2007 | Gunderson |
| 2007/0260677 A1 | 11/2007 | DeMarco |
| 2007/0262855 A1 | 11/2007 | Zuta |
| 2007/0263984 A1 | 11/2007 | Sterner |
| 2007/0268158 A1 | 11/2007 | Gunderson |
| 2007/0271105 A1 | 11/2007 | Gunderson |
| 2007/0273480 A1 | 11/2007 | Burkman |
| 2007/0279214 A1 | 12/2007 | Buehler |
| 2007/0280677 A1 | 12/2007 | Drake et al. |
| 2007/0299612 A1 | 12/2007 | Kimura |
| 2008/0035108 A1 | 2/2008 | Ancimer |
| 2008/0059019 A1 | 3/2008 | Delia |
| 2008/0071827 A1 | 3/2008 | Hengel |
| 2008/0111666 A1 | 5/2008 | Plante |
| 2008/0122603 A1 | 5/2008 | Plante |
| 2008/0137912 A1 | 6/2008 | Kim |
| 2008/0143834 A1 | 6/2008 | Comeau |
| 2008/0147267 A1 | 6/2008 | Plante et al. |
| 2008/0157510 A1 | 7/2008 | Breed |
| 2008/0167775 A1 | 7/2008 | Kuttenberger |
| 2008/0169914 A1 | 7/2008 | Albertson |
| 2008/0177436 A1 | 7/2008 | Fortson |
| 2008/0195261 A1 | 8/2008 | Breed |
| 2008/0204556 A1 | 8/2008 | deMiranda |
| 2008/0211779 A1 | 9/2008 | Pryor |
| 2008/0234920 A1 | 9/2008 | Nurminen |
| 2008/0243389 A1 | 10/2008 | Inoue |
| 2008/0252412 A1 | 10/2008 | Larsson |
| 2008/0252485 A1 | 10/2008 | Lagassey |
| 2008/0252487 A1 | 10/2008 | McClellan |
| 2008/0269978 A1 | 10/2008 | Shirole |
| 2008/0281485 A1 | 11/2008 | Plante |
| 2008/0309762 A1 | 12/2008 | Howard et al. |
| 2008/0319604 A1 | 12/2008 | Follmer |
| 2009/0009321 A1 | 1/2009 | McClellan |
| 2009/0043500 A1 | 2/2009 | Satoh |
| 2009/0043971 A1 | 2/2009 | Kim |
| 2009/0051510 A1 | 2/2009 | Follmer |
| 2009/0138191 A1 | 5/2009 | Engelhard |
| 2009/0157255 A1 | 6/2009 | Plante |
| 2009/0216775 A1 | 8/2009 | Ratliff et al. |
| 2009/0224869 A1 | 9/2009 | Baker |
| 2009/0290848 A1 | 11/2009 | Brown |
| 2009/0299622 A1 | 12/2009 | Denaro |
| 2009/0312998 A1 | 12/2009 | Berckmans |
| 2009/0326796 A1 | 12/2009 | Prokhorov |
| 2009/0327856 A1 | 12/2009 | Mouilleseaux |
| 2010/0030423 A1 | 2/2010 | Nathanson |
| 2010/0045451 A1 | 2/2010 | Periwal |
| 2010/0047756 A1 | 2/2010 | Schneider |
| 2010/0049516 A1 | 2/2010 | Talwar |
| 2010/0054709 A1 | 3/2010 | Misawa |
| 2010/0057342 A1 | 3/2010 | Muramatsu |
| 2010/0063672 A1 | 3/2010 | Anderson |
| 2010/0063680 A1 | 3/2010 | Tolstedt |
| 2010/0063850 A1 | 3/2010 | Daniel |
| 2010/0070175 A1 | 3/2010 | Soulchin |
| 2010/0076621 A1 | 3/2010 | Kubotani |
| 2010/0085193 A1 | 4/2010 | Boss |
| 2010/0085430 A1 | 4/2010 | Kreiner |
| 2010/0087984 A1 | 4/2010 | Joseph |
| 2010/0100315 A1 | 4/2010 | Davidson |
| 2010/0103165 A1 | 4/2010 | Lee |
| 2010/0104199 A1 | 4/2010 | Zhang |
| 2010/0149418 A1 | 6/2010 | Freed |
| 2010/0153146 A1 | 6/2010 | Angell |
| 2010/0157061 A1 | 6/2010 | Katsman |
| 2010/0191411 A1 | 7/2010 | Cook |
| 2010/0201875 A1 | 8/2010 | Rood |
| 2010/0220892 A1 | 9/2010 | Kawakubo |
| 2010/0250020 A1 | 9/2010 | Lee |
| 2010/0250021 A1 | 9/2010 | Cook |
| 2010/0250022 A1 | 9/2010 | Hines |
| 2010/0250060 A1 | 9/2010 | Maeda |
| 2010/0250116 A1 | 9/2010 | Yamaguchi |
| 2010/0253918 A1 | 10/2010 | Seder |
| 2010/0268415 A1 | 10/2010 | Ishikawa |
| 2010/0283633 A1 | 11/2010 | Becker |
| 2010/0312464 A1 | 12/2010 | Fitzgerald |
| 2011/0035139 A1 | 2/2011 | Konlditslotis |
| 2011/0043624 A1 | 2/2011 | Haug |
| 2011/0060496 A1 | 3/2011 | Nielsen |
| 2011/0077028 A1 | 3/2011 | Wilkes |
| 2011/0091079 A1 | 4/2011 | Yu-Song |
| 2011/0093159 A1 | 4/2011 | Boling |
| 2011/0112995 A1 | 5/2011 | Chang |
| 2011/0121960 A1 | 5/2011 | Tsai |
| 2011/0125365 A1 | 5/2011 | Larschan |
| 2011/0130916 A1 | 6/2011 | Mayer |
| 2011/0140884 A1 | 6/2011 | Santiago |
| 2011/0145042 A1 | 6/2011 | Green |
| 2011/0153367 A1 | 6/2011 | Amigo |
| 2011/0161116 A1 | 6/2011 | Peak |
| 2011/0166773 A1 | 7/2011 | Raz |
| 2011/0169625 A1 | 7/2011 | James |
| 2011/0172864 A1 | 7/2011 | Syed |
| 2011/0173015 A1 | 7/2011 | Chapman |
| 2011/0208428 A1 | 8/2011 | Matsubara |
| 2011/0212717 A1 | 9/2011 | Rhoads |
| 2011/0213628 A1 | 9/2011 | Peak |
| 2011/0224891 A1 | 9/2011 | Iwuchukwu |
| 2011/0251752 A1 | 10/2011 | DeLarocheliere |
| 2011/0251782 A1 | 10/2011 | Perkins |
| 2011/0254676 A1 | 10/2011 | Marumoto |
| 2011/0257882 A1 | 10/2011 | McBurney |
| 2011/0273568 A1 | 11/2011 | Lagassey |
| 2011/0282542 A9 | 11/2011 | Nielsen |
| 2011/0283223 A1 | 11/2011 | Vattinen et al. |
| 2011/0304446 A1 | 12/2011 | Basson |
| 2012/0021386 A1 | 1/2012 | Anderson |
| 2012/0035788 A1 | 2/2012 | Trepagnier |
| 2012/0041675 A1 | 2/2012 | Juliver |
| 2012/0046803 A1 | 2/2012 | Inou |
| 2012/0065834 A1 | 3/2012 | Senart |
| 2012/0071140 A1 | 3/2012 | Oesterling |
| 2012/0078063 A1 | 3/2012 | Moore-Ede |
| 2012/0081567 A1 | 4/2012 | Cote |
| 2012/0100509 A1 | 4/2012 | Gunderson |
| 2012/0109447 A1 | 5/2012 | Yousefi |
| 2012/0123806 A1 | 5/2012 | Schumann |
| 2012/0134547 A1 | 5/2012 | Jung |
| 2012/0150436 A1 | 6/2012 | Rossano |
| 2012/0176234 A1 | 7/2012 | Taneyhill |
| 2012/0190001 A1 | 7/2012 | Knight |
| 2012/0198317 A1 | 8/2012 | Eppolito |
| 2012/0210252 A1 | 8/2012 | Fedoseyeva |
| 2012/0277950 A1 | 11/2012 | Plante |
| 2012/0280835 A1 | 11/2012 | Raz |
| 2012/0283895 A1 | 11/2012 | Noda |
| 2012/0330528 A1 | 12/2012 | Schwindt |
| 2013/0004138 A1 | 1/2013 | Kilar |
| 2013/0006469 A1 | 1/2013 | Green |
| 2013/0021148 A1 | 1/2013 | Cook |
| 2013/0028320 A1 | 1/2013 | Gardner |
| 2013/0030660 A1 | 1/2013 | Fujimoto |
| 2013/0046449 A1 | 2/2013 | Yuecel |
| 2013/0052614 A1 | 2/2013 | Mollicone |
| 2013/0073112 A1 | 3/2013 | Phelan |
| 2013/0073114 A1 | 3/2013 | Nemat-Nasser |
| 2013/0096731 A1 | 4/2013 | Tamari |
| 2013/0127980 A1 | 5/2013 | Haddick |
| 2013/0145269 A1 | 6/2013 | Latulipe |
| 2013/0151980 A1 | 6/2013 | Lee |
| 2013/0170762 A1 | 7/2013 | Marti |
| 2013/0189649 A1 | 7/2013 | Mannino |
| 2013/0197774 A1 | 8/2013 | Denson |
| 2013/0209968 A1 | 8/2013 | Miller |
| 2013/0274950 A1 | 10/2013 | Richardson |
| 2013/0278631 A1 | 10/2013 | Border |
| 2013/0317711 A1 | 11/2013 | Plante |
| 2013/0332004 A1 | 12/2013 | Gompert et al. |

(56) References Cited

U.S. PATENT DOCUMENTS

| | | |
|---|---|---|
| 2013/0345927 A1 | 12/2013 | Cook |
| 2013/0345929 A1 | 12/2013 | Bowden |
| 2014/0025225 A1 | 1/2014 | Armitage |
| 2014/0025254 A1 | 1/2014 | Plante |
| 2014/0032062 A1 | 1/2014 | Baer |
| 2014/0046550 A1 | 2/2014 | Palmer |
| 2014/0047371 A1 | 2/2014 | Palmer |
| 2014/0058583 A1 | 2/2014 | Kesavan |
| 2014/0089504 A1 | 3/2014 | Scholz |
| 2014/0094992 A1 | 4/2014 | Lambert |
| 2014/0098228 A1 | 4/2014 | Plante |
| 2014/0152828 A1 | 6/2014 | Plante |
| 2014/0226010 A1 | 8/2014 | Molin |
| 2014/0232863 A1 | 8/2014 | Paliga |
| 2014/0270684 A1 | 9/2014 | Jayaram |
| 2014/0279707 A1 | 9/2014 | Joshua |
| 2014/0280204 A1 | 9/2014 | Avery |
| 2014/0300739 A1 | 10/2014 | Mimar |
| 2014/0309849 A1 | 10/2014 | Ricci |
| 2014/0335902 A1 | 11/2014 | Guba |
| 2014/0336916 A1 | 11/2014 | Yun |
| 2015/0015617 A1 | 1/2015 | Yeo |
| 2015/0035665 A1 | 2/2015 | Plante |
| 2015/0057512 A1 | 2/2015 | Kapoor |
| 2015/0057836 A1 | 2/2015 | Plante |
| 2015/0105934 A1 | 4/2015 | Palmer |
| 2015/0112542 A1 | 4/2015 | Fuglewicz |
| 2015/0112545 A1 | 4/2015 | Binion |
| 2015/0134226 A1 | 5/2015 | Palmer |
| 2015/0135240 A1 | 5/2015 | Shibuya |
| 2015/0156174 A1 | 6/2015 | Fahey |
| 2015/0170428 A1 | 6/2015 | Harter |
| 2015/0189042 A1 | 7/2015 | Sun |
| 2015/0022449 A1 | 8/2015 | Salinger |
| 2015/0317846 A1 | 11/2015 | Plante |
| 2016/0054733 A1 | 2/2016 | Hollida |
| 2016/0182170 A1 | 6/2016 | Daoura |
| 2017/0301220 A1 | 10/2017 | Jarrell |
| 2018/0025636 A1 | 1/2018 | Boykin |
| 2018/0033300 A1 | 2/2018 | Hansen |
| 2019/0176837 A1 | 6/2019 | Williams |
| 2019/0176847 A1 | 6/2019 | Palmer |
| 2019/0180524 A1 | 6/2019 | Palmer |
| 2019/0279441 A1 | 9/2019 | Palmer |
| 2019/0389307 A1 | 12/2019 | Plante |

FOREIGN PATENT DOCUMENTS

| | | |
|---|---|---|
| CA | 2692415 | 8/2011 |
| CA | 2692415 A1 | 8/2011 |
| DE | 4416991 A1 | 11/1995 |
| DE | 20311262 | 9/2003 |
| DE | 202005008238 | 9/2005 |
| DE | 102004004669 | 12/2005 |
| DE | 102004004669 A1 | 12/2005 |
| EP | 0708427 A2 | 4/1996 |
| EP | 0840270 A2 | 5/1998 |
| EP | 0848270 A2 | 5/1998 |
| EP | 1170697 A2 | 1/2002 |
| EP | 1324274 A2 | 7/2003 |
| EP | 1355278 A1 | 10/2003 |
| EP | 1427165 A2 | 6/2004 |
| EP | 1818873 A1 | 8/2007 |
| EP | 2104075 | 9/2009 |
| EP | 2320387 | 5/2011 |
| EP | 2407943 | 1/2012 |
| GB | 2268608 A | 1/1994 |
| GB | 2402530 | 12/2004 |
| GB | 2402530 A | 12/2004 |
| GB | 2451485 | 2/2009 |
| GB | 2447184 B | 6/2011 |
| GB | 2446994 | 8/2011 |
| JP | 58085110 | 5/1983 |
| JP | S5885110 A | 5/1983 |
| JP | 62091092 | 4/1987 |
| JP | S6291092 A | 4/1987 |
| JP | S62166135 A | 7/1987 |
| JP | 02056197 | 2/1990 |
| JP | H0256197 A | 2/1990 |
| JP | H04257189 A | 9/1992 |
| JP | H05137144 A | 6/1993 |
| JP | 5294188 | 11/1993 |
| JP | H08124069 A | 5/1996 |
| JP | H09163357 A | 6/1997 |
| JP | H09272399 A | 10/1997 |
| JP | 10076880 | 3/1998 |
| JP | H1076880 A | 3/1998 |
| JP | 2002191017 | 7/2002 |
| JP | 2002191017 A | 7/2002 |
| KR | 1000588169 | 12/2000 |
| KR | 20000074416 | 12/2000 |
| WO | 8809023 A1 | 11/1988 |
| WO | 9005076 | 5/1990 |
| WO | 9427844 | 12/1994 |
| WO | 9600957 A1 | 1/1996 |
| WO | 9701246 | 1/1997 |
| WO | 9726750 A1 | 7/1997 |
| WO | 9937503 | 7/1999 |
| WO | 9940545 A1 | 8/1999 |
| WO | 9962741 | 12/1999 |
| WO | 0007150 A1 | 2/2000 |
| WO | 0028410 A1 | 5/2000 |
| WO | 0048033 | 8/2000 |
| WO | 0077620 | 12/2000 |
| WO | 0123214 | 4/2001 |
| WO | 0125054 | 4/2001 |
| WO | 2001023214 | 4/2001 |
| WO | 0146710 A2 | 6/2001 |
| WO | 03045514 | 6/2003 |
| WO | 2004066275 | 8/2004 |
| WO | 2006022824 | 3/2006 |
| WO | 2006022824 A2 | 3/2006 |
| WO | 2007067767 | 6/2007 |
| WO | 2007133990 | 11/2007 |
| WO | 2009081234 | 7/2009 |
| WO | 2011055743 A1 | 5/2011 |
| WO | 2013072939 | 5/2013 |
| WO | 2013159853 | 10/2013 |

OTHER PUBLICATIONS

Ambulance Companies Use Video Technology to Improve Driving Behavior, Ambulance Industry Journal, Spring 2003.

Amended Complaint for Patent Infringement, Trade Secret Misappropriation, Unfair Competition and Conversion in *DriveCam, Inc. v. SmartDrive Systems, Inc.*, Case No. 3:11-CV-00997-H-RBB, for the Southern District of California, Document 34, filed Oct. 20, 2011, pp. 1-15.

Amendment filed Dec. 23, 2009 during prosecution of U.S. Appl. No. 11/566,424.

Answer to Amended Complaint; Counterclaims; and Demand for Jury Trial in *DriveCam, Inc. v. SmartDrive Systems, Inc.*, Case No. 3:11-CV-00997 H (RBB), for the Southern District of California, Document 47, filed Dec. 13, 2011, pp. 1-15.

U.S. Appl. No. 11/296,906, filed Dec. 8, 2005, File History.
U.S. Appl. No. 11/297,669, filed Dec. 8, 2005, File History.
U.S. Appl. No. 11/297,889, filed Dec. 8, 2005, File History.
U.S. Appl. No. 11/298,069, filed Dec. 9, 2005, File History.
U.S. Appl. No. 11/299,028, filed Dec. 9, 2005, File History.
U.S. Appl. No. 11/593,659, filed Nov. 7, 2006, File History.
U.S. Appl. No. 11/593,682, filed Nov. 7, 2006, File History.
U.S. Appl. No. 11/593,882, filed Nov. 7, 2006, File History.
U.S. Appl. No. 11/595,015, filed Nov. 9, 2006, File History.
U.S. Appl. No. 11/637,754, filed Dec. 13, 2006, File History.
U.S. Appl. No. 11/637,755, filed Dec. 13, 2006, File History.
Bill, 'DriveCam—FAQ', Dec. 12, 2003.
Bill Siuru, 'DriveCam Could Save You Big Bucks', Land Line Magazine, May-Jun. 2000.
Chris Woodyard, 'Shuttles save with DriveCam', Dec. 9, 2003.
Dan Carr, Flash Video Template: Video Presentation with Navigation, Jan. 16, 2006, http://www.adobe.com/devnet/flash/articles/vidtemplate_mediapreso_flash8.html.

(56) References Cited

OTHER PUBLICATIONS

David Cullen, 'Getting a real eyeful', Fleet Owner Magazine, Feb. 2002.
David Maher, 'DriveCam Brochure Folder', Jun. 6, 2005.
David Maher, "DriveCam Brochure Folder", Jun. 8, 2005.
David Vogeleer et al., Macromedia Flash Professional 8UNLEASHED (Sams Oct. 12, 2005).
Del Lisk, 'DriveCam Training Handout Ver4', Feb. 3, 2005.
Drivecam, Inc., User's Manual for Drivecam Video Systems' Hindsight 20/20 Software Version 4.0 (2003).
DriveCam, Inc.'s Infringement Contentions Exhibit A, U.S. Pat. No. 6,389,340, Document 34.1, Oct. 20, 2011.
DriveCam, Inc.'s Infringement Contentions Exhibit B, U.S. Pat. No. 7,659,827. Aug. 19, 2011.
DriveCam, Inc.'s Infringement Contentions Exhibit B, U.S. Pat. No. 7,804,426, Document 34.2, Oct. 20, 2011.
DriveCam, Inc.'s Infringement Contentions Exhibit C, U.S. Pat. No. 7,659,827, Document 34.3, Oct. 20, 2011.
DriveCam, Inc.'s Infringement Contentions Exhibit C, U.S. Pat. No. 7,804,426. Aug. 19, 2011.
DriveCam, Inc.'s Infringement Contentions Exhibit D, Document 34.4, Oct. 20, 2011.
DriveCam—Illuminator Data Sheet, Oct. 2, 2004.
Drivecam.com as retrieved by the Internet Wayback Machine as of Mar. 5, 2005.
DriveCam's Disclosure of Asserted Claims and Preliminary Infringement Contentions in *DriveCam, Inc. v. SmartDrive Systems, Inc.*, Case No. 3:11-CV-00997-H-RBB, for the Southern District of California. Aug. 19, 2011.
DriveCam Driving Feedback System, Mar. 15, 2004.
DriveCam Extrinsic Evidence with Patent LR 4.1 .a Disclosures, Nov. 3, 2011.
DriveCam Extrinsic Evidence with Patent LR 4.1 .a Disclosures, Nov. 8, 2011.
Driver Feedback System, Jun. 12, 2001.
First Amended Answer to Amended Complaint and First Amended Counterclaims; and Demand for Jury Trial in *DriveCam, Inc. v. SmartDrive Systems, Inc.*, Case No. 3:11-CV-00997 H (RBB), for the Southern District of California, Document 53, filed Dec. 20, 2011, pp. 1-48.
First Amended Answer to Amended Complaint and First Amended Counterclaims; and Demand for Jury Trial in *DriveCam, Inc. v. SmartDrive Systems, Inc.*, Case No. 3:11-CV-00997 H (RBB), for the Southern District of California, Document 55, filed Jan. 1, 2012, pp. 86-103.
First Amended Answer to Amended Complaint and First Amended Counterclaims; and Demand for Jury Trial in *DriveCam, Inc. v. SmartDrive Systems, Inc.*, Case No. 3:11-CV-00997 H (RBB), for the Southern District of California, Document 55, filed Jan. 3, 2012, pp. 86-103.
First Amended Answer to Amended Complaint and First Amended Counterclaims; and Demand for Jury Trial in *DriveCam, Inc. v. SmartDrive Systems, Inc.*, Case No. 3:11-CV-00997 H (RBB), for the Southern District of California, Exhibit A, Document 55, filed Jan. 3, 2012, pp. 49-103.
Franke, U., et al., Autonomous Driving Goes Downtown, IEEE Intelligent Systems, 13(6):40-48 (1988); Digital Object Identifier 10.1109/5254.736001.
Gallagher, B., et al., Wireless Communications for Vehicle Safety: Radio Link Performance and Wireless Connectivity Methods, Vehicular Technology Magazine, IEEE, 1(4):4-24 (2006); Digital Object Identifier 10.1109/MVT.2006.343641.
Gandhi, T., et al., Pedestrian Protection Systems: Issues, Survey, and Challenges, IEEE Transactions on Intelligent Transportation Systems, 8(3):413-430 (2007); Digital Object Identifier 10.1109/TITS.2007.903444.
Gary and Sophia Rayner, Final Report for Innovations Deserving Exploratory Analysis (IDEA) Intelligent Transportation Systems (ITS) Programs' Project 84, I-Witness Black Box Recorder, San Diego, CA. Nov. 2001.
GE published its VCR User's Guide for Model VG4255 in 1995.
Glenn Oster, 'Hindsight 20/20 v4.0 Software Installation', 1 of 2, Jun. 20, 2003.
Glenn Oster, 'HindSight 20/20 v4.0 Software Installation', 2 of 2, Jun. 20, 2003.
Glenn Oster, 'Illuminator Installation', Oct. 3, 2004.
Hans Fantel, Video; Search Methods Make a Difference in Picking VCR's, NY Times, Aug. 13, 1989.
I/O Port Racing Supplies' website discloses using Traqmate's Data Acquisition with Video Overlay system in conjunction with professional driver coaching sessions (available at http://www.ioportracing.com/Merchant2/merchant.mvc?Screen=CTGY&Categorys-ub.--Code=coaching)., printed from site on Jan. 11, 2012.
Interior Camera Data Sheet, Oct. 26, 2001.
International Search Report and Written Opinion issued in PCT/US07/68325 dated Feb. 27, 2008.
International Search Report and Written Opinion issued in PCT/US07/68328 dated Oct. 15, 2007.
International Search Report and Written Opinion issued in PCT/US07/68329 dated Mar. 3, 2008.
International Search Report and Written Opinion issued in PCT/US07/68332 dated Mar. 3, 2008.
International Search Report and Written Opinion issued in PCT/US07/68334 dated Mar. 5, 2008.
International Search Report for PCT/US2006/47055, dated Mar. 20, 2008 (2 pages).
International Search Report issued in PCT/US2006/47042 dated Feb. 25, 2008.
J. Gallagher, 'Lancer Recommends Tech Tool', Insurance and Technology Magazine, Feb. 2002.
Jean (DriveCam vendor), 'DC Data Sheet', Nov. 6, 2002.
Jean (DriveCam vendor), 'DriveCam brochure', Nov. 6, 2002.
Jean (DriveCam vendor), 'Feedback Data Sheet', Nov. 6, 2002.
Jean (DriveCam vendor), 'Hindsight 20-20 Data Sheet', Nov. 4, 2002.
Jessyca Wallace, 'Analyzing and Processing DriveCam Recorded Events', Oct. 6, 2003.
Jessyca Wallace, 'Overview of the DriveCam Program', Dec. 15, 2005.
Jessyca Wallace, 'The DriveCam Driver Feedback System', Apr. 6, 2004.
Joint Claim Construction Chart, U.S. Pat. No. 6,389,340, 'Vehicle Data Recorder' for Case No. 3:11-CV-00997-H-RBB, Document 43-1, filed Dec. 1, 2011, pp. 1-33.
Joint Claim Construction Chart in *DriveCam, Inc. v. SmartDrive Systems, Inc.*, Case No. 11-CV-0997-H (RBB), for the Southern District of California, Document 43, filed Dec. 1, 2011, pp. 1-2.
Joint Claim Construction Worksheet, U.S. Pat. No. 6,389,340, 'Vehicle Data Reporter' for Case No. 3:11-CV-00997-H-RBB, Document 44-1, filed Dec. 1, 2011, pp. 1-10.
Joint Claim Construction Worksheet in *DriveCam, Inc. v. SmartDrive Systems, Inc.*, Case No. 3:11-CV-00997 H (RBB), for the Southern District of California, Document 44, filed Dec. 1, 2011, pp. 1-2.
Joint Motion for Leave to Supplement Disclosure of Asserted Claims and Preliminary Infringement Contentions in *DriveCam, Inc. v. SmartDrive Systems, Inc.*, Case No. 3:11-cv-00997-H-RBB, Document 29, filed Oct. 12, 2011, pp. 1-7.
Julie Stevens, 'DriveCam Services', Nov. 15, 2004.
Julie Stevens, 'Program Support Roll-Out & Monitoring', Jul. 13, 2004.
Jung, Sang-Hack, et al., Egomotion Estimation in Monocular Infra-red Image Sequence for Night Vision Applications, IEEE Workshop on Applications of Computer Vision (WACV '07), Feb. 2007, pp. 8-8; Digital Object Identifier 10.1109/WACV.2007.20.
JVC Company of America, JVC Video Cassette Recorder HR-IP820U Instructions (1996).
Kamijo, S., et al., A Real-Time Traffic Monitoring System by Stochastic Model Combination, IEEE International Conference on Systems, Man and Cybernetics, 4:3275-3281 (2003).
Kamijo, S., et al., An Incident Detection System Based on Semantic Hierarchy, Proceedings of the 7th International IEEE Intelligent Transportation Systems Conference, Oct. 3-6, 2004, pp. 853-858; Digital Object Identifier 10.1109/ITSC.2004.1399015.

(56) References Cited

OTHER PUBLICATIONS

Karen, 'Downloading Options to HindSight 20120', Aug. 6, 2002.
Karen, 'Managers Guide to the DriveCam Driving Feedback System', Jul. 30, 2002.
Kathy Latus (Latus Design), 'Case Study—Cloud 9 Shuttle', Sep. 23, 2005.
Kathy Latus (Latus Design), 'Case Study—Lloyd Pest Control', Jul. 19, 2005.
Kathy Latus (Latus Design), 'Case Study—Time Warner Cable', Sep. 23, 2005.
Ki, Yong-Kul, et al., A Traffic Accident Detection Model using Metadata Registry, Proceedings of the Fourth International Conference on Software Engineering Research, Management and Applications; Aug. 9-11, 2006 pp. 255-259 Digital Object Identifier 10.1109/SERA.2006.8.
Kitchin, Charles. "Understanding accelerometer scale factor and offset adjustments." Analog Devices (1995).
Lin, Chin-Teng et al., EEG-based drowsiness estimation for safety driving using independent component analysis; IEEE Transactions on Circuits and Systems-I: Regular Papers, 52(12):2726-2738 (2005); Digital Object Identifier 10.1109/TCSI.2005.857555.
Lisa McKenna, 'A Fly on the Windshield?', Pest Control Technology Magazine, Apr. 2003.
Miller, D.P., Evaluation of Vision Systems for Teleoperated Land Vehicles. Control Systems Magazine, IEEE, 8(3):37-41 (1988); Digital Identifier 10.1109/37.475.
Munder, S., et al., Pedestrian Detection and Tracking Using a Mixture of View-Based Shape-Texture Models, IEEE Transactions on Intelligent Transportation Systems, 9(2):333-343 (2008); Digital Identifier 10.1109/TITS.2008.922943.
Non-Final Office Action for U.S. Appl. No. 11/296,907, dated Mar. 22, 2007 ( 17 pages).
Non-final Office Action dated Aug. 27, 2009 during prosecution of U.S. Appl. No. 11/566,424.
Non-Final Office Action dated Nov. 27, 2013 in U.S. Appl. No. 13/957,810, filed Aug. 2, 2013.
Panasonic Corporation, Video Cassette Recorder (VCR) Operating Instructions for Models No. PV-V4020/PV-V4520.
Passenger Transportation Mode Brochure, May 2, 2005.
Patent Abstracts of Japan vol. 007, No. 180 (P-215), Aug. 9, 1983 (Aug. 9, 1983) & JP 58 085110 A (Mitsuhisa Ichikawa), May 21, 1983 (May 21, 1983).
Patent Abstracts of Japan vol. 011, No. 292 (E-543), Sep. 19, 1987 (Sep. 19, 1987) & JP 62 091092 A (OK ENG:KK), Apr. 25, 1987 (Apr. 25, 1987).
Patent Abstracts of Japan vol. 012, No. 001 (M-656), Jan. 6, 1988 (Jan. 6, 1988) & JP 62 166135 A (Fuji Electric Co Ltd), Jul. 22, 1987 (Jul. 22, 1987).
Patent Abstracts of Japan vol. 014, No. 222 (E-0926), May 10, 1990 (May 10, 1990) & JP 02 056197 A (Sanyo Electric Co Ltd), Feb. 26, 1990 (Feb. 26, 1990).
Patent Abstracts of Japan vol. 017, No. 039 (E-1311), Jan. 25, 1993 (Jan. 25, 1993) & JP 04 257189 A (Sony Corp), Sep. 11, 1992 (Sep. 11, 1992).
Patent Abstracts of Japan vol. 017, No. 521 (E-1435), Sep. 20, 1993 (Sep. 20, 1993) & JP 05 137144 A (Kyocera Corp), Jun. 1, 1993 (Jun. 1, 1993).
Patent Abstracts of Japan vol. 1996, No. 09, Sep. 30, 1996 (Sep. 30, 1996) & JP 08 124069 A (Toyota Motor Corp), May 17, 1996 (May 17, 1996).
Patent Abstracts of Japan vol. 1997, No. 10, Oct. 31, 1997 (Oct. 31, 1997) & JP 09 163357 A (Nippon Soken Inc), Jun. 20, 1997 (Jun. 20, 1997).
Patent Abstracts of Japan vol. 1998, No. 02, Jan. 30, 1998 (Jan. 30, 1998) & JP 09 272399 A (Nippon Soken Inc), Oct. 21, 1997 (Oct. 21, 1997).
Patent Abstracts of Japan vol. 1998, No. 8, Jun. 30, 1998 (Jun. 30, 1998) & JP 10 076880 A (Muakami Corp), Mar. 24, 1998 (Mar. 24, 1998).

PCT/US2010/022012, Invitation to Pay Additional Fees with Communication of Partial International Search, Jul. 21, 2010.
Peter G. Thurlow, Letter (including exhibits) Regarding Patent Owner's Response to Initial Office Action in Ex Parte Reexamination, Mar. 27, 2012.
Preliminary Claim Construction and Identification of Extrinsic Evidence of Defendant/Counterclaimant SmartDriveSystems, Inc. in *DriveCam, Inc.* v. *SmartDrive Systems, Inc.*, Case No. 3:11-CV-00997-H (RBB), for the Southern District of California. Nov. 8, 2011.
Quinn Maughan, 'DriveCam Enterprise Services', Jan. 5, 2006.
Quinn Maughan, 'DriveCam Managed Services', Jan. 5, 2006.
Quinn Maughan, 'DriveCam Standard Edition', Jan. 5, 2006.
Quinn Maughan, 'DriveCam Unit Installation', Jul. 21, 2005.
Quinn Maughan, 'Enterprise Services', Apr. 17, 2006.
Quinn Maughan, 'Enterprise Services', Apr. 7, 2006.
Quinn Maughan, 'Hindsight Installation Guide', Sep. 29, 2005.
Quinn Maughan, 'Hindsight Users Guide', Jun. 7, 2005.
Ronnie Rittenberry, 'Eyes on the Road', Jul. 2004.
SmartDrives Systems, Inc's Production, SO14246-S014255, Nov. 16, 2011.
Supplement to DriveCam's Disclosure of Asserted Claims and Preliminary Infringement Contentions' in *DriveCam, Inc.* v. *SmartDrive Systems, Inc.*, Case No. 3:11-CV-00997-H-RBB, for the Southern District of California. Oct. 14, 2011.
The DriveCam, Nov. 6, 2002.
The DriveCam, Nov. 8, 2002.
Traqmate GPS Data Acquisition's Traqmate Data Acquisition with Video Overlay system was used to create a video of a driving event on Oct. 2, 2005 (available at http://www.trackvision.net/phpBB2/viewtopic.php?t=51&sid=1184fbbcbe3be5c87ffa0f2ee6e2da76), printed from site on Jan. 11, 2012.
U.S. Appl. No. 12/691,639, entitled 'Driver Risk Assessment System and Method Employing Selectively Automatic Event Scoring', filed Jan. 21, 2010.
U.S. Appl. No. 11/377,167, Final Office Action dated Nov. 8, 2013.
U.S. Appl. No. 11/377,157, filed Mar. 16, 2006 entitled, "Vehicle Event Recorder Systems and Networks Having Parallel Communications Links".
U.S. Appl. No. 11/377,167 filed Mar. 16, 2006 entitled, "Vehicle Event Recorder Systems and Networks Having Integrated Cellular Wireless Communications Systems".
USPTO Final Office Action for U.S. Appl. No. 11/297,669, dated Nov. 7, 2011, 15 pages.
USPTO Final Office Action for U.S. Appl. No. 13/957,810, dated Jun. 27, 2014, 24 pages.
USPTO Non-Final Office Action for U.S. Appl. No. 11/296,906, dated Apr. 2, 2009, 7 pages.
USPTO Non-Final Office Action for U.S. Appl. No. 11/296,906, dated Nov. 6, 2009, 9 pages.
USPTO Non-Final Office Action for U.S. Appl. No. 11/297,669, dated Apr. 28, 2011, 11 pages.
USPTO Non-Final Office Action for U.S. Appl. No. 11/299,028, dated Apr. 24, 2008, 9 pages.
USPTO Non-Final Office Action for U.S. Appl. No. 11/377,164, dated Nov. 19, 2007, 7 pages.
USPTO Non-Final Office Action for U.S. Appl. No. 11/377,164, dated Nov. 25, 2011, 9 pages.
USPTO Non-Final Office Action for U.S. Appl. No. 11/377,164, dated Sep. 11, 2008, 8 pages.
USPTO Non-Final Office Action for U.S. Appl. No. 11/377,167, dated Jun. 5, 2008, 11 pages.
USPTO Non-Final Office Action for U.S. Appl. No. 11/800,876, dated Dec. 1, 2010, 12 pages.
USPTO Non-Final Office Action for U.S. Appl. No. 11/800,876, dated Dec. 20, 2011, 8 pages.
USPTO Non-Final Office Action for U.S. Appl. No. 12/096,591, dated May 20, 2014, 19 pages.
Veeraraghavan, H., et al., Computer Vision Algorithms for Intersection Monitoring, IEEE Transactions on Intelligent Transportation Systems, 4(2):78-89 (2003); Digital Object Identifier 10.1109/TITS.2003.821212.

(56) References Cited

OTHER PUBLICATIONS

Wijesoma, W.S., et al., Road Curb Tracking in an Urban Environment, Proceedings of the Sixth International Conference of Information Fusion, 1:261-268 (2003).
World News Tonight, CBC Television New Program discussing teen drivers using the DriveCam Program and DriveCam Technology, Oct. 10, 2005, on PC formatted CD-R, World News Tonight.wmv, 7.02 MB, Created Jan. 12, 2011.
Written Opinion issued in PCT/US07/68328 dated Oct. 15, 2007.
Written Opinion of the International Searching Authority for PCT/US2006/47042, dated Feb. 25, 2008 (5 pages).
Written Opinion of the International Searching Authority for PCT/US2006/47055, dated Mar. 20, 2008 (5 pages).
"DriveCam, Inc's Disclosure of Proposed Constructions and Extrinsic Evidence Pursuant to Patent L.R. 4.1.a & 4.1.b" Disclosure and Extrinsic Evidence in *DriveCam, Inc.* v. *SmartDrive Systems, Inc.*, Case No. 3:11-CV-00997-H-RBB, for the Southern District of California. Nov. 8, 2011, 68 pages.
"DriveCam Driving Feedback System", DriveCam brochure, Jun. 12, 2001, Document #6600128, 2 pages.
"DriveCam Driving Feedback System" DriveCam brochure, Mar. 15, 2004, 4 pages.
"DriveCam Passenger Transportation Module", DriveCam brochure, Oct. 26, 2001, 2 pages.
"DriveCam Video Event Data Recorder", DriveCam brochure, Nov. 6, 2002, Document #6600127, 2 pages.
"Responsive Claim Construction and Identification of Extrinsic Evidence of Defendani/Counterclaimant SmartDrive Systems, Inc." Claim Construction and and Extrinsic Evidence in *DriveCam, Inc.* v. *SmartDrive Systems, Inc.*, Case No. 3:11-CV-00997-H (RBB), for the Southern District of California. Nov. 15, 2011, 20 pages.
"Sonic MyDVD 4.0: Tutorial: Trimming video segments". Tutorial for software bundled with Adaptec VideoOh! DVD USB 2.0 Edition, 2003, 13 pages.
"User's Manual for DriveCam Video Systems' HindSight 20/20 Software Version 4.0" DriveCam Manual, San Diego, 2003, Document #6600141-1, 54 pages.
Canadian Office Action issued in Application No. 2,632,685 dated Jan. 30, 2015; 5 pages.
Dan Maher, "DriveCam Taking Risk Out of Driving", DriveCam brochure folder, Jun. 6, 2005, 6 pages.
Del Lisk, "DriveCam Training Seminar" Handout, 2004, 16 pages.
European Examination Report issued in EP 07772812.9 dated Jan. 22, 2015; 5 pages.
Jean (DriveCam vendor) "DriveCam Driving Feedback System", DriveCam brochure, Nov. 6, 2002, Document #6600128-1, 2 pages.
Notice of Allowance Allowance for U.S. Appl. No. 14/036,299, dated Mar. 20, 2015, 5 pages.
Notice of Allowance Application for U.S. Appl. No. 11/566,424, dated Feb. 26, 2010, 6 pages.
Notice of Allowance for U.S. Appl. No. 11/377,164, dated Dec. 3, 2014, 5 pages.
Notice of Allowance for U.S. Appl. No. 11/377,164, dated Feb. 13, 2015, 2 pages.
Notice of Allowance for U.S. Appl. No. 11/377,164, dated Feb. 25, 2014, 2 pages.
Notice of Allowance for U.S. Appl. No. 11/377,164, dated Nov. 18, 2013, 7 pages.
Notice of Allowance for U.S. Appl. No. 11/377,167, dated Apr. 1, 2015, 7 pages.
Notice of Allowance for U.S. Appl. No. 11/800,876, dated Apr. 19, 2012, 8 pages.
USPTO Final Office Action for U.S. Appl. No. 11/296,906, dated Aug. 8, 2012, 15 pages.
USPTO Final Office Action for U.S. Appl. No. 12/096,591, dated Dec. 5, 2014, 23 pages.
USPTO Final Office Action for U.S. Appl. No. 12/096,591, dated Jul. 18, 2012, 15 pages.
USPTO Final Office Action for U.S. Appl. No. 12/096,591, dated Nov. 7, 2013, 14 pages.
USPTO Final Office Action for U.S. Appl. No. 13/957,810, dated Jun. 27, 2014, 22 pages.
USPTO Final Office Action for U.S. Appl. No. 14/036,299, dated Feb. 24, 2015, 9 pages.
USPTO Non-Final Office Action for U.S. Appl. No. 11/296,906, dated Apr. 8, 2014, 19 pages.
USPTO Non-Final Office Action for U.S. Appl. No. 11/296,906, dated Jun. 12, 2012, 13 pages.
USPTO Non-Final Office Action for U.S. Appl. No. 11/377,164, dated Apr. 7, 2014, 7 pages.
USPTO Non-Final Office Action for U.S. Appl. No. 11/377,164, dated Aug. 18, 2014, 5 pages.
USPTO Non-Final Office Action for U.S. Appl. No. 11/377,164, dated Sep. 10, 2012, 10 pages.
USPTO Non-Final Office Action for U.S. Appl. No. 11/377,167, dated Jun. 27, 2013, 11 pages.
USPTO Non-Final Office Action for U.S. Appl. No. 12/096,591, dated Jun. 14, 2011, 8 pages.
USPTO Non-Final Office Action for U.S. Appl. No. 12/096,591, dated Mar. 27, 2013, 16 pages.
USPTO Non-Final Office Action for U.S. Appl. No. 13/957,810, dated Apr. 17, 2015, 6 pages.
USPTO Non-final Office Action for U.S. Appl. No. 13/957,810, dated Nov. 27, 2013, 18 pages.
Inovate Motorsports, OT-1 16 Channel OBD-II Interface User Manual, Version 1.0, Nov. 28, 2007, pp. 3, 4, 21 & 27.
Trivinci Systems, LLC, Race-Keeper Systems User Guide, Jan. 2011, v1, 1.02, pp. 34 and 39.
USPTO Non-Final Office Action for U.S. Appl. No. 14/036,299, dated Aug. 12, 2014.
DriveCam, Inc.'s Infringement Contentions Exhibit B, U.S. Pat. No. 7,659,827. Aug. 19, 2011. (29 pgs.).
DriveCam, Inc.'s Infringement Contentions Exhibit C, U.S. Pat. No. 7,804,426. Aug. 19, 2011. (47 pgs.).
DriveCam's Disclosure of Asserted Claims and Preliminary Infringement Contentions in *DriveCam, Inc.* v. *SmartDrive Systems, Inc.*, Case No. 3:11-CV-00997-H-RBB, for the Southern District of California. Aug. 19, 2011. (6 pgs.).
Preliminary Claim Construction and Identification of Extrinsic Evidence of Defendant/Counterclaimant SmartDriveSystems, Inc. in *DriveCam, Inc.* v. *SmartDrive Systems, Inc.*, Case No. 3:11-CV-00997-H (RBB), for the Southern District of California. Nov. 8, 2011. (13 pgs.).
USPTO Non-Final Office Action dated Jan. 4, 2016 in U.S. Appl. No. 14/529,134, filed Oct. 30, 2014 (65 pgs).
Notice of Allowance for U.S. Appl. No. 13/957,810, dated Jun. 8, 2015, 10 pages.
PCT International Search Report and Written Opinion for PCT/US15/60721 dated Feb. 26, 2016, 11 pages.
PCT International Search Report and Written Opinion for PCT/IB16/51863, dated Sep. 16, 2016.
Trivinci Systems, LLC, "Race-Keeper System User Guide", V1 .1.02, Jan. 2011, p. 21.
Edwin Olson, A Passive Solution to the Sensor Synchronization Problem, the 2010 IEEE/RSJ International Conference on Intelligent Robots and Systems, Oct. 18-22, 2010, 6 pages.
History of the web browser, Wikipedia (Year: 2019).
Olson, E, A passive solution to the sensor synchronization problem, Intelligent Robots and Systems (IROS), Technical Fields 2010 IEEE/RSJ International Conference on, IEEE, Piscataway, NJ, USA, Searched (IPC) Oct. 18, 2010 (Oct. 18, 2010), pp. 1059-1064, XP031920438, DOI: 10.1109/IROS.2010.5650579 ISBN: 978-1-4244-6674-0.

\* cited by examiner

VEHICLE EVENT RECORDER SYSTEMS

BACKGROUND OF THE INVENTIONS

1. Field

The following inventions disclosure is generally concerned with vehicle event recorders and specifically concerned with distributed vehicle event recorder systems including networked portions coupled via the Internet.

2. Prior Art

Video surveillance systems are used to provide video records of events, incidents, happenings, et cetera in locations of special interest. For example, retail banking offices are generally protected with video surveillance systems which provide video evidence in case of robbery. While video surveillance systems are generally used in fixed location scenarios, mobile video surveillance systems are also commonly used today.

In particular, video systems have been configured for use in conjunction with an automobile and especially for use with police cruiser type automobiles. As a police cruiser is frequently quite near the scene of an active crime, important image information may be captured by video cameras installed on the police cruiser. Specific activity of interest which may occur about an automobile is not always associated with crime and criminals. Sometimes events which occur in the environments immediately about an automobile are of interest for reasons having nothing to do with crime. In example, a simple traffic accident where two cars come together in a collision may be the subject of video evidence of value. Events and circumstances leading up to the collision accident may be preserved such that an accurate reconstruction can be created. This information is useful when trying come to a determination as to cause, fault and liability. As such, general use of video systems in conjunction with automobiles is quickly becoming an important tool useful for the protection of all. Some examples of the systems are illustrated below with reference to pertinent documents.

Inventor Schmidt presents in U.S. Pat. No. 5,570,127, a video recording system for a passenger vehicle, namely a school bus, which has two video cameras one for an inside bus view and one for a traffic view, a single recorder, and a system whereby the two cameras are multiplexed at appropriate times, to the recording device. A switching signal determines which of the two video cameras is in communication with the video recorder so as to view passengers on the passenger vehicle at certain times and passing traffic at other times.

Thomas Doyle of San Diego, Calif. and QUALCOMM Inc. also of San Diego, present an invention for a method and apparatus for detecting fault conditions in a vehicle data recording device to detect tampering or unauthorized access, in U.S. Pat. No. 5,586,130. The system includes vehicle sensors for monitoring one or more operational parameters of the vehicle. The fault detection technique contemplates storing a current time value at regular intervals during periods in which the recording device is provided with a source of main power. Inventor Doyle also teaches in the U.S. Pat. No. 5,815,071, a method and apparatus for monitoring parameters of vehicle electronic control units.

A "computerized vehicle log" is presented by Dan Kikinis of Saratoga Calif. in U.S. Pat. No. 5,815,093. The vehicle accident recording system employs a digital camera connected to a controller in nonvolatile memory, and an accident sensing interrupter. The oldest memory is overwritten by the newest images, until an accident is detected at which time the memory is blocked from further overwrites to protect the more vital images, which may include important information about the accident. Mr. Kikinis instructs that in preferred embodiments, the system has a communications port whereby stored images are downloaded after an accident to a digital device capable of displaying images. This feature is described in greater detail in the specification which indicates a wired download to a server having specialized image handling and processing software thereon.

Inventor Mr. Turner of Compton, Calif., no less, teaches an antitheft device for an automotive vehicle having both an audible alarm and visual monitor system. Video monitor operators are responsible for monitoring and handling an emergency situation and informing a 911 emergency station. This system is presented in U.S. Pat. No. 6,002,326.

A vehicle accident video recorder, in particular, a railroad vehicle accident video recorder, is taught by inventors Cox et al. In this system, a method and monitoring unit for recording the status of the railroad vehicle prior to a potential accident is presented. The monitoring unit continuously monitors the status of an emergency brake of the railroad vehicle and the status of a horn of the railroad vehicle. Video images are recorded and captured for a predetermined period of time after detecting that the emergency brake or horn blast has been applied as an event trigger. This invention is the subject of U.S. Pat. No. 6,088,635.

A vehicle crash data recorder is presented by inventor Ferguson of Bellaire, Ohio in U.S. Pat. No. 6,185,490. The apparatus is arranged with a three stage memory to record and retain information. And further it is equipped with a series and parallel connectors to provide instant on-scene access to accident data. It is important to note that Ferguson finds it important to include the possibility of on-site access to the data. Further, that Ferguson teaches use of a wired connection in the form of a serial or parallel hardwire connector. This teaching of Ferguson is common in many advanced systems configured as vehicle event recorders.

A traffic accident data recorder and traffic accident reproduction system and method is presented as U.S. Pat. No. 6,246,933. A plurality of sensors for registering vehicle operation parameters including at least one vehicle mounted digital video, audio camera is included for sensing storing and updating operational parameters. A rewritable, nonvolatile memory is provided for storing those processed operational parameters and video images and audio signals, which are provided by the microprocessor controller. Data is converted to a computer readable form and read by a computer such that an accident can be reconstructed via data collected.

U.S. Pat. No. 6,298,290 presented by Abe et al, teaches a memory apparatus for vehicle information data. A plurality of sensors including a CCD camera collision center of vehicle speed sensors, steering angle sensor, brake pressure sensor, acceleration sensor, are all coupled to a control unit. Further, the control unit passes information to a flash memory and a RAM memory subject to an encoder. The information collected is passed through a video output terminal. This illustrates another hardwire system and the importance placed by experts in the art on a computer hardware interface. This is partly due to the fact that video systems are typically data intensive and wired systems are necessary as they have bandwidth sufficient for transfers of large amounts of data.

Mazzilli of Bayside, N.Y. teaches in U.S. Pat. No. 6,333,759 a 360° automobile video camera system. A complex mechanical mount provides for a single camera to adjust its viewing angle giving a 360° range for video recording inside and outside of an automotive vehicle.

U.S. Pat. No. 6,389,339 granted to Inventor Just, of Alpharetta, Ga. teaches a vehicle operation monitoring system and method. Operation of a vehicle is monitored with an onboard video camera linked with a radio transceiver. A monitoring service includes a cellular telecommunication s network to view a video data received from the transceiver to a home-base computer. These systems are aimed at parental monitoring of adolescent driving. The mobile modem is designed for transmitting live video information into the network as the vehicle travels.

Morgan, Hausman, Chilek, Hubenak, Kappler, Witz, and Wright with their heads together invented an advanced law enforcement and response technology in U.S. Pat. No. 6,411,874 granted Jun. 25, 2002. A central control system affords intuitive and easy control of numerous subsystems associated with a police car or other emergency vehicle. This highly integrated system provides advanced control apparatus which drives a plurality of detector systems including video and audio systems distributed about the vehicle. A primary feature included in this device includes an advanced user interface and display system, which permits high level driver interaction with the system.

Inventor Lambert teaches in U.S. Pat. No. 6,421,080 a "digital surveillance system with pre-event recording". Pre-event recording is important in accident recording systems, because detection of the accident generally happens after the accident has occurred. A first memory is used for temporary storage. Images are stored in the temporary storage continuously until a trigger is activated which indicates an accident has occurred at which time images are transferred to a more permanent memory.

Systems taught by Gary Rayner in U.S. Pat. Nos. 6,389,340; 6,405,112; 6,449,540; and 6,718,239, each directed to cameras for automobiles which capture video images, both of forward-looking and driver views, and store recorded images locally on a mass storage system. An operator, at the end of the vehicle service day, puts a wired connector into a device port and downloads information into a desktop computer system having specialized application software whereby the images and other information can be played-back and analyzed at a highly integrated user display interface.

It is not possible in the systems Rayner teaches for an administrative operator to manipulate or otherwise handle the data captured in the vehicle at an off-site location without human intervention. It is necessary for a download operator to transfer data captured from the recorder unit device to a disconnected computer system. While proprietary 'Drive-Cam' files can be e-mailed or otherwise transferred through the Internet, those files are in a format with a can only be digested by desktop software running at a remote computer. It is necessary to have the DriveCam desktop application on the remote computer. In order that the files be properly read. In this way, data captured by the vehicles is totally unavailable to some parties having an interest in the data. Namely those parties who do not have access to a computer appropriately arranged with the specific DriveCam application software. A second and major disadvantage is systems presented by Rayner includes necessity that a human operator service the equipment each day in a manual download action.

Presently vehicle event recording systems are configured in a manner which greatly restricts the ability of the components to be remotely located from one another. Indeed, in best circumstances of the prior art, a manager workstation computer is located at a vehicle parking facility office. This demands that the administrator/manager, and all users of services provided by the server, consume those services at a parking facility. This demands that specialists who require access to information go to the server facility to receive that information. The only alternative available today, includes transmitting data by e-mail in proprietary digital formats to users able to read those formats and consume them at remote computers. The applications and services can not be arranged as distributed systems. This demand specialized computer desktop application software on the receiving system. It is apparent that such arrangements have great disadvantages, and as a result thereof, deployment is greatly limited.

While systems and inventions of the art are designed to achieve particular goals and objectives, some of those being no less than remarkable, these inventions have limitations which prevent their use in new ways now possible. Inventions of the art are not used and cannot be used to realize the advantages and objectives of these inventions taught herefollowing.

SUMMARY OF THE INVENTIONS

Comes now, James Plante of Del Mar, Calif. with inventions of distributed vehicle event recording systems including devices and methods deployed in networks which may include the Internet.

These vehicle event recorder systems include fleets of vehicles, video recording systems, communications networks, centralized server computers, and specialized application specific computer code to enable highly unique system functionality. Fleet vehicles are put into communication with the server whereby data exchange is automatically triggered in response to normal and common use of the vehicle without driver/manager intervention. Vehicles returning to an appropriately arranged parking facility automatically connect with a server and start a communications transaction which includes download of video data to the server where it may be processed and further accessed by various interested parties. Video data includes primarily scenes ahead of a vehicle captured when the vehicle is involved in an event such as a traffic accident for example.

Vehicle fleet management networks are characterized as including: at least one vehicle event recorder; a communications space formed from the combination of a vehicle parking facility and a wireless communications system; a network sometimes including the Internet; and an applications specific server computer. The vehicle event recorder which includes a radio transmitter is further coupled to the communications space by way of a proximity trigger whereby presence of the vehicle in the communications space enables data transfer actions where video data is conveyed from the vehicle to remote servers for further use.

A vehicle event recorder includes a camera, microprocessor, memory, mobile wireless transceiver, a connection manager, and a proximity trigger. Video images captured by the camera are stored in a specially arranged memory buffer until the vehicle returns to a parking facility when those images are automatically transferred to a remote server.

A communications space includes a parking facility, a fixed wireless transceiver, network address server; broadband connection to a communications network for example the Internet; authentication systems. Upon arrival of an authorized fleet vehicle into the communications space, a prescribed handshaking between the vehicle event recorder and the fixed wireless transceiver includes an authorization process. A vehicle suitably identified is then in position to call a remote server via proprietary data exchange methods. Accordingly, servers include applications specific software; connections to computer networks; web applications and web services arranged to cooperate with vehicle event recorders.

OBJECTIVES OF THESE INVENTIONS

It is a primary object of these inventions to provide fleet management tools based upon vehicle event recording systems.

It is an object of these inventions to provide vehicle event recorder systems including a distributed network component.

It is a further object to provide vehicle event recorder systems including the Internet.

It is optionally an object of these inventions to provide fleet management tools whereby automated reporting is enabled such that a fleet manager can take specific actions in response to reports automatically generated by these systems.

It is optionally an object of these inventions to provide fleet management tools whereby a data analyst may be far removed from fleet vehicles.

It is optionally an object of these inventions to provide distributed fleet management services and applications whereby an insurance underwriter can process data captured by the system to manage risk.

It is optionally an object of these inventions to provide fleet management tools whereby an automobile maintenance team can respond to conditions detected and reported by these systems.

It is optionally an object of these inventions to provide fleet management tools whereby a roadways/highways engineer can receive reports and alerts which relate to roadway conditions.

It is optionally an object of these inventions to provide fleet management tools whereby government authorities act upon data captured.

Better understandings are realized with reference to detailed descriptions of preferred embodiments and with reference drawings appended hereto. Embodiments presented are particular ways to realize and bring forth these inventions; they are not inclusive of all ways possible. There may exist embodiments that do not deviate from the spirit and scope of this disclosure as set forth by appended claims, but do not appear here as specific examples. It will be appreciated that a great plurality of alternative versions are not only possible, but probable.

BRIEF DESCRIPTION OF THE DRAWING FIGURES

These and other features, aspects, and advantages of the present inventions will become better understood with regard to the following description, appended claims and drawings where:

FIG. 1 illustrates schematically various types of fleet vehicles in respective groups, each in communication with a central server via the Internet;

FIG. 2 presents in greater detail various facility in which fleet vehicles are in communication through the Internet;

FIG. 3 suggests an important alternative including a 'store and forward' preprocessing station;

FIG. 4 presents in detail, a general block diagram of a vehicle event recorder unit suitable for use with an automobile;

Figure 7:
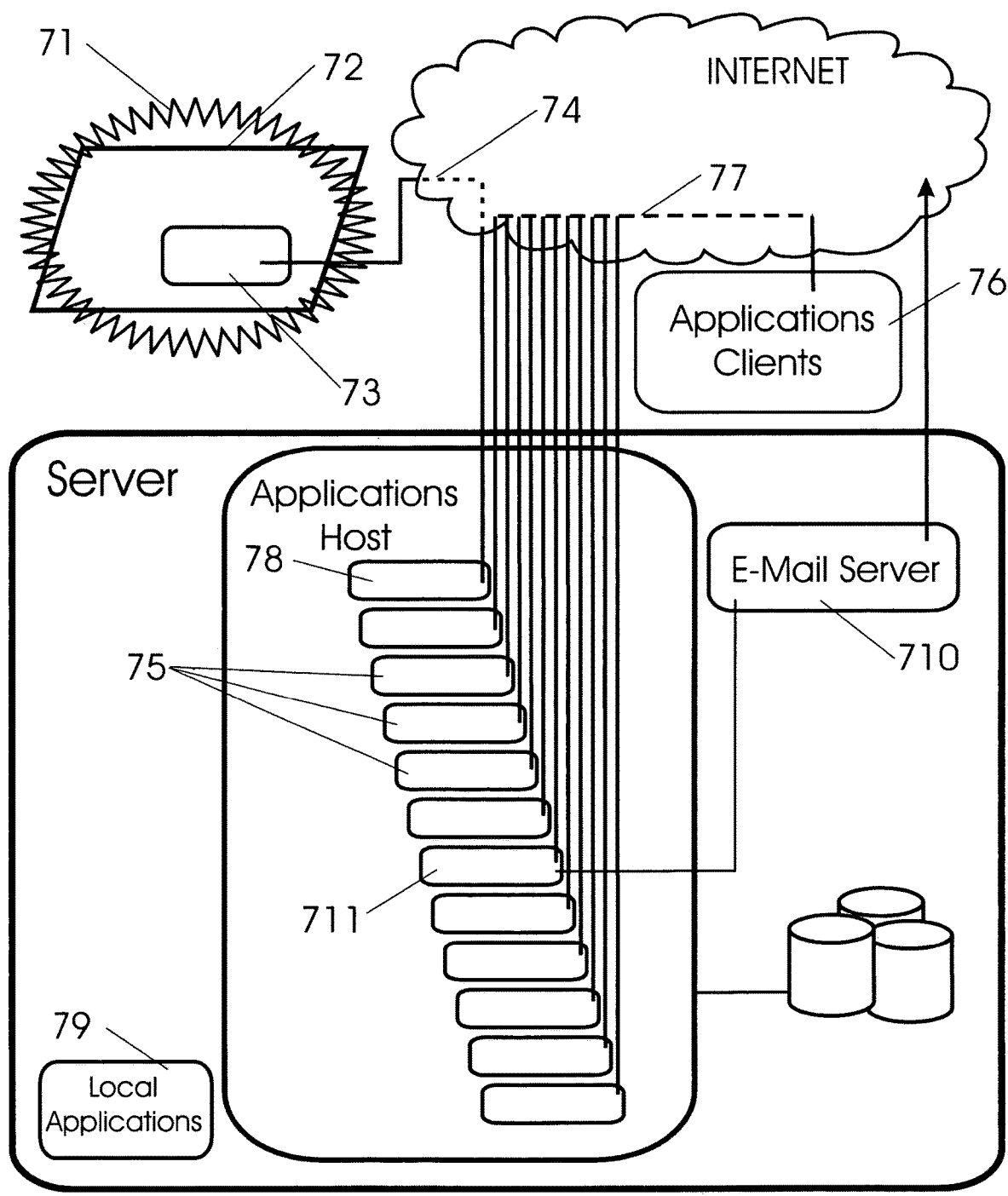
Figure 8:
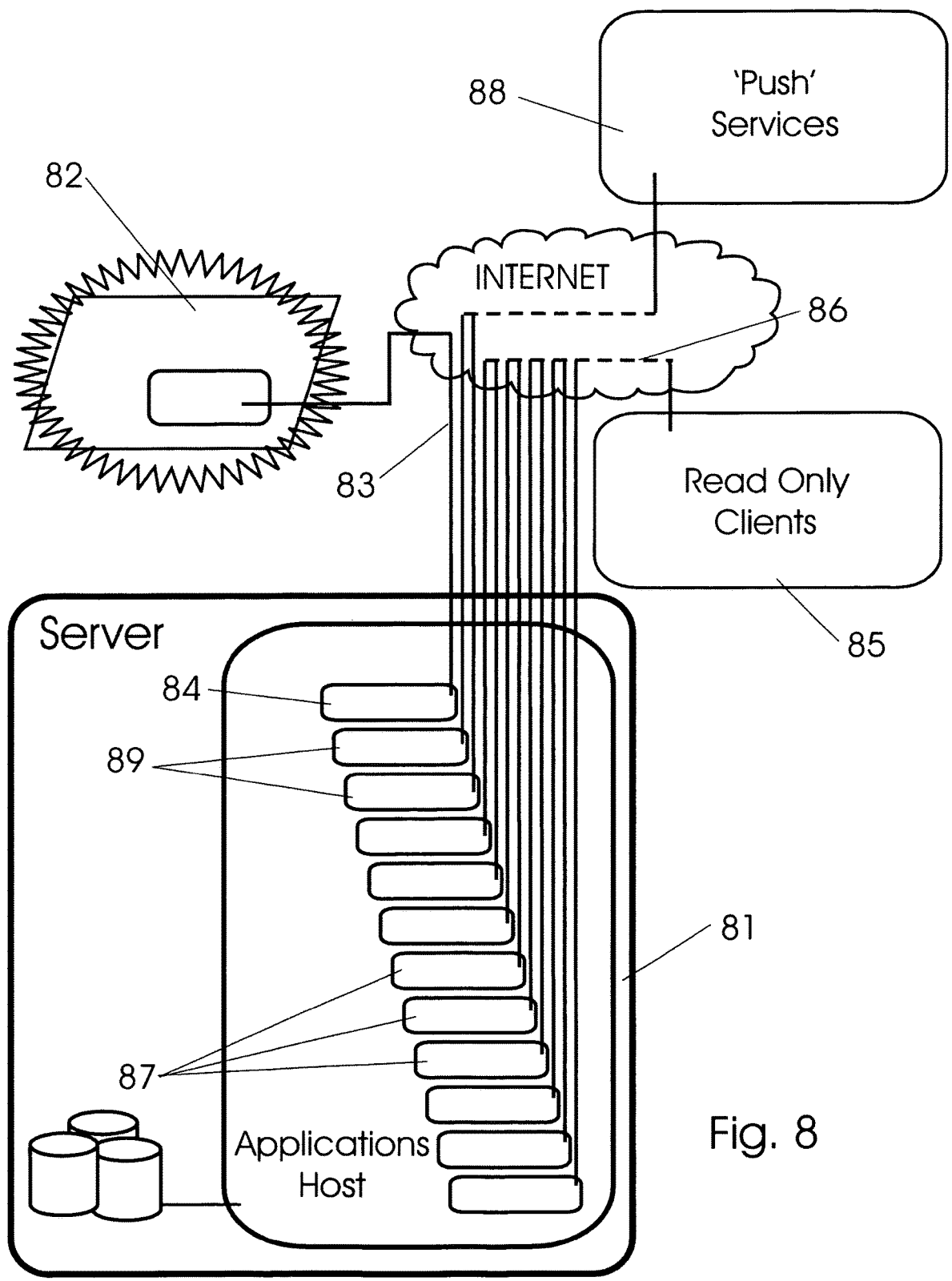
Figure 9:
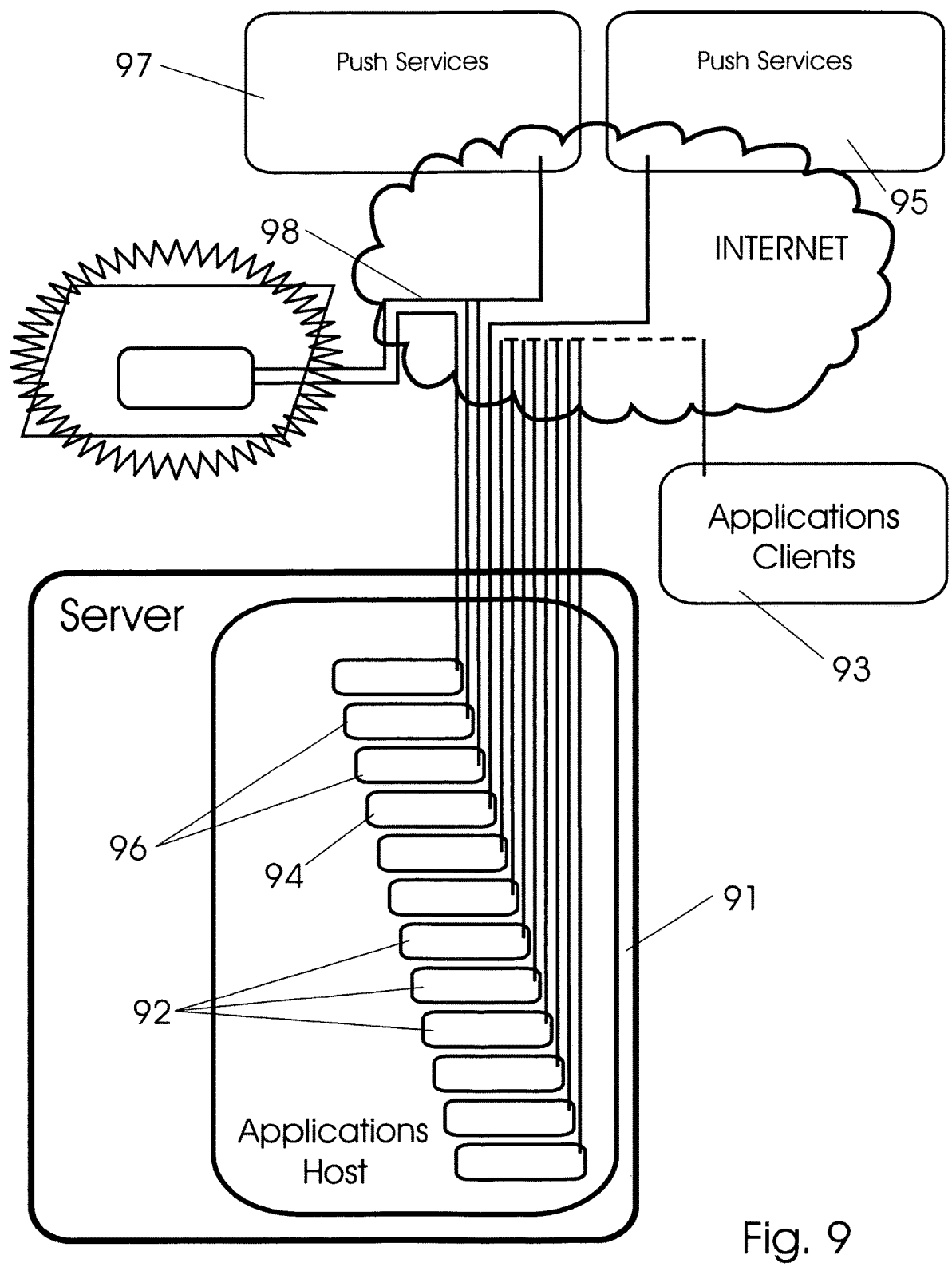
Figure 10:
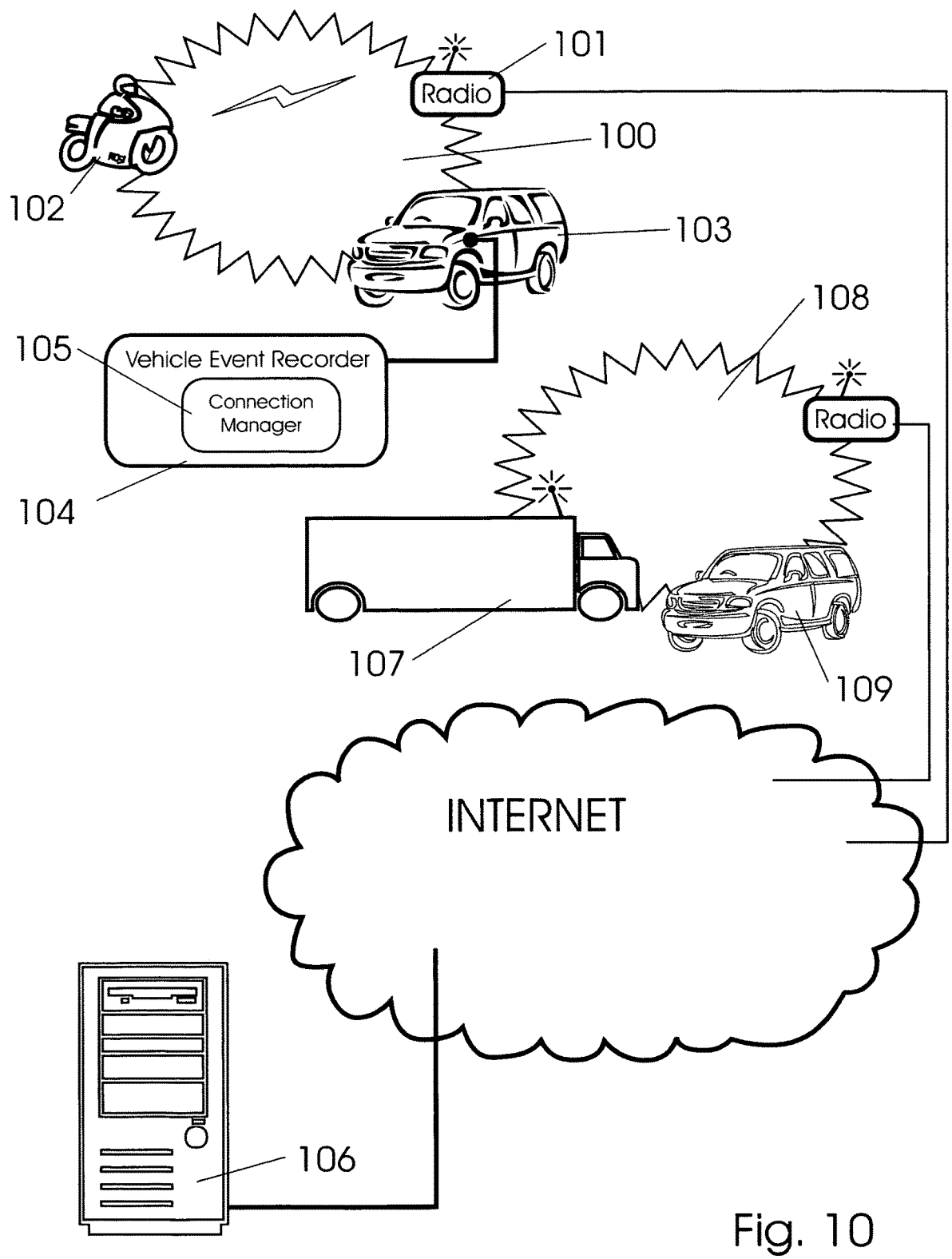
Figure 11:
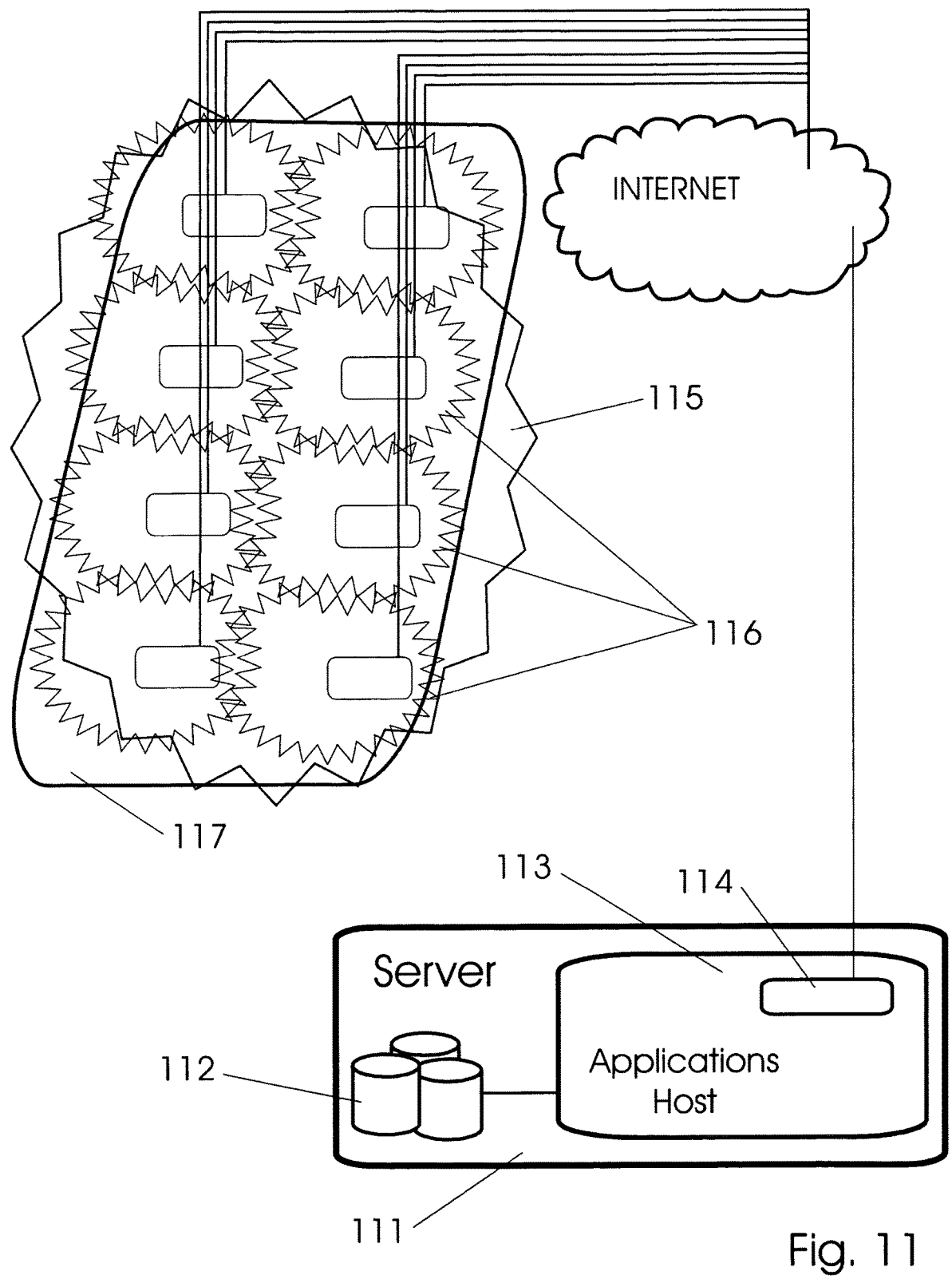
Figure 12:
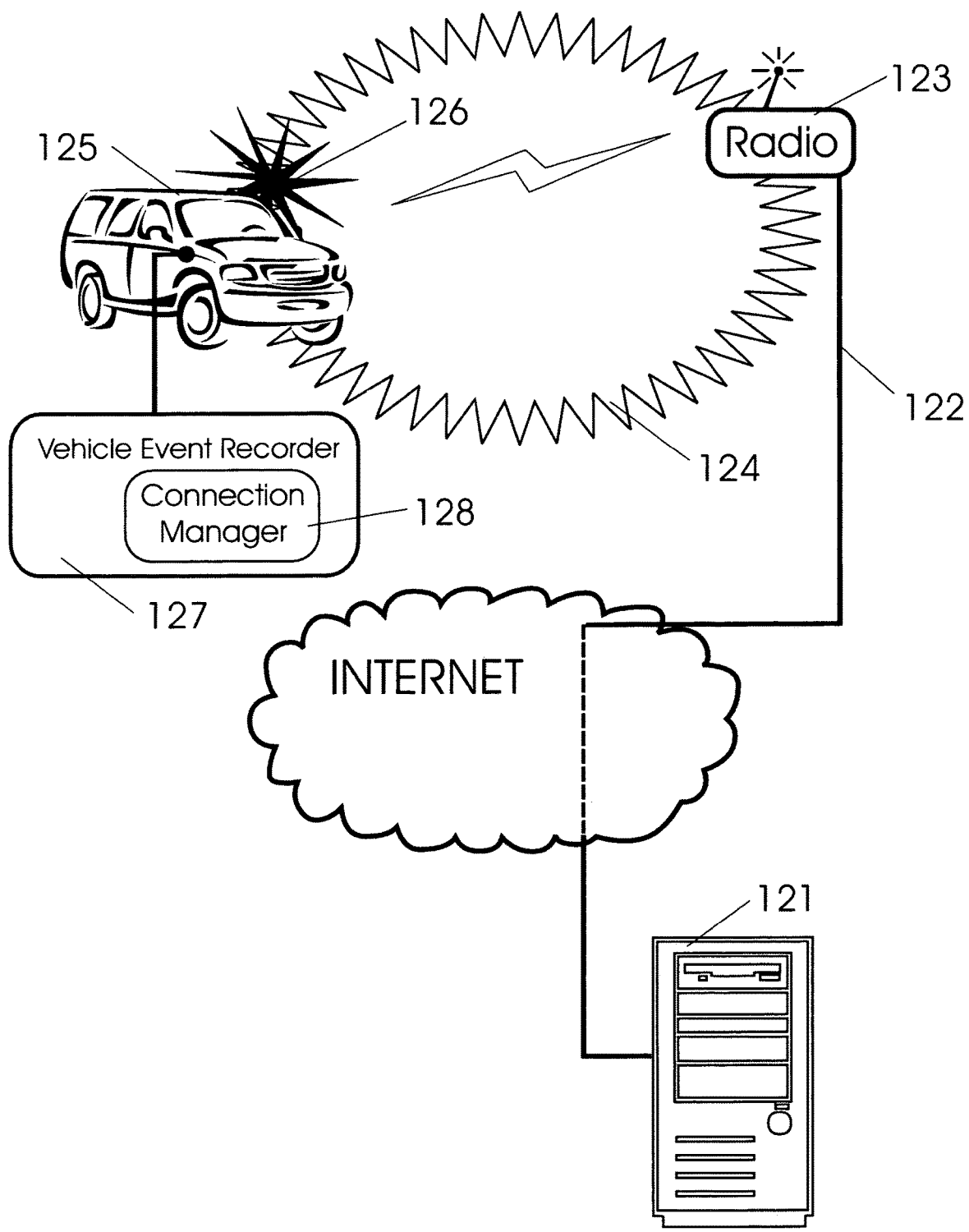

FIG. 7 presents examples of a system server and illustrates functionality associated therewith;

FIG. 8 is a diagram which suggests some discrete special relationships between entities that interface with a server via these networks;

FIG. 9 shows further relationship paths between network entities, vehicle event recorders and related servers;

FIG. 10 presents a system having a plurality of particular download spaces in cooperation with a single server;

FIG. 11 describes fields associated with a scheme to enlarge a download space; and FIG. 12 illustrates an important proximity trigger which sets into motion a primary function of these systems.

GLOSSARY OF SPECIAL TERMS

Throughout this disclosure, reference is made to some terms which may or may not be exactly defined in popular dictionaries as they are defined here. To provide a more precise disclosure, the following terms are presented with a view to clarity so that the true breadth and scope may be more readily appreciated. Although every attempt is made to be precise and thorough, it is a necessary condition that not all meanings associated with each term can be completely set forth. Accordingly, each term is intended to also include its common meaning which may be derived from general usage within the pertinent arts or by dictionary meaning. Where the presented definition is in conflict with a dictionary or arts definition, one must consider the context of use and liberal discretion to arrive at an intended meaning. One will be well advised to error on the side of attaching broader meanings to terms used in order to fully appreciate the depth of the teaching and to understand all intended variations.

Vehicle Event Recorder

A vehicle event recorder is fashioned as electronic apparatus which may include video recording equipment, audio recording equipment, vehicles system sensors, environmental sensors, a microprocessor, application-specific programming, and a communications port among others. A vehicle event recording unit is sometimes preferably built into a small housing suitable for mounting to a common vehicle such as a truck, car, motorcycle, airplane, or ship. Where some vehicle system sensors are not within the housing of the vehicle event recording unit, the vehicle event recorder unit includes communication therewith by electronic connector and wireline, or other wireless communications means—for example 'bluetooth' links.

Wireless Communications Space

A wireless communications space is defined by the region in which a electromagnetic communication signal may be reliably received and transmitted by at least two communicating transceivers. The wireless communications space has a 'soft' boundary which tends to breathe in size and thus is not mechanically fix at some particular size at all times. However, this should not take away from the notion that wireless communications space is a discrete entity.

Fleet

Herein this disclosure, we often refer to a 'fleet' of vehicles. A 'fleet' is comprised of a group of related vehicles. The relationship between vehicles in any one fleet is most generally by ownership or management; however, other factors may connect the vehicles of a single fleet. For example, the maintenance interests may cause several vehicles owned by independent parties to become part of a 'single fleet' for purposes of these systems. It is also necessary to point out that a special case 'fleet' may be comprised of a single vehicle. While outside the traditional sense of the word fleet, a single vehicle fleet is fully anticipated and included for purposes of the systems discussed here.

Proximity Trigger

A 'proximity trigger' is a system devised to detect a prescribed proximity condition and provide an electronic signal in response thereto; the electronic signal being coupled to another system which may be set into action as a result of having received the proximity trigger signal.

Event Trigger

An 'event trigger' is a system devised to detect a prescribed physical condition and provide an electronic signal in response thereto; the electronic signal being coupled to another system which may be set into action as a result of having received the event trigger signal.

Parking Facility

A bit of latitude shall be used to interpret what is meant by 'parking facility' or 'parking lot'. These terms are meant to include any place which can accommodate temporary storage of a vehicle for at least a short period of time. It is not essential that the vehicle actually stop nor fully engage a 'parked' status. A slow moving vehicle in a prescribed space such as a specially configured 'download' lane can serve for purposes of these inventions as a 'parking facility'. A parking facility is merely a place in which a vehicle might occupy while within range of a radio transceiver.

PREFERRED EMBODIMENTS OF THESE INVENTIONS

In accordance with each of preferred embodiments of these inventions, vehicle event recorder systems are provided. It should be understood that each of these embodiments described include an apparatus the apparatus of one preferred embodiment may be different than the apparatus of an alternative embodiment.

Vehicle event recorder systems of these inventions are primarily characterized as including: at least one fleet of vehicles, each vehicle of the fleet having a recorder unit affixed thereto, a download space; a fixed wireless radio having a broadband network connection; a server computer system arranged to provide application specific functionality. The download space is further defined as the region over which wireless communications link can be maintained between the radio transceiver of a vehicle event recorder and a fixed wireless transceiver. This download space also includes facility in which a vehicle can be temporarily accommodated (parked) while a communication link is maintained. Application specific functionality is further specified as web services and web applications which can be provided from a remote server via TCP/IP transactions over a public communications network. In this case, a proprietary protocols are adopted whereby microprocessors in vehicle recorder units make calls to and receive responses from remote servers.

Due to the highly mobile nature of vehicles, they do not cooperate well with being permanently connected to information networks. While there may be limited connection support, for example via USB or firewire hardwire connections, or by mobile telephone networks, these connections have burdensome limitations which render such arrangements not desirable. Temporary hardware connections require an human operator and significant daily overhead associated with a download strategy. Mobile telephone networks have bandwidth limitations and reliability issues which prevent use of those connections in a manner demanded by some high performance applications.

In systems first presented here, a vehicle enters a communications space having wireless coverage such that the vehicle is connected to the server and communicates therewith. The relationship between the vehicle event recorder and the communications space is such that mere entry of the vehicle establishes the communications link and initiates at least a download transaction. In this way, the need for an operator to carry a laptop to each vehicle and initiate a physical connection is completely removed.

Figure 1:
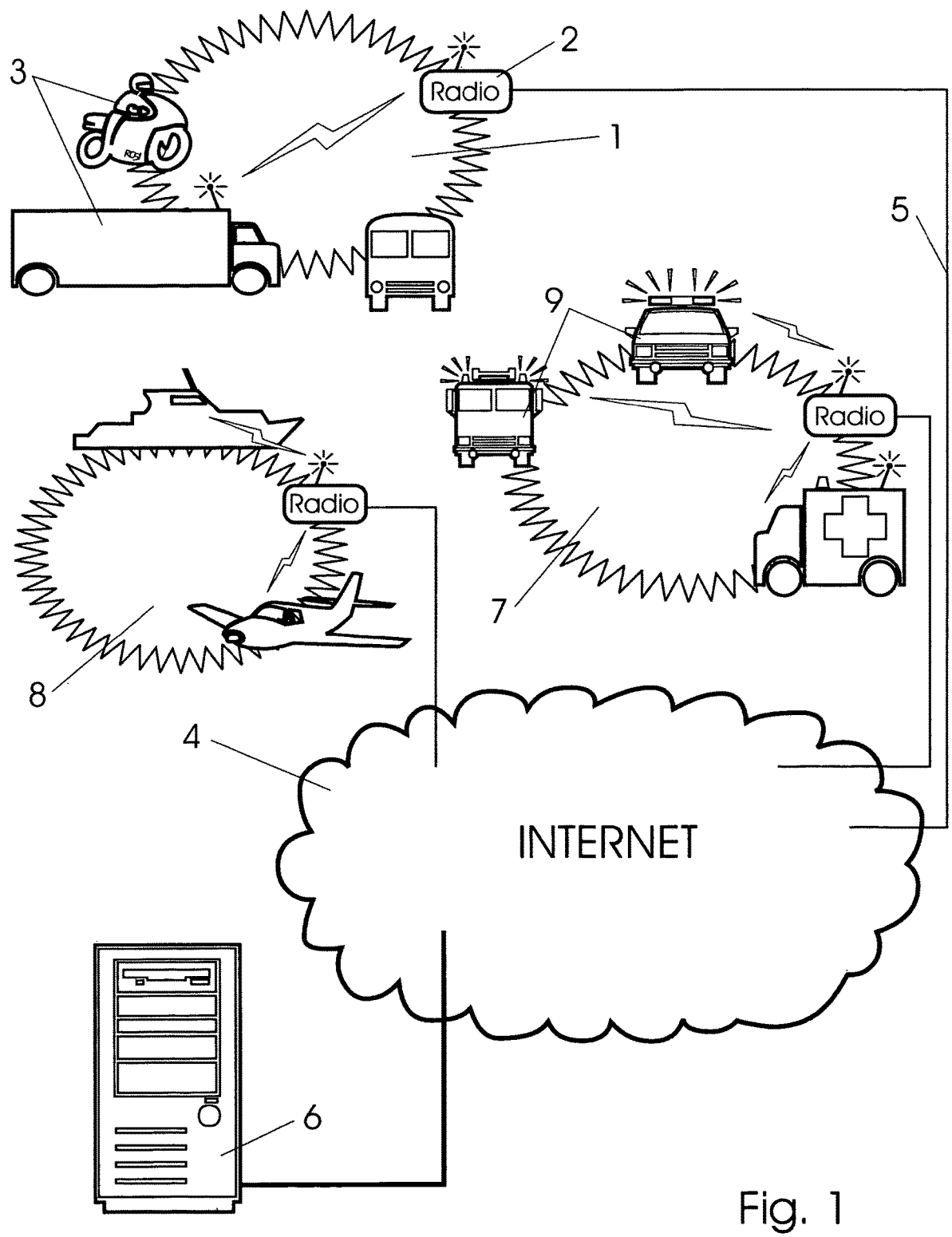

With reference to FIG. 1, a clear understanding of important and primary features of these inventions may be realized. In particular, one will fully appreciate how independent fleets of vehicles may be in communication with a centralized server by way of a highly distributed network such as the public Internet. A fundamental element of these systems includes communications space 1 the region of space covered by wireless communications radio service. For example, when a communications link is comprised of a 'WiFi' type radio transceiver 2, the transceiver has limited extent over which reliable communication is sustained. For a WiFi system, this extent is approximated by a sphere having a radius of a few hundred feet. As such, a common parking facility such as a small parking garage may be served by a WiFi radio system which is ample for fleets of a few tens of vehicles all parked in a common parking location. Accordingly, these systems include special cooperation between a storage location for vehicles and a wireless data communications link; that is, the range of transceivers is configured to envelope and surround the appropriate vehicle storage location.

Thus, the extent of wireless communications space 1 is defined by and served by wireless radio transmitter 2, which broadcasts radio signals into the space. When a specially configured mobile computer installed within a prescribed fleet vehicle 3 enters the communications space, the computer detects this condition. Upon detection that a signal is present (vehicle has arrived in the communications space), the computer makes a communications connection and performs a 'handshaking' which includes a network address assignment; for example from a radio/router service arranged as a network address server. Once the mobile computer has a network address, it is prepared to communicate directly over the Internet 4 and with network nodes similarly connected. The radio is preferably connected to the Internet by a broadband connection 5, for example a digital subscriber line DSL or cable or fiber type connection or a mix of these high-speed systems. Finally, as a network endpoint on the other end, an application specific system server 6 is comprised of programming suitable for communication with a plurality of vehicle event recorder units, a plurality of communications spaces, which may be widely and remotely distributed.

Various vehicles 3, including trucks, motorcycles buses et cetera, together form an example of a fleet. A fleet is generally a group of cars which are somehow interrelated. A fleet may be comprised of a plurality of vehicles such as the school buses of a single school district. 50 buses may form a fleet of vehicles with a common owner, administrative staff, physical management facility and parking lot. As such, a school bus vehicle fleet is ideally suited for some preferred versions of these inventions.

Any particular fleet may have associated therewith a specific parking lot or other storage area to which fleet members are returned each night after a service day. In preferred embodiments, such parking space is equipped with a radio transceiver or radio transceiver network such that all vehicles make a communications connection with the Internet upon their arrival at the parking facility. Thus, the combination is defined here that a vehicle storage location in combination with a suitably arranged transceiver which envelopes the vehicle storage location is a communications space 7. Radio transceivers form a communications envelope which surrounds a parking facility whereby returning vehicles pierce the envelope boundary as they enter the parking facility and a reliable communications connection to the Internet is automatically instantiated thereafter the vehicle enters the communications space. By way of application specific computer programming code running on the vehicle event recorder, the vehicle event recorder contacts a remote server and exchanges transactions therewith. Thus, it is not necessary for the driver to manually set, trigger, connect or enable any action. Indeed, the driver need not even be aware of the existence of the system and its workings. A driver merely has to return the car to the parking lot to cause a communications connection to become enabled automatically.

While systems described in detail here are those which include fleet members of the type characterized as 'motor vehicles', i.e. cars, motorcycles, trucks and buses operated on streets and highways, these inventions are not limited to those kinds of vehicles. Indeed it is anticipated fully that these inventions will also serve quite well vehicle systems which are not automobile type vehicles. Indeed, a certain special download space 8 can be arranged whereby yachts enter that space to cause an automated communications connection. A harbor can support a fixed WiFi transmitter and high-speed Internet connection whereby all boats entering the harbor are enabled with communication to a server. Under this arrangement, a harbor is a 'parking facility'. Similarly, airplanes which approach an appropriately equipped gate come into contact automatically with the system server which operates to download information recorded during the service use of that fleet vehicle being an aircraft. To properly interpret the meaning of the term 'vehicle', one is advised to not impose more restrictive common meanings to conclude that only cars are considered here. Additionally, one must carefully construe the term 'parking facility' to mean the place where a vehicle may be temporarily accommodated.

In review, a fleet of vehicles equipped with event recording units enter prescribed communications spaces to automatically establish a wireless communications link with a remote application server configured to communicate with the vehicle event recorders. There is no longer a need for a human operator to engage a vehicle to establish a physical connection by way of a mechanical plug-in device and system; it is no longer necessary to remove and exchange tapes from tape recording type systems; there is no longer need to manually perform a download step; there is no longer need for an on-site fleet IT manager to be involved in any way.

Independent fleets of vehicles, which are maintained, owned and operated by an independent parties, may similarly be in communication with the same server. A separate communications space 7 which may be remotely located with respect to another communications space 8, serves an entirely different and unrelated fleet. For example, when public authorities operate and maintain a fleet of emergency vehicles 9, these vehicles may enter communications space 7 to activate a communications link whereby data recorded by recording unit can be downloaded to the centralized server. This communications space may be a parking lot associated with the city vehicles. Indeed it may be the very same parking lot appropriate for storage of vehicles overnight. In this way, the vehicle operator returns the car to the lot at night for storage and without taking any further act causes data to be downloaded to the remotely located server. Thus, the lot only need be equipped with a WiFi transmitter appropriately connected to the Internet and is no longer necessary to maintain a computer on-site. Such architecture frees fleet information technology IT managers from actually being in the same location as the fleet vehicles. It is no longer necessary to maintain a strong IT capacity at the same location where the vehicles are stored. A 'smart' parking lot only needs to be equipped with very inexpensive WiFi radio transmitters and a broadband connection to the nearest Internet service provider ISP.

Figure 2:
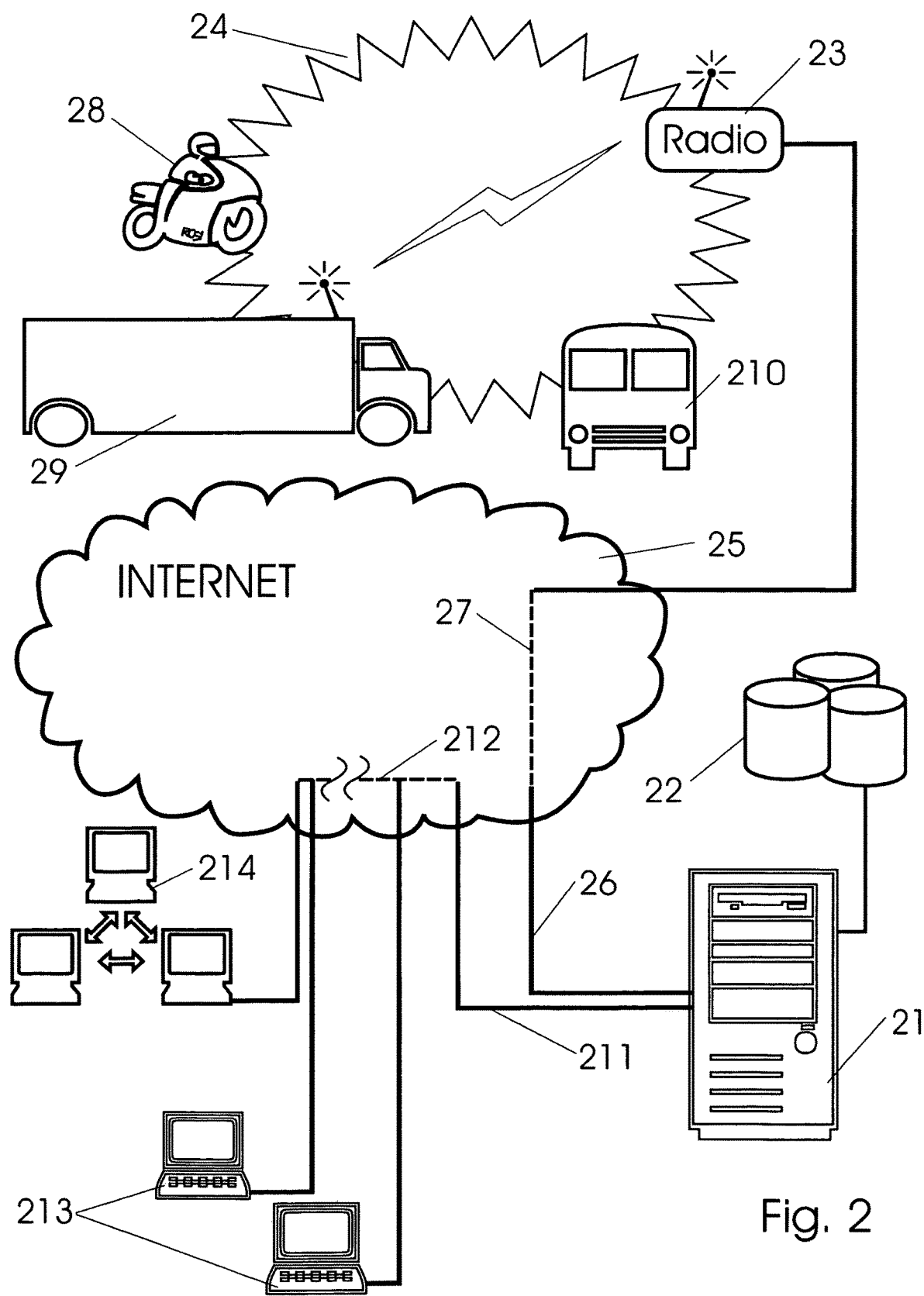

A further understanding may be realized in view of FIG. 2 which shows in greater detail an architecture including additional system elements in communication with a vehicle event recorder network. In particular, server 21 having a well defined and fixed network address associated therewith, is in communication with mass storage database 22, and is further coupled by way of the Internet to a wireless radio transceiver 23. The transceiver has a useful range which defines the extent of the communications or download space 24.

One will fully appreciate advantages of having the Internet between the architecture endpoints; i.e. the server/database network node and the vehicle recorder unit network node. As fleet vehicle storage and information technology professionals and offices are sometimes necessarily not in the same locations, it is highly useful to provide efficient communications between there over large distances. Further, as the data collected is these systems is highly useful to many independent and distributed parties, is similarly useful to make access to the data over highly distributed networks including the Internet.

While the Internet is a public system, it also can be used for highly secure and private transmissions of information. For example, a special link 26, dedicated to the application at hand, may permit the server to communicate privately with known system members. In some instances, this can be achieved by way of a virtual private network or VPN 27. It is also possible to simply arrange communications over the public network, in a coded fashion only understood by the server and the vehicle event recording units aboard vehicles 28, 29 and 210. Each of these vehicles, being qualified members of the system, exchange digital transactions with a prescribed server. An unauthorized computer attempting to communicate with the server, could not properly form requests without prior knowledge of the services and communications protocols available on the server. Thus, the server's private services would not be easily accessible to those who were not members.

On the other hand, the server connected via the Internet, is at the same time widely available to all systems similarly coupled to the Internet, without regard to location. Thus, web applications may be served to authorized users by the same server along communication path 211. As the server is connected to the Internet in this way, any number of users may communicate 212 simultaneously with the server. Individual managers operating remote workstations 213 can view web applications served by the server and interact therewith from any location in the world. Thus it is no longer a requirement that an administrator of recorded vehicle video information be present at the vehicle or at the vehicle's parking facility which has heretofore been quite near in distance or co-located with the location where a vehicle fleet is stored nightly. A parking facility was generally made to include an IT office with a download workstation running desktop applications. Indeed, the entire remote intranet 214 of a company of many employees may be similarly connected and in communication with a server and database holding data captured by a vehicle event recorder. This will prove in the following sections to be a major advantage of these systems. The reason for this is the data which is gathered by a vehicle event recorder is useful for many entities which are not precisely a top level fleet administrator/manager, but other interested parties relating to vehicle use and management. It is great relief that these entities no longer have to receive raw data by unmanaged e-mail transmission, nor do they have to go visit a physical site where a vehicle is parked, nor do that to rely on human operators to download data from subject vehicles each day when the vehicle arrives at its storage facility. When vehicle event recorders are coupled with automatic downloads to high power servers well connected in shared network relationships, information is processed more efficiently and results in a system of greater functionality and processing power.

Another important strategy permits system members, for example computer programming in recorder units, to consume 'web services' basically—computer services or programming functionality. The programming functionality is not available to outside systems, nor are there any visible components or human interface to web services. Web services are provided for computers to interact with computers. Thus, a vehicle event recorder unit in a vehicle, which is presently in a prescribed communications space may call a computer function which resides and is executed on the remote server. Thus, very large processing power and database capacity is available at relatively small computing facility associated with vehicle event recorder unit—while at the same time, obviating the need for a computer workstation at the parking site.

Another great advantage to having the Internet as part of the system architecture, includes a possibility of customer interaction from wherever they may be located. Indeed, it is quite preferred that interested parties are not located in a commonplace with the download and server facility. This is partly due to the fact that many unrelated parties, may have interest in the same data. For example, insurance underwriters may be interested in reviewing driving history's. Of course it would be overly burdensome to ask insurance underwriters to review driving records at a fleet facility.

Because of the particular nature of vehicle fleets and the activity associated therewith, it is sometimes necessary to provide special system architecture to accommodate. In particular, special circumstance arises in the case where a large number of fleet Vehicles returns to a lot at approximately the same time. If a server computer is separated from the vehicle fleet by a bandwidth limited link, then excessive data traffic will prevent completely organized downloads from all vehicles. As it is physically impossible to provide bandwidth unlimited links, it is preferred that a local buffer be deployed. A local buffer arranged to receive and hold a massive amount of video data from all returning cars and to later transfer that information over time to a server is an improved arrangement.

The problem is exacerbated when fleet 'turn-around time' is short; for example, in a taxi or police fleet where the vehicles are used on multiple shifts with various drivers. In this case, it is impossible for the server to download data from one vehicle at a time in a serial operation as the vehicle in the download queue will tend to be ready for return to service before their download operation may be completed.

Figure 3:
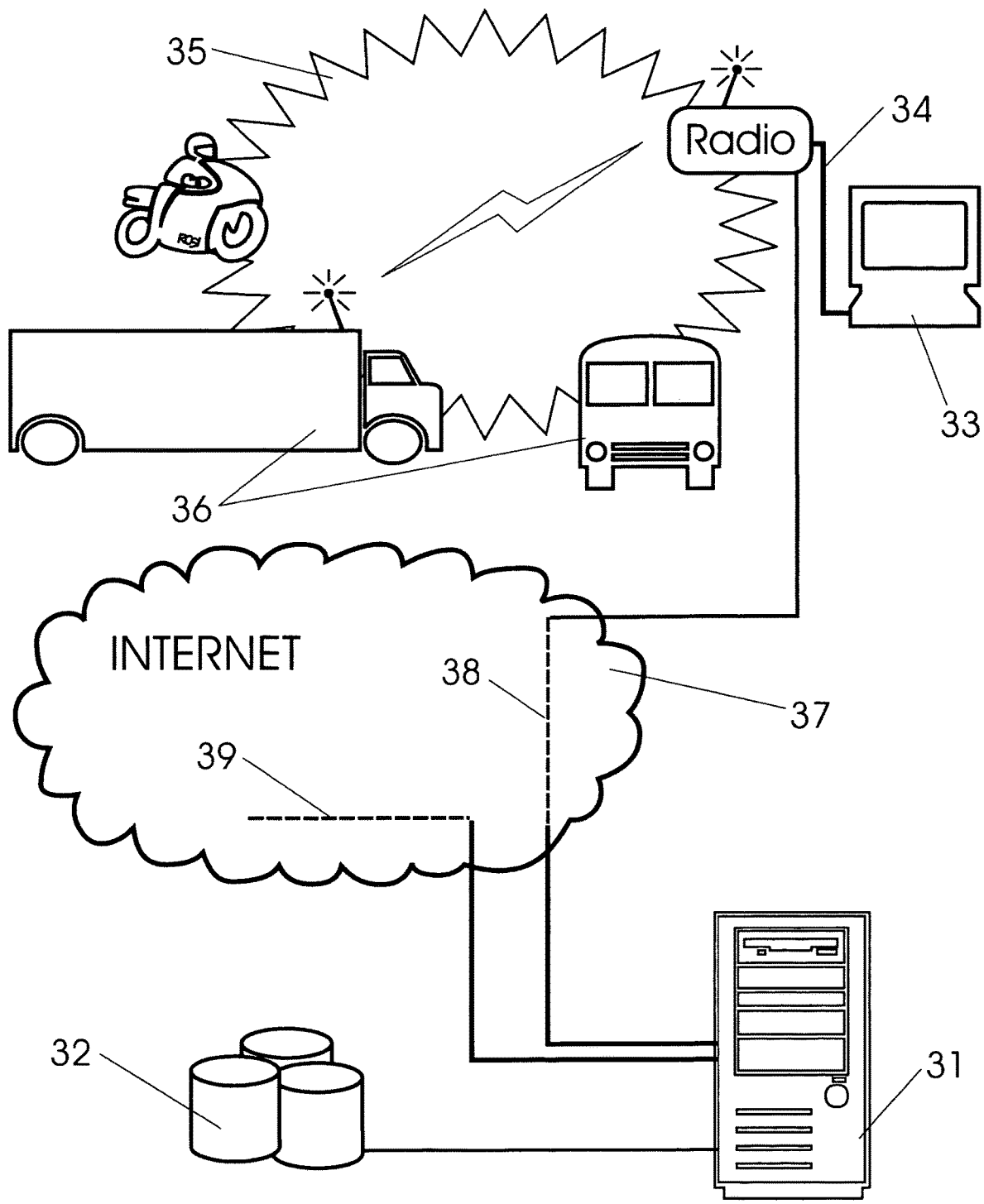

An alternative system architecture configuration is herein presented in conjunction with FIG. 3. This configuration includes a dedicated workstation computer co-located at or near the facility where vehicles are stored. The dedicated workstation computer includes specialized data management services and provides: fast download, store and forward functions, scheduling, authorization administration, among others. In some cases it is preferable to include a very high speed downloading service on site at the parking facility. This is particularly the case when many vehicles arrive simultaneously at a shift change for instance. Since not all broadband connections to the Internet are sufficient for quick transfer of very large quantities of data, in some cases it will require a workstation computer configured: for authorization and authentication processes; further to receive at very high speeds, information including video data from arriving vehicles; for buffer storage of that data; for data queue management and for further transfer to a centralized server at a later time.

Accordingly, FIG. 3 shows a server 31 well coupled with a mass storage database 32. By well coupled, it is meant that provision is made for fast and frequent, and efficient exchange of data. That's is, not only is the bandwidth very high, but the programming between code running on the server and code running in the database are well tuned with respect to the application at hand and formed in conjunction with one another. The server is connected via the Internet to workstation 'store and forward' buffer computer 33, which is co-located with the parking facility where fleets vehicles are stored. The workstation computer is in communication with the WiFi wireless transmitter via very high speed communications link 34 which provides communications space 35 into which arriving vehicles 36 may be received. It is possible to complete such a download in a very short period of time. Data is passed wirelessly from a vehicle event recording unit to the WiFi transmitter, and thereafter to the workstation computer. Data is temporarily stored at the workstation computer. The data is later transmitted into the Internet 37, then over modest bandwidth private link 38, and finally arrives at the server 31 and database 32. This server exposes web services and web applications to a wide audience 39 which may consume these from anywhere where Internet access is available. In this way, data collected by fleet vehicles is made available to widely distributed interested parties.

The premise of these inventions lies in fleet vehicle management strategy. As such, one system endpoint is a vehicle event recorder which is suitably affixed and mounted within a common vehicle especially an automobile. These devices may be a permanently affixed within vehicles and will soon be provided as manufacture standard equipment. Electrical couplings such as power supply and data connections with the vehicles electronic systems may be made through standard connectors and interfaces. These devices are thus coupled to the vehicle and its systems. They are further coupled to the vehicle whereby an optic axis of a camera is aligned to provide images of events occurring about the vehicle. In some versions a second camera has a field-of-view includes the space which contains the vehicle operator. A single vehicle event recorder may be provided with a plurality of cameras and corresponding number of image spaces. Thus some vehicle recorder units contain two cameras, one pointing forward and one pointing toward the operator spaces.

These devices are sometimes arranged to be completely self-contained and require as little mechanical connection with vehicle systems as possible. For example, it is necessary to have a good mount which provides that the optical axis be aligned with desired fields of view, however, it is not a requirement that the device be integrated with a vehicle computer, or other vehicle hardware.

Figure 4:
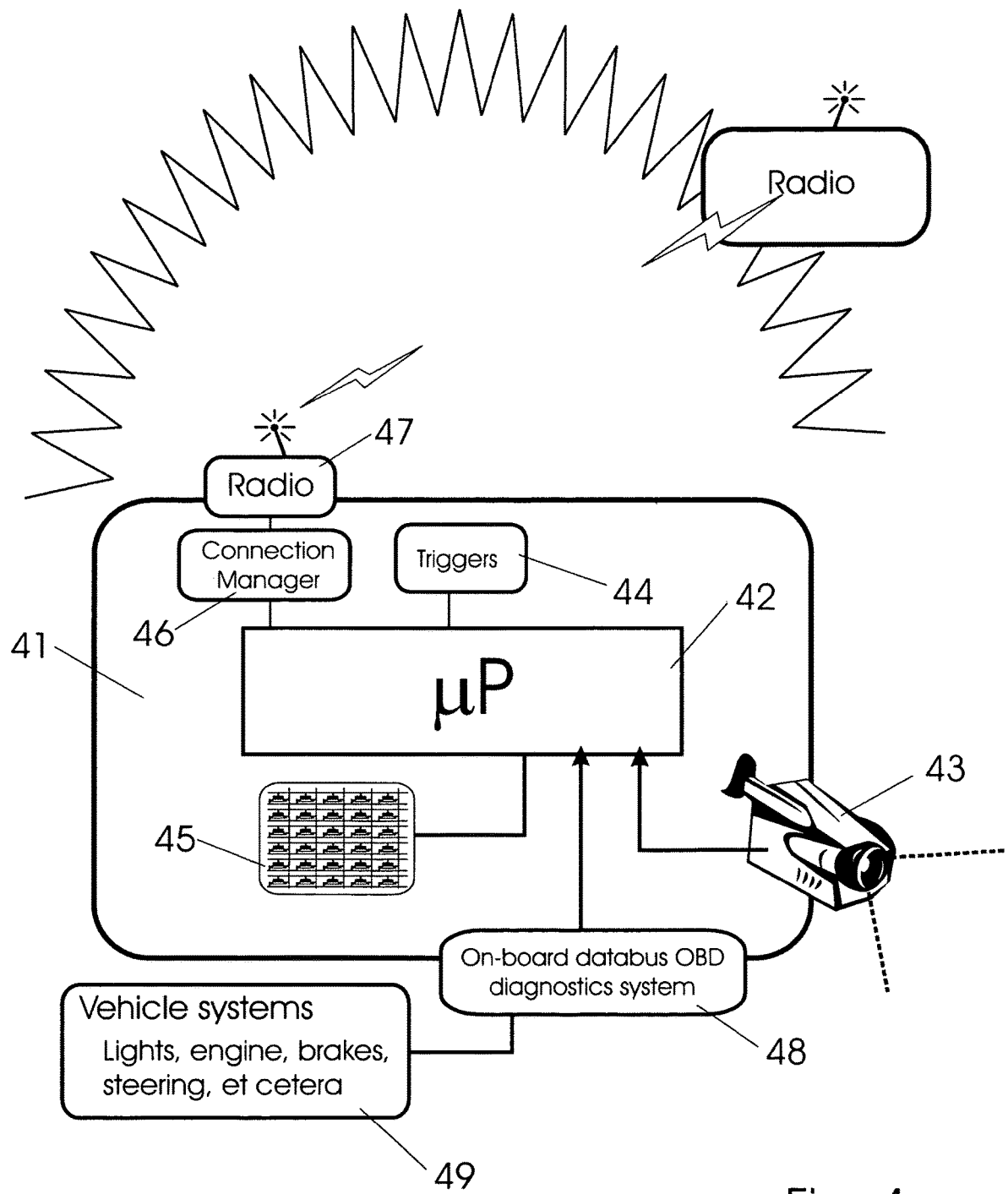

It is useful at this point to present a head portion of a vehicle event recorder system in further detail with specific reference to FIG. 4. FIG. 4 illustrates a vehicle event recorder head 41 in block diagram. The primary elements from which it is comprised includes: a microprocessor 42 including application specific computer code; an electronic video camera 43; event triggers 44; a memory buffer system 45; a connection manager 46; radio communications system 47. In some versions, an on-board databus, OBD, diagnostics system 48 is included. Such OBD systems are coupled to sensors at vehicle subsystems 49 such as lights, engine, brakes, steering, among others, to provide feedback as to the state of those systems which may yield further information in conjunction with video data relating to causes of events being recorded.

Vehicle event recorder systems are built about a microprocessor suitable for use in computing platforms for self-contained electronic apparatus. In most cases, these microprocessors are not arranged as general computing platforms, but rather with application specific firmware directed to particular functions at hand. These processors support the ability to perform application-specific functions and drive complementary subsystems such as memory, input/output ports, network connections, and video input, event triggers, among others.

Particularly worthy of mention among these functions includes 'event handling' where an event trigger causes execution of a computer routine whereby an image or image series collected by a camera is transferred from a temporary short-term buffer memory to a durable and lasting memory where it may be stored for a considerable period of time. Thus the microprocessor is responsive to an event trigger such as an accelerometer and prescribed threshold which detects abrupt movements and sets the microprocessor into action to transfer stored data from one memory to another.

Further, the microprocessors of vehicle event recorders are arranged to support wireless connections and data exchange with authorized networks. In particular, the microprocessor is coupled to a proximity trigger which is toggled whenever the vehicle event recorder enters a prescribed communications space. Upon detection of such proximity condition, the microprocessor attempts an authorization step whereby the identity of the network and vehicle event recorder are checked and verified.

If the vehicle event recorder is identified as one properly located within an authorized download space, the microprocessor continues with a data transfer or download step.

In a download step, information stored in the memory of the vehicle event recorder is transferred wirelessly to either a server or to a 'store-and-forward' workstation for later transmission into the broader systems network.

After a completed download, error checking and confirmation steps permit the microprocessor to complete the connection to proceed with a graceful disconnect operation.

The functions including: connection detection (sometimes herein: 'proximity detection'), network address client, authorization, download, graceful disconnect among others, are sometimes arranged as part of a connection manager module.

An electronic video camera may be arranged such that it has a field-of-view which includes an environment about a vehicle. For example, the forward space ahead of a car is an area generally of great importance in consideration of accidents which occur from time-to-time. The camera is further coupled to the microprocessor and image buffer such that images captured by the camera may be discarded where it is determined that those images are no longer of any importance, or in the opposing case, saved to a durable memory where it is determined the images are associated with an important event.

These video cameras are arranged to continuously capture video images both before and after an accident, should one occur. Thus the cameras are durable and fixed mechanically in a vehicle such that they can survive the impact associated with a very stiff collision. While in most cases it is anticipated the camera will be affixed within the driving compartment, it is noted here that an alternative possibility includes mounting cameras on the exterior the vehicle for examples, at a rooftop or coupled with a bumper. The camera is in electronic communication with the microprocessor whereby the microprocessor operates to drive camera functions.

Event triggers include means of sensing an important event and in response thereto activating the microprocessor to perform save operations preserving images associated with the detected important event. Event triggers may be arranged about various systems including for example an on-board databus, accelerometers, a panic button, or a time interval trigger. An onboard data bus may be arranged as an event trigger when some measured parameter exceeds a prescribed threshold to indicate the occurrence of some condition. When the threshold is exceeded, an electronic signal can be provided to the microprocessor queuing it to handle images accordingly. Alternatively, accelerometers can detect very strong movements such as a car swerving or breaking excessively hard or indeed, a direct collision. In these cases, the events may be declared important and the accelerometer provides the signal upon which the microprocessor acts to preserve images recently captured and those captured soon thereafter the event.

A 'panic button' type event trigger may be arranged as a tactile switch which a user can engage when a user makes a judgment that an event has occurred. When a driver sees some important activity, she can engage the panic button to cause an image save operation. An event trigger may be as simple as a mere timed interval. After a certain period of time has elapsed, an image save operation can be executed. In this case, the mere passage of time causes a signal, which sets the microprocessor into action to save images.

Vehicle event recorders of these inventions include important memory systems. Preferred memory systems include those having a managed loop buffer where images are temporarily stored for brief periods of time. In the case of an event trigger toggle image are transferred to a second more durable memory, from the managed loop buffer thus preserving images associated with the event. In some versions, the managed loop buffer is embodied as a semiconductor memory such as a DRAM memory, which is quite fast and may be written to many millions of times without exhausting its functionality. In the same system, the durable memory may be fashioned from a flash memory system suitable for holding large amounts of data including video type data. Said flash memories are very inexpensive and have suitable capacity for holding video information associated with a large plurality of separate events, which may occur throughout the service day of a vehicle event recorder.

Wireless communications radios in wide use today including those known as WiFi transceivers. A WiFi transceiver is very inexpensive radio, which generally includes network functions such as network address handling services, router services, firewall services, and network switching among others. Thus it is a great advantage in these systems to deploy WiFi type transceivers such that a vehicle entering a parking facility can be automatically connected to a cooperating network.

New, soon to be introduced, systems boast far greater range than those WiFi systems; thus it is expected that so-called "WiMax" systems will have range of a few—to perhaps tens of miles. It is quite useful in some embodiments to arrange WiMax transceivers in conjunction with a parking facility in a vehicle event recorder system. In either case, a wireless communications transceiver has finite and limited range, which give rise to a coverage region or communications space and some implicit peripheral boundary. While we use herein these examples WiFi and WiMax systems, it will be recognized by the reader that many useful alternative wireless systems exist. Some which might be used in place of a WiFi or WiMax system. We choose WiFi and WiMax because it is expected that they will have quite sufficient performance characteristics and very low-cost.

In addition to these important subsystems, the vehicle on-board databus system or OBD is also coupled to the vehicle event recorder microprocessor. An on-board databus, is an electronic system coupled to a plurality of transducers and sensors throughout the vehicle which each collect data relating to vehicle characteristics and performance. The on-board databus may include information about drive train and transmission, engine operational status, brakes, lights, et cetera. The on-board databus is useful in vehicle event recorders for providing additional data and information which relates to the status of a vehicle, subsystems and its engine conditions at a particular time of interest, for example in association with a traffic accident.

Figure 5:
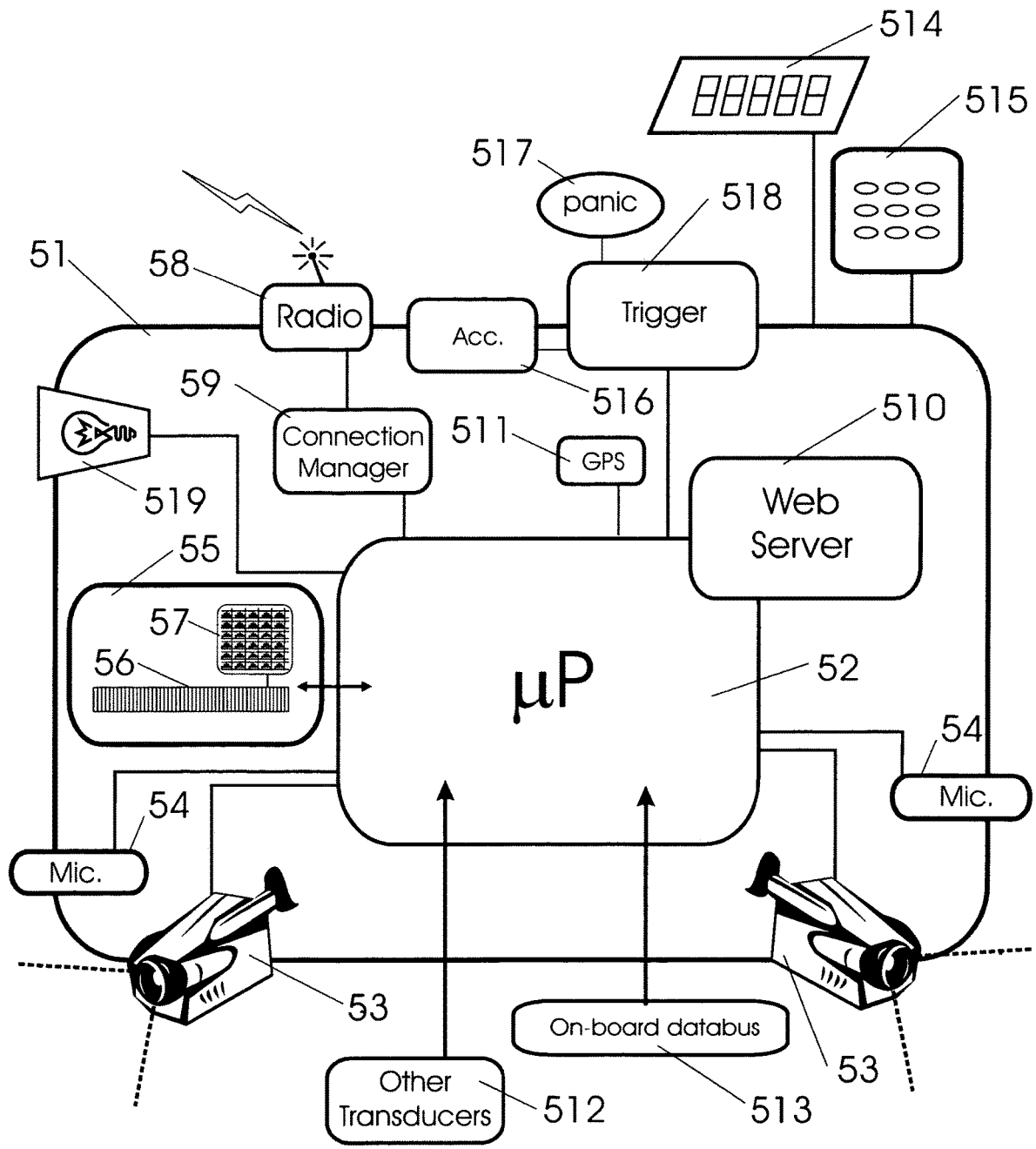
FIG. 5 is a block diagram to illustrate in further detail important elements of these vehicle event recorder units.
Figure 6:
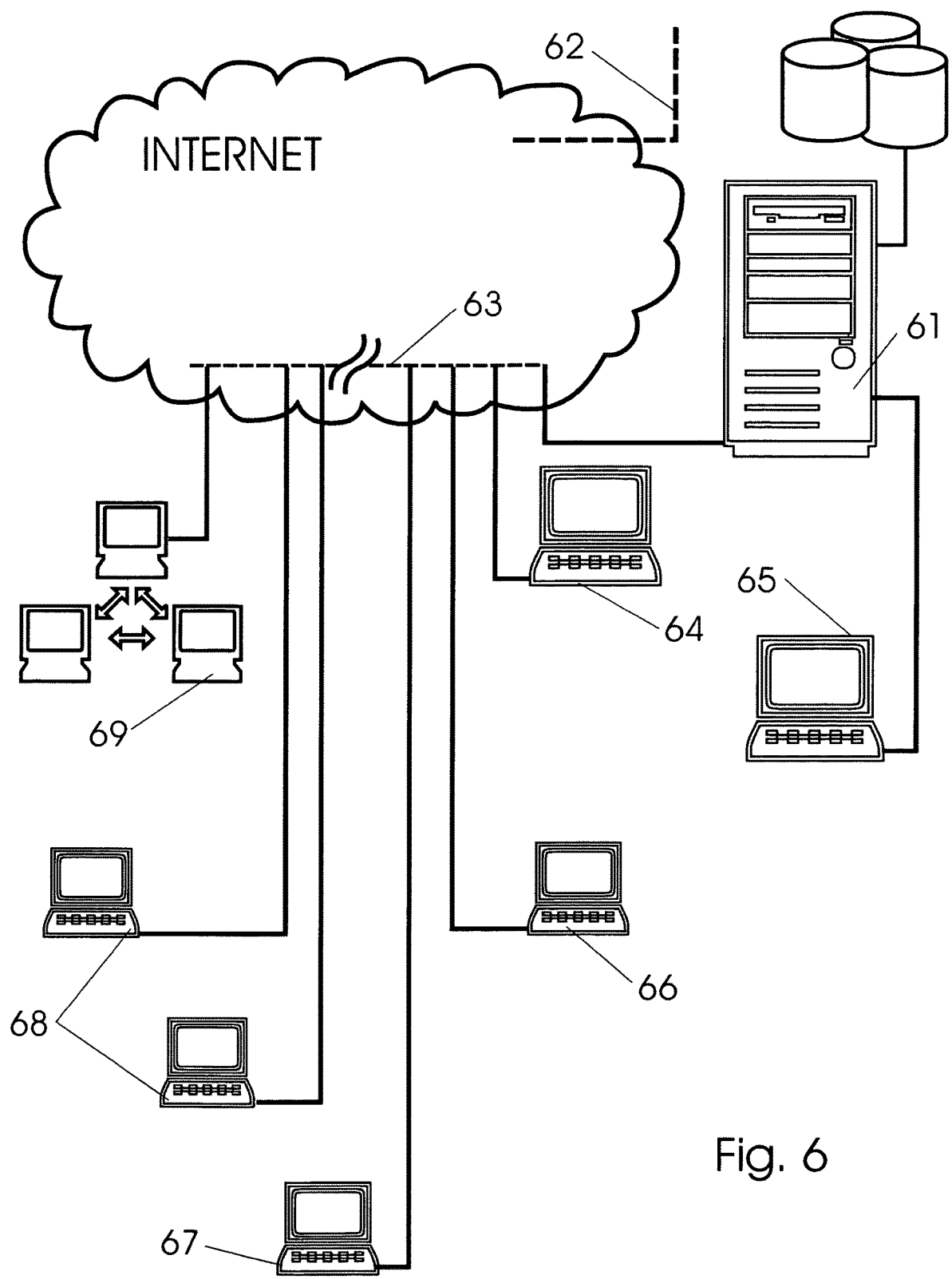
FIG. 6 is a schematic presentation of cooperative systems forming a network relationship with recorder elements.

Further details relating to minority subsystems of vehicle data recorders include additional elements which may be optional. Some of the most important of these are illustrated in the block diagram of FIG. 5 alongside with the major elements. A data recorder unit 51, comprises a computer microprocessor 52 with appropriate vehicle event recording management programming installed. Two cameras 53 including a forward-looking camera and microphone 54 and a driver compartment camera and microphone. An advanced high performance memory system 55 including a two-stage buffer of managed loop memory 56 and flash memory 57 is provided in agreement with particular attributes and the nature of these systems and applications. A radio 58 provides a wireless communications link in conjunction with a connection manager 59 which couples the microprocessor to systems external with regard to the vehicle event recorder head. An internal web server module 510 runs within the device to provide an hypertext transfer protocol interface whereby internal adjustments to subsystems may be effected via remote web browsers. Some versions include a position determining means 511 such as a global position system GPS locator. Other sensors and transducers 512 may be deployed about a vehicle to measure parameters relating to vehicle performance independent of those transducers already a part of the on-board databus system. In addition, data collected from an on-board databus directly coupled to the microprocessor provides similar functionality. A graphical user interface 514 provides a visual means of conveying messages and information to a human operator. A user tactile input means 515 such as a keypad may also drive activity within the vehicle data recorder head. Event triggers including accelerometers 516 and panic button 517 are arranged to indicate to the microprocessor the occurrence of an important instant and need to preserve images associated therewith. Finally, an internal illumination system 519 is provided for nighttime use.

In some versions, a forward-looking camera and exterior microphone are arranged to record video and audio information outside the vehicle compartment. Conversely, a vehicle event recorder system may additionally deploy a second camera as a vehicle driver compartment video camera and second microphone as an interior microphone arranged to record video and audio inside the driver compartment. Thus it is said here that vehicle event recorders include at least one camera; but may include any number of auxiliary cameras and microphones.

In some special versions, a vehicle event recorder may be provided with a very large capacity memory system such as a disk drive unit. A so-called 'microdrive' can be arranged as a very small memory system capable of recording video data over extended periods. All driving activity throughout a service today, including service days with no accidents, may be of interest in some system versions. Thus in the present systems, a recorder is started in the morning at the beginning of the service day, and operates continuously delivering data to the memory until the end of the service day when the vehicles are returned to the storage facility. All recorded data including non-accident or non-event related data is put into memory and downloaded at the end of the day. In this way, the vehicle event recorders of these inventions omit completely accident triggers which manipulate data storage systems to prevent overwrite of memory.

In other special versions of vehicle event recorders, a computer module known as a 'web server' may be included. So equipped, a vehicle event recorder having established a communications connection may be addressed and manipulated by way of a common computer Internet browser. Thus a vehicle event recorder present in a communications space may be 'browsed' by remotely located systems operators. It is possible in this way to reset or to otherwise manipulate various adjustable settings which may be within the vehicle event recorder. It is not necessary to physically access the vehicle event recorder with a screwdriver for example, in order to change the brightness or contrast of the video system. Instead, an operator located in India may adjust the brightness of a particular vehicle after noticing problems in a video analysis operation being taken up far from the vehicle location. While updated firmware downloads can provide the same function, a web browser provides a highly functional user interface front end which is easily operated by anyone who can operate a computer.

A recorder unit may be equipped with the GPS receiving system 510. At all times, a GPS receiving system can provide a position signal to the microprocessor for recording. Position determination results can be recorded by these versions of vehicle event recorders to associate measured location with accident video. Further, the system sometimes includes an electronic compass device. An electronic compass can measure the direction of a reference axis associated with the vehicle. Thus one can tell precisely in which direction the vehicle is pointing at various recording intervals and this information can be similarly recorded.

It is also possible to incorporate other transducers, which are coupled to the vehicle in some way to measure physical parameters of the vehicle or its environment. These transducers might be coupled to the processor directly and connected to one or another vehicle subsystem. For example, a drive shaft pickup might include a magnet which the detects every turn of the drive shaft. This information could yield indications as to vehicle speed which are important in the accident review circumstances.

Some versions of these vehicle event recorders include a graphical user interface in the form of a display unit. The display unit is suitable for converting electronic signals provided by the microprocessor to graphical messages which are easy to read and understand by human users. After properly logging in, a driver may receive a message reminder to "drive safely" on such displays A tactilely operated keypad is provided in some versions in order to allow users to provide inputs to the microprocessors. Where fleet vehicles are shared by several drivers, it is useful to provide means for a driver to identify herself to a system by way of a touchpad code or PIN number. As such, some preferred vehicle event recorders are sometimes provided with such keypad input devices suitable for these functions.

For nighttime use, or in other no or low light level conditions such as when the vehicle enters a tunnel, these vehicle event recorder units may include an integrated IR illumination system 519. The illumination system provides illumination in the driver compartment which does not distract the driver. Infrared light is detected by the video camera but cannot be seen by the driver. Accordingly, the infrared light does not distract the driver.

In some circumstances, wireless mobile phone networks may also be used for the communication link in special versions of these systems. In this regard, the wireless communications space boundaries are defined by the extent of the cellular network coverage. Since mobile phone network systems are presently quite mature, the coverage area attainable is considerable. Accordingly, vehicle event recording systems arranged in this fashion have a wireless communications space of considerable extent—perhaps covering many tens or even hundreds of square miles.

While such schemes could not include high-resolution, live video. It would account for transmission of video frames selected from a series. For example, while recording locally at a rate which far exceeds one frame per second, one could transmit at that limited rate over the limited bandwidth wireless telephone network. Thus, the system could convey image information albeit in limited quantity, resolution or rate.

In systems deploying a mobile telephone network as a communication link, the 'proximity trigger' described above becomes somewhat ambiguous. This is due to the fact that the vehicle rarely leaves and reenters communications space and may remain continuously therein during the entire service day. Recall that in systems presented above, a vehicle's entry of the download space is the trigger which causes a download action. Accordingly, such triggers are ineffective, when mobile telephone networks are used as the communications link It is also useful to consider the opposing node of these networked vehicle event recorder systems in greater detail. The portion of these network systems which includes the server and data consumer clients. In particular, we consider a server computer 61, which communicates by way of the Internet with a plurality of prescribed and authorized member entities. While data is received from vehicle event recorders along paths 62, from remote recorder units as explained in great detail of sections prior, equal attention in now directed to how such collected data is distributed, analyzed and consumed.

Recorded information which bares indication and history as to the use and abuse of vehicles is important to a great number of interested parties. For example, a fleet administrator/manager keeps track of vehicles and drivers to which he manages with regard to not only maintenance and safety, but also with respect to scheduling, loss prevention, among others.

A fleet administrator/manager working from a workstation 64 located in any part of the world, can interact with web applications served by the server to manipulate and examine data recorded by any of the vehicles in her fleet. Web servers can be arranged to provide a fleet manager access to vehicles under her specific management only and to restrict access to the information collected by vehicles under the management by an independent entity. Thus a single server can be used by completely independent entities, who manage fleet vehicles. No other system heretofore known in the arts, has a single server which can receive information from various vehicles belonging to various fleet's, sort that information accordingly, and restrict its access to the appropriate authorized parties. Thus, a municipality, vehicle maintenance department can subscribe to the service by way of the Internet in parallel with the fleet manager of a private fleet operation. While the two users know nothing of the other, they share a common server, database and service provider thereby reducing costs for all.

The server/service provider might include high security level administrative workstation 65, which has a direct private connection and special credentials to the server. A service administrator, requiring high-level administrative privileges to the server may be connected on the inside of a strong firewall. Such administrative node is not appropriately exposed over the Internet for security reasons.

Applications consumers 66-69, include network nodes which communicate with the server by way of its applications and services. Special applications may be configured for various particular users or data consumers. Several of these special purpose applications are illustrated herefollowing.

Insurance adjustors and underwriters use advanced data analysis to better position themselves with regard to risk management. Presently, reports and statistical analysis available to insurance adjustors and underwriters are largely compiled in manual processes. When insurance adjusters and underwriters deploy and use the systems proposed here, they have immediate access from their remote offices to detailed current data from vehicles insured by their companies. This data can be accessed directly from the server having an application host running a special insurance application configured to serve the precise information that insurance underwriters and adjustors need. Some information relating to vehicle use remains private with respect to the vehicle's owner and driver, however, by agreement with insurance companies, a vehicle owner may decide to make available and submit particular information in consideration for preferred insurance rates. In this case, the server of these systems provides an application, addressable by insurance underwriters, to serve information so insurance companies can more perfectly manage risk.

In addition, insurance underwriters will find a profound undeclared advantage to use of these systems. The mere presence of a vehicle event recorder system has a very strong effect on drivers wishing to keep their jobs. Mere knowledge that a detailed video record will be available to fleet managers in case of incident, keeps drivers on their very best behavior. Thus even placebo systems arranged to appear functional but are in fact totally inoperable will provide insurance underwriters with great advantage. However, where a fully operable system is deployed, insurance underwriters will be in far better position to more precisely manage risk.

An insurance company workstation computer 66 connected to the Internet can communicate with the server computer and consume the web services and applications that are provided specifically to insurance companies. Thus the server is arranged with particular web applications that insurance companies can use to monitor the vehicles which are insured by them. In this way, insurance companies can mitigate their exposure to high risks vehicles and situations. An insurance company can maintain constant monitoring for changes which might affect their position and they can stay highly responsive thereto. Such very high access to current information will be a powerful tool for insurance underwriters to deploy in advanced risk management strategies. Previous to systems taught in these inventions, insurance companies have only access to vehicle history records by way of a states authority and clients reporting and history.

While it is anticipated that the considerable expense associated with fleet vehicle operation relating to insurance may be greatly reduced in view of the above applications, there remain many very important applications which will serve other entities or interested parties. These applications served at common server having access to very detailed and current data which is otherwise unavailable in nonnetwork systems.

These systems further enable yet another important management application yielding advantages not to fleet vehicles themselves, but rather the roadways upon which they operate. Data collected by these systems particularly includes information about traffic accidents. Therefore, computing systems can be set up whereby a threshold can be triggered such that it indicates a dangerous condition. For example if several accidents happen within a short period of time at the same place, this condition may be indicative of faulty roadway equipment such as a malfunctioning traffic light. In such cases, when the threshold is passed, these computing systems can be arranged to send a special e-mail notice to roadway engineers notifying them of the dangerous condition. Workstations 67 used by road safety engineers have access to e-mail and the Internet and may be further in connected to systems presented here. Thus, road safety engineers might look to web applications served by these inventions to provide that information sorted in accordance with some particular road safety issue. For example, if there are fifteen automobile crashes at Fifth and Elm street in the month of July, the server can trigger a message and send it to a road safety engineer. It may be the case that some condition has changed at the intersection unbeknownst to the authorities. The message could put the road engineer on alert that something has happened and the intersection has become dangerous. For example, a huge pothole maybe causing cars to swerve just at the moment when drivers need to pay attention to properly negotiate oncoming traffic in the intersection.

Another example of how road service engineers might use the system includes the following. To determine the safe speed of a road some municipalities set a threshold indicator. For example, it can be said that 85% of drivers drive at or below the "safe speed". In this regard the system which keeps track of vehicle locations and the speed at which they drive to compile information for any particular road stretch and determine what is the safe speed per that section of road. Road safety engineers can use this information to provide proper signage and road construction elements such as guard rails, indicators, warnings, et cetera. Some versions can be completely automated and left unattended by any human operators. The computer can monitor roadway conditions without input from anyone, and provide appropriate notice when a certain condition is met. Such highly automated systems can prove extremely valuable for general public safety.

Another important application enabled by these systems relates to state authorities 'Departments of Motor Vehicles'. Motor vehicle departments managed by the state sometimes include record keeping relating to traffic accidents. Further, these departments tend to track and keep records relating to driver's performance.

Since the systems disclosed herein provide highly effective data capture function, and further provide ready and easy access to such data, is now quite possible to couple a Department of Motor Vehicles data systems directly to these data capture and management systems. This is done via a server applications host running a special program configured and designed with a view to serving department of motor vehicles with particular types of data required by them. With vehicle event recorder systems arranged as described here, it is now possible for a driver to be involved in a collision at 10 o'clock in the morning, and a video record be made available at the Department of Motor Vehicles by 10:02 (or before). The efficiency and advantages of such systems should not be underestimated. When a vehicle event recorder is coupled to remote servers as described, and where-such remote servers provide need-specific web applications to interested parties, very valuable data handling processes are enabled.

Other workstations 68, similarly having access to the Internet can be used by other particular users requesting information sorted and arranged for their specific application. These may include such entities like leasing companies who tend to own vehicles and lease them to another company. It may be a condition of the lease that the vehicles are used in a safe and proper manner. However, monitoring such condition is otherwise nearly impossible. A leasing company with access to information provided by these servers through their web applications can easily check up on the vehicles it owns.

Among the most important applications are those which relate to vehicle fleet management and administration. Scheduling functions, tracking systems, maintenance operations, et cetera, can be organized and provided via well-prepared computer programs whereby a human fleet administrator/manager can read and manipulate data in support of this functionality. Thus, a large fleet of vehicles being operated in southern California may be maintained and organized by a fleet manager in New York City. With systems of these inventions, it is no longer the case that the fleet manager has to be effectively in the same location as vehicles. This is made possible because the systems include highly efficient information capture and sorting provided automatically and directly from fleet vehicles to a remote server which may be addressed by fleet administrator/managers from anywhere.

Maintenance workers might use a particular web application which compiles information relating to wear and tear on the vehicle. Oil changes, tire rotation, wheel alignment, and other general maintenance actions should be performed in view of conditions which can be managed and detected by the server. It is within very common practice that oil should be changed every 3000 miles. However, this rule of thumb does not reflect very accurately the conditions upon which oil should really be changed. Oil suffers degradation from many factors, and particularly from excessive heat and high 'rpm'. So the system could set some oil change guidance based on detailed use of the vehicle rather than a simple mileage scheme. If the car runs with high revolutions on many hot days, the oil may need a change before 3000 miles. Conversely, if the car is gently driven with low engine stress on mildly cool days, it may not be necessary to change the oil until 4500 miles. Of course, oil changes is a very simplistic example, but is provided here to show that web applications can be used for more accurate guidance in the maintenance of vehicles. Data collected throughout the vehicle service day, recorded and stored, later transmitted to the server, and properly sorted and analyzed by a web application, can be read by a maintenance engineer in used more properly keep the vehicle in good condition. While fleet management is a primary important application, it will be clear from the following sections that other interested parties have a similarly important stake in fleet vehicle data management systems first presented here.

Another very important application relates to teenage use of vehicles. Systems are provided for use by families including new drivers, generally teenagers learning to drive. Teenagers account for disproportionately large percentage of vehicle accidents—including those vehicle accidents which result in death. However, when young new drivers know that they're being watched and other actions will be recorded, and they will be held accountable, they tend to make better decisions while driving. Thus parents might be premium subscribers to the service which will benefit them by protecting their children from themselves. Special applications can be prepared and served by an applications host whereby parents can inquire as to the activity associated with the use of vehicles by their teenagers. In this way, families can benefit from review of detailed vehicle use information including video data easily accessible from the privacy of one's own home by way of an Internet server arranged in accordance with these inventions.

While previous figures and description present in great detail the essence of these inventions, another view lend an even greater understanding. FIG. 7 presents a block diagram which corresponds to the very important concepts of independent web applications and services provided at a server. In review, the reader is reminded that a connection space 71 is associated with a parking facility 72, such as a common parking lot whereby the parking lot is enveloped by the space in which a reliable communications connection can be made via wireless radio 73. Further, a broadband connection 74, to the Internet couples the communications space to the system server whereby video data collected at various vehicle event recorders may be transferred to the server.

A server computer is arranged to provide computer services including, but not limited to, general computational service, database service, e-mail service, web applications service, among others. For purposes of these inventions, a primary function of the server lies within an applications host. An applications host may be arranged as a web server under which a great plurality of independent applications 75, or interdependent applications are executed and served to clients 76 via TCP/IP or other suitable protocols 77. By way of example, the applications host of the server can be deployed as a Microsoft Internet Information Services IIS system. In conjunction with IIS, the Microsoft Net technologies including the .NET framework and ASP.NET are suitable for providing the web applications and web services described here.

In a first example, a special application 78 is provided to perform download operations. When a vehicle enters a communications space to toggle a proximity trigger, a service module within the vehicle event recorder makes appropriate calls to the server, and more specifically the applications host, and still further the special download application. The download application responds to these calls by executing operations which permit the vehicle event recorder to transfer data to the server for further processing. Thus, one application of an applications host includes a module to communicate and executed transfers with various vehicle event recorders. Other applications, which belong to the same applications host may operate independently of the download module. Further these other applications may be designed to be addressed by applications clients which are not vehicle event recorders, but rather other entities or interested parties.

Thus, the system server includes computer code programming modules in the form of various web applications; these web applications each having access to data downloaded from vehicle event recorders. Web applications consumers or web "applications clients" connect to and communicate with these web applications by way of Internet protocol or TCP/IP by way of example. These web applications, each perhaps independent of any other, provide information exchange function with these applications clients.

These systems include application-specific software suitable for fashioning network communications as 'web request' actions and transmitting those web requests to the server whose network address is known a priori to vehicle event recorder systems. Web requests directed to a specific URL (uniform resource locater—or 'internet address') may be transmitted from the microprocessor of a vehicle event recording unit. These web requests include web requests directed to specific services which may be provided at a system server. Services available may include, software upgrades, registry updates, scheduling information, as well as data download operations. Thus, a vehicle event recorder having collected data all through its service day, is in a condition to download its data once it enters a suitable download or communications space and receives its network address assignment to enable communications with the prescribed servers. Servers are 'known' to vehicle event recorder units because it's computer is programmed with a predetermined server network address or means of obtaining same dynamically. Further, a vehicle recorder unit computer is programmed to form appropriately designed web requests such that the recorder unit can properly interact with the web applications and services provided by the server via the applications host.

In preferred versions, the vehicle event recorder unit includes special programming, which anticipates available web services. Such programming is suitable for making action requests of the server and is operable for digesting returned responses also formed in a particular format. Thus the vehicle event recorder unit is specifically programmed with prior knowledge of services available at the server. In this way, vehicle event recorders cooperate together with established proprietary servers.

Some web services provided by servers are not generic and these services could not be consumed by other computer clients not having prior knowledge of the available services and the proprietary interfaces or formats which responses are returned. Thus the server is a specially configured to communicate with the vehicle event recorders.

The server is also configured whereby it can run self contained local applications 79 which may be directed to data analysis and statistical services to operate on collected data without interaction of outside parties.

Another module of the server includes an e-mail server 710 system which can be arranged to respond to special conditions and events occurring in related applications 711 whereby it can send e-mail messages into the Internet.

FIG. 8 presents further description relating to server 81 applications and applications host in accordance with vehicle event recorder systems of these inventions. A communications space 82, which supports wireless downloads from vehicles having captured video data is coupled to a remotely located server by way of communication path 83 which may include the Internet. The communications space is directly coupled to a particular web application 84 arranged specifically for communication with vehicle event recorders whereby it is operable for downloading data collected thereby. The application may be called by vehicle event recorders by way of a particular and specific network address or URL. Other applications clients such as those described above, may be fashioned as 'read-only' clients 85 whereby the server provides data for analysis and consumption by interested parties, but those clients do not provide data to the server. These clients each communicate with the applications host, by way of various paths 86, which may include unique URLs to appropriately direct communications traffic to the various particular applications 87. An entirely different type of application/service, herein known as a 'push' type service 88 conversely is arranged to provide information to the server. Information from a push service is transmitted by way of the Internet, via explicit URLs or other routing protocol to particular applications 89 arranged to receive information.

Push services may provide information to applications which process this information and respond thereto by amending are augmenting certain records maintained by the entire system. For example, information from weather reporting agencies may be transmitted to these applications. The applications then sort and process the weather information, taking important pertinent parts, i.e., weather conditions in certain areas at a certain time may be associated with a particular accident recorded by a vehicle event recorder.

Other push services may include those which contain information from vehicle manufacturers which can include updates relating to particular model vehicles which may be part of vehicle fleet. In response to receiving such information, managers can alter the way they use and deploy these vehicles. Vehicle recall information may be transmitted which permits a fleet manager to respond by applying an appropriate fix as part of an automated maintenance program.

FIG. 9 includes push services of two different types arranged with various network connections. A system server 91, including specially designed applications 92 in communication with various interested party applications clients 93 also includes specially arranged application 94 which receives information from push service 95. In addition to this arrangement, other applications 96 are configured to communicate with push services whereby they may receive information over the Internet while at the same time these push services can provide information directly to vehicle event recorders over communications path 98. That is to say, these systems anticipate not only push services which are in communication directly with the server applications host, but also at the same time push services being in communication directly with vehicle event recorders head units without first passing through any application at the server.

A very important principle of these vehicle event recorder systems includes the arrangement where a single server provides management and service to a plurality of independent fleets.

It is anticipated that totally independent fleets of vehicles managed by separate entities will share a single server having a common applications host. While fleet members logon with separate identities, the separate fleets may logon to the same applications host which is provided with powerful membership management facility to maintain separation between various fleets and associated data received therefrom members of the fleet.

A first fleet has a particular associated communications space 100 served by wireless radio 101 to communicate with fleet members 102 and 103. A vehicle event recorder 104 deployed within the fleet member includes connection manager 105. Connection manager includes computer programming code to properly identify and authenticate the vehicle as a member of a particular fleet when in communication with the centralized server 106. A separate fleet may include as a member truck vehicle 107, in separate communications space 108 which is physically removed from communications space 100. Should the vehicle 109 from the first fleet enter the communications space associated with another fleet, the condition may be designated as a non-authorized condition. In this case, communications and downloads would be prevented. Thus vehicle event recorders of these inventions include connections managers appropriately suited to manage membership operations and distinguish between vehicles of particular fleets and communication spaces designated for authorized download operations.

FIG. 11 illustrates an important consideration with regard to communications spaces and their full extent and the networks which may exist within a single communications space. While it is anticipated that high-powered WiMax wireless communications transceivers will soon be widely available and provide for very large communications spaces, until that time other provision is suggested here.

Since the size of typical vehicle fleets commonly in use today may exceed hundreds of vehicles, it is sometimes necessary to arrange a special communications space which is quite significant in extent. In these cases, it is impossible to serve a communications space which could accommodate the entire fleet of hundreds of vehicles with a single radio transmitter of the WiFi type as these transmitters have limited range not compatible with such parking facilities which accommodate large fleets. Accordingly, it is herein taught that a single parking facility of large extent can be served by a plurality of WiFi transmitters networked together. FIG. 11 shows a remote server 111, including database 112, applications host 113, and at least one web application 114 coupled by the Internet and further to extended communications space 115. Communications space 115 is comprised of a plurality of individual communications spaces 116 spatially removed but overlapping one another to operate in conjunction with each other to service an extended and large parking facility 117.

FIG. 12 pictorially illustrates a very important concept herein presented as the proximity trigger. An important event happens whenever a vehicle enters a communications space. Merely by entering the communications space and piercing the envelope of the radio transceiver range boundary, the vehicle causes the proximity trigger to be toggled. A server 121 is in broadband communication 122 with radio transceiver 123 serving communications space 124. Moving vehicle 125 passes from outside of the communications space to the interior of same communications space to cause proximity trigger 126 to fire. Upon detection of proximity trigger being toggled vehicle event recorder 127 equipped with connection manager 128 responds by providing handshaking and authentication with radio transceiver and further performs a download function where data is passed to the remote server in direct response to the vehicle entering the download space.

Thus it is an important aspect of these inventions that the actions of vehicles themselves trigger and cause network responses without intervention of human operators. The arrangement of these systems provides an automated means of passing video data collected in vehicle event recorders to remotely located servers for further processing.

While some wireless communications systems such as WiFi and WiMax systems tend to have exceptional bandwidth, wireless telephone networks do not. Since vehicle event recording systems tend to capture data in extremely large amounts, wireless telephone networks are sometime not suitable for this application. However, special systems can be arranged whereby only a select or 'abbreviated' dataset is passed over the wireless telephone network.

It is easy to appreciate that some important types of data are well-suited for transmission over low bandwidth communications links but with a very large coverage areas. It is readily accepted that transmission of high-resolution, live video is presently prohibitively difficult. On the other hand, where a system is devised such that an abbreviated set of video images were occasionally transmitted, then the wireless telephone network may serve as a communications link sufficiently well in these systems.

In a first illustrative example, it is suggested that an event recorder duly writes data to a local storage in accordance with operation explained herein. This data, extremely large in quantity is suitable for local storage but not for transmission over bandwidth limited wireless telephone type networks. Data written to the local storage could be subject to a download action when the vehicle returns for high-bandwidth communications link. However, while connected via a wireless telephone communications network, the system can be arranged to transmit bandwidth limited subsets of data including select video frames.

Certain limited non-video data recorded by the system may be suitable for continuous transmission. Non-video data can be very small in size and easily transmitted over low bandwidth communications links. For example, a numeric, position-only measurement data may result in a dataset quite small and easily transmitted via a mobile phone network. Thus, a vehicle event recorder system which captures a position measurement can be arranged to transmit that information over the bandwidth limited communications link into the system network.

An abbreviated video sequence may include one which is most important as detected by some preset mechanism. For example, an 'impact detector' might trigger a transmission of a limited amount of video data, for example three seconds of video prior to the impact and up to three seconds after the impact. This limited dataset might not be transmitted in real-time, however, it can be transmitted in a reasonable time and passed to the server while a vehicle is still in the field.

Systems arranged to download data as described, i.e. in limited datasets, may be deployed with mobile telephone networks as a communications link. In such cases, an alternative trigger system is used in conjunction therewith these arrangements to effect an alternative version.

In a very special case where fleet vehicles never rest or 'park'; we consider a download station as one in which a vehicle merely enters, performs a download and then leaves without a full parking; stopping or storage action.

The examples above are directed to specific embodiments which illustrate preferred versions of devices and alternative configuration is presented in FIG. 3 methods of these inventions. In the interests of completeness, a more general description of devices and the elements of which they are comprised as well as methods and the steps of which they are comprised is presented herefollowing.

One will now fully appreciate how vehicle event recorder systems may be deploy in highly efficient network arrangements having automatic download and updating facility. Although the present inventions have been described in considerable detail with clear and concise language and with reference to certain preferred versions thereof including best modes anticipated by the inventors, other versions are possible. Therefore, the spirit and scope of the invention should not be limited by the description of the preferred versions contained therein, but rather by the claims appended hereto.

It is claimed:

1. A vehicle fleet management system comprising:
vehicle event recorder units coupled with vehicles, the vehicle event recording units being wirelessly coupled to a network and being configured to communicate via the network, the vehicle event recorder units including one or more vehicle sensors and video recording equipment, the one or more vehicle sensors being configured to detect vehicle events while the vehicles are operating, the vehicle events being related to the operation of the vehicles, wherein individual ones of the vehicle event recorder units are configured to:
responsive to detection of the vehicle events, generate vehicle event information, the vehicle event information including video information and operation information, the video information being captured by the video recording equipment from an environment about the vehicles, the operation information being conveyed by output signals generated by the one or more vehicle sensors during the vehicle events; and
a server, the server being coupled to the network, the server being configured to:
receive and electronically store the vehicle event information;
receive external information, the external information describing external conditions present during the vehicle event from one or more external computing systems;
associate the external information with the vehicle event information;
determine a frequency of the vehicle events that are detected for a particular section of a roadway, wherein the determination is based on the vehicle event information;
generate a roadway-specific safety indicator based on the determined frequency of the vehicle events and the external information, the roadway-specific safety indicator conveying safety information of the roadway travelled during the vehicle events, and wherein the safety indicator represents an indication of safety of the particular section of the roadway; and
facilitate presentation of the vehicle event information, the external information, and the roadway-specific safety indicator to an end user for analysis by the end user via a remote computing system associated with the end user to facilitate analysis of the vehicle events by the end user.

2. The vehicle fleet management system of claim 1, wherein the server is configured to receive the vehicle event information from an individual one of the one or more vehicle sensors associated with a vehicle on-board databus system.

3. The vehicle fleet management system of claim 1, wherein the server is configured to receive the vehicle event information from environmental sensors of the vehicle event recorder units that include one or more of an audio microphone, an accelerometer, a location sensor, or a panic button.

4. The vehicle fleet management system of claim 1, wherein the server is configured to facilitate presentation of one or more of the vehicle event information, the external information, or the roadway-specific safety indicator to the end user for analysis responsive to a request from the remote computing system associated with the end user.

5. The vehicle fleet management system of claim 1, wherein the server is configured to determine ambient weather conditions during the vehicle events, the ambient weather condition determination based on the vehicle event information and the external information.

6. A vehicle fleet management system comprising:
a first vehicle event recorder unit coupled with a first vehicle, the first vehicle event recorder unit including one or more vehicle sensors, the first vehicle event recorder unit being wirelessly coupled to a network and configured to communicate via network, the one or more vehicle sensors of the first vehicle event recorder unit being configured to detect a first vehicle event related to operation of the first vehicle, the first vehicle event being detected at a first point in time while the first vehicle is operating, wherein the first vehicle event recorder unit is further configured to:
responsive to detection of the first vehicle event, generate first vehicle event information, the first vehicle event information including information generated by the one or more vehicle sensors of the first vehicle event recorder unit during the first vehicle event, wherein the first vehicle event information further includes information related to a particular section of roadway travelled by the first vehicle during the first vehicle event;
a second vehicle event recorder unit coupled with a second vehicle, the second vehicle event recorder unit including one or more vehicle sensors, the second vehicle event recorder unit being wirelessly coupled to the network and configured to communicate via the network, the one or more vehicle sensors of the second vehicle event recorder unit being configured to detect a second vehicle event related to operation of the second vehicle, the second vehicle event being detected at a second point in time while the second vehicle is operating, wherein the second vehicle event recorder unit is further configured to:
responsive to detection of the second vehicle event, generate second vehicle event information, the second vehicle event information including information generated by the one or more vehicle sensors of the second vehicle event recorder unit during the second vehicle event, wherein the second vehicle event information further includes information related to the same particular section of the roadway travelled by the second vehicle during the second vehicle event; and
a server, the server being coupled to the network, wherein the server is configured to:
receive and electronically store the first vehicle event information;
receive and electronically store the second vehicle event information;
receive external information describing external conditions present during the first vehicle event and the second vehicle event from one or more external computing systems;
associate the external information with the first vehicle event information and the second vehicle event information;
generate a roadway-specific safety indicator based on the first vehicle event information, the second vehicle event information, and the external information, wherein the roadway-specific safety indicator is further based on a time period in which both the first vehicle event and the second vehicle event were detected, wherein the roadway-specific safety indicator conveys safety information of the particular section of the roadway travelled by the first vehicle during the first vehicle event and by the second vehicle during the second vehicle event, and wherein the roadway-specific safety indicator represents an indication of safety of the particular section of the roadway; and
facilitate presentation of the first vehicle event information, the second vehicle event information, the external information, and the roadway-specific safety indicator to an end user for analysis by the end user via a remote computing system associated with the end user to facilitate analysis of the first vehicle event and the second vehicle event by the end user.

7. A vehicle fleet management system comprising:
a first vehicle event recorder unit coupled with a first vehicle, the first vehicle event recorder unit including one or more vehicle sensors, the first vehicle event recorder unit being configured to communicate via a network, the one or more vehicle sensors of the first vehicle event recorder unit being configured to detect a first vehicle event related to operation of the first vehicle while the first vehicle is operating at or near a particular section of a roadway, wherein the first vehicle event recorder unit is further configured to:
responsive to detection of the first vehicle event, generate first vehicle event information, the first vehicle event information including information related to the particular section of the roadway travelled by the first vehicle during the first vehicle event;
a second vehicle event recorder unit coupled with a second vehicle, the second vehicle event recorder unit including one or more vehicle sensors, the second vehicle event recorder unit being configured to communicate via the network, the one or more vehicle sensors of the second vehicle event recorder unit being configured to detect a second vehicle event related to operation of the second vehicle while the second vehicle is operating at or near the same particular section of the roadway as the first vehicle during the first vehicle event, wherein the second vehicle event recorder unit is further configured to:
responsive to detection of the second vehicle event, generate second vehicle event information, the second vehicle event information including information related to the same particular section of the roadway travelled by the second vehicle during the second vehicle event; and a server, the server being coupled to the network, wherein the server is configured to:
  receive the first vehicle event information;
  receive the second vehicle event information;
  receive external information describing external conditions present during the first vehicle event and the second vehicle event from one or more external computing systems;
  associate the external information with the first vehicle event information, the second vehicle event information, and the particular section of the roadway;
  generate a roadway-specific safety indicator for the particular section of the roadway, wherein the roadway-specific safety indicator is based on the first vehicle event information, the second vehicle event information, and on a duration of a period of time in which the first vehicle event and the second vehicle event were detected, wherein the roadway-specific safety indicator conveys safety information of the particular section of the roadway travelled
    (i) by the first vehicle during the first vehicle event, and
    (ii) by the second vehicle during the second vehicle event, and wherein the roadway-specific safety indicator represents a road safety issue regarding the particular section of the roadway; and
  facilitate presentation of the first vehicle event information, the second vehicle event information, and the roadway-specific safety indicator to an end user for analysis by the end user via a remote computing system associated with the end user to facilitate analysis of the first vehicle event and the second vehicle event by the end user.

* * * * *